(12) United States Patent
Oh

(10) Patent No.: US 8,237,593 B2
(45) Date of Patent: Aug. 7, 2012

(54) DATA INPUT DEVICE

(76) Inventor: Eui-Jin Oh, Daejeon (KR)

( * ) Notice: Subject to any disclaimer, the term of this patent is extended or adjusted under 35 U.S.C. 154(b) by 596 days.

(21) Appl. No.: 12/358,148

(22) Filed: Jan. 22, 2009

(65) Prior Publication Data

US 2009/0189789 A1 Jul. 30, 2009

Related U.S. Application Data

(63) Continuation of application No. PCT/KR2007/003611, filed on Jul. 26, 2007.

(30) Foreign Application Priority Data

| Jul. 26, 2006 | (KR) | 10-2006-0070073 |
| Sep. 4, 2006 | (KR) | 10-2006-0084586 |
| Oct. 23, 2006 | (KR) | 10-2006-0102830 |
| Dec. 1, 2006 | (KR) | 10-2006-0120368 |
| Mar. 8, 2007 | (KR) | 10-2007-0022807 |
| May 9, 2007 | (KR) | PCT/KR2007/002285 |
| May 14, 2007 | (KR) | 10-2007-0046306 |
| Jun. 12, 2007 | (KR) | 10-2007-0056993 |

(51) Int. Cl.
*H03K 17/94* (2006.01)

(52) U.S. Cl. ............ 341/22; 341/34; 200/5 A; 200/8 R; 345/168

(58) Field of Classification Search .............. 341/22, 341/34; 200/5 A, 8 R; 345/168
See application file for complete search history.

(56) References Cited

U.S. PATENT DOCUMENTS 4,497,982 A * 2/1985 Michalski ............ 200/5 R (Continued)

FOREIGN PATENT DOCUMENTS

CN 1776573 5/2006

(Continued)

OTHER PUBLICATIONS

Japanese Office Action dated Nov. 1, 2011 for Japanese Patent Application No. JP 2009-521704 corresponding to U.S. Appl. No. 12/358,161, which is related to captioned U.S. Appl. No. 12/358,148.

(Continued)

*Primary Examiner* — Timothy Edwards, Jr.
(74) *Attorney, Agent, or Firm* — Knobbe, Martens, Olson & Bear LLP

(57) ABSTRACT

A character input device and its method are disclosed. In one embodiment, the device includes: i) a base, ii) an input unit positioned at the base to allow each of first direction input and second direction input to be independently performed, the first direction input being performed by moving the input unit from a reference position to any one of a plurality of first direction indication positions spaced and arranged radially from the reference position within a predetermined input area and the second direction input being performed by selecting any one of a plurality of second direction indication positions spaced and arranged radially in the input unit itself; a first sensing unit for sensing the movement of the input unit, iii) a second sensing unit for sensing the second direction input and iv) a control unit for extracting and running a first character or a second character from a memory unit, the first character being assigned to the first direction indication position in which the movement of the input unit is sensed, and the second character being assigned to the second direction indication position in which the second direction input is sensed, thereby making it possible to minimize a necessary space for inputting characters and accurately input each character according to a user's intention.

47 Claims, 42 Drawing Sheets

U.S. PATENT DOCUMENTS

| | | | |
|---|---|---|---|
| 5,446,480 A | 8/1995 | Yoshida | |
| 5,483,235 A | 1/1996 | Hanson et al. | |
| 5,543,588 A * | 8/1996 | Bisset et al. | 178/18.06 |
| 5,808,567 A * | 9/1998 | McCloud | 341/20 |
| 5,945,928 A | 8/1999 | Kushler et al. | |
| 6,104,381 A | 8/2000 | Watanabe et al. | |
| 6,307,942 B1 | 10/2001 | Azima et al. | |
| 6,378,234 B1 | 4/2002 | Luo | |
| 6,459,390 B1 | 10/2002 | Kim | |
| 6,567,072 B2 | 5/2003 | Watanabe | |
| 6,593,913 B1 | 7/2003 | Krohn et al. | |
| 6,756,968 B2 * | 6/2004 | McAlindon | 345/169 |
| 6,867,380 B2 * | 3/2005 | Miki et al. | 200/5 R |
| 6,894,681 B2 | 5/2005 | D'Agostini | |
| 6,897,849 B2 | 5/2005 | Kim | |
| 6,956,559 B2 | 10/2005 | Hagiwara et al. | |
| 6,963,332 B1 | 11/2005 | Watanabe | |
| 7,151,525 B2 * | 12/2006 | McAlindon | 345/156 |
| 7,286,115 B2 * | 10/2007 | Longe et al. | 345/168 |
| 7,336,260 B2 | 2/2008 | Martin et al. | |
| 2003/0020694 A1 | 1/2003 | Kim | |
| 2003/0107555 A1 | 6/2003 | Williams | |
| 2003/0169240 A1 | 9/2003 | Song | |
| 2004/0080491 A1 | 4/2004 | Takatsuka et al. | |
| 2004/0227728 A1 * | 11/2004 | McAlindon | 345/156 |
| 2006/0238514 A1 | 10/2006 | Rosenberg et al. | |
| 2007/0119698 A1 | 5/2007 | Day | |

FOREIGN PATENT DOCUMENTS

| | | |
|---|---|---|
| EP | 0 864 958 A2 | 9/1998 |
| EP | 1197835 A2 | 4/2002 |
| JP | 07-104913 A | 4/1995 |
| JP | 07-168658 (A) | 7/1995 |
| JP | 2000-148358 (A) | 5/2000 |
| JP | 2000-267786 (A) | 9/2000 |
| JP | 2000-307705 A | 11/2000 |
| JP | 2002-157076 A | 5/2002 |
| JP | 2002-244791 (A) | 8/2002 |
| JP | 2002-358155 (A) | 12/2002 |
| JP | 2002-366277 A | 12/2002 |
| JP | 2003-296001 A | 10/2003 |
| JP | 2003-316500 A | 11/2003 |
| JP | 2004-125571 A | 4/2004 |
| JP | 2004-127088 A | 4/2004 |
| JP | 2004-171585 (A) | 6/2004 |
| JP | 2004-178043 (A) | 6/2004 |
| JP | 2004-206206 A | 7/2004 |
| JP | 2004-220536 A | 8/2004 |
| JP | 2004-348608 (A) | 12/2004 |
| JP | 2004-362316 (A) | 12/2004 |
| JP | 2005-055962 (A) | 3/2005 |
| JP | 2005-526303 (A) | 9/2005 |
| JP | 2006-178755 A | 7/2006 |
| KR | 10-2001-0037965 (A) | 5/2001 |
| KR | 10-2003-0009584 A | 2/2003 |
| KR | 10-2003-0036586 A | 5/2003 |
| KR | 20-0313336 Y1 | 5/2003 |
| KR | 10-2004-0036462 | 4/2004 |
| KR | 20-0351906 (Y1) | 5/2004 |
| KR | 10-2004-0068514 | 7/2004 |
| KR | 10-2005-0086364 | 8/2005 |
| KR | 10-2005-0091928 | 9/2005 |
| KR | 10-2005-0110329 A | 11/2005 |
| KR | 10-2005-0119878 | 12/2005 |
| KR | 10-2006-0024523 A | 3/2006 |
| KR | 10-2006-0119527 A | 11/2006 |
| KR | 10-2007-0050306 A | 5/2007 |
| WO | WO 00/31947 | 6/2000 |
| WO | WO 02/063455 A1 | 8/2002 |
| WO | WO 2004/072837 A1 | 8/2004 |
| WO | WO 2005064804 A1 | 7/2005 |

OTHER PUBLICATIONS

Office Action dated Nov. 14, 2011 for U.S. Appl. No. 12/551,349, filed Aug. 31, 2009, which is related to captioned U.S. Appl. No. 12/358,148.

Office Action dated Dec. 12, 2011 for U.S. Appl. No. 12/358,161, filed Jan. 22, 2009, which is related to captioned U.S. Appl. No. 12/358,148.

Japanese Office Action dated Dec. 6, 2011 for Japanese Patent Application No. JP 2009-523715 corresponding to U.S. Appl. No. 12/364,417, filed Feb. 2, 2009, which is related to captioned U.S. Appl. No. 12/358,148.

International Search Report dated Oct. 25, 2007 for International Application No. PCT/KR2007/003611 by the Korean Intellectual Property Office.

International Search Report dated Oct. 30, 2007 for International Application No. PCT/KR2007/003612 by the Korean Intellectual Property Office.

International Search Report dated Nov. 13, 2007 for International Application No. PCT/KR2007/003758 by the Korean Intellectual Property Office.

International Search Report dated Mar. 3, 2008 for International Application No. PCT/KR2007/005231 by the Korean Intellectual Property Office.

International Search Report dated Apr. 7, 2008 for International Application No. PCT/KR2007/006214 by the Korean Intellectual Property Office.

International Search Report dated Jul. 3, 2008 for International Application No. PCT/KR2008/001359 by the Korean Intellectual Property Office.

Extended European Search Report dated Mar. 17, 2011 for European Patent Application No. EP 08 723 396.1.

Extended European Search Report dated Mar. 21, 2011 for European Patent Application No. EP 07 793 270.5.

Written Opinion and Search Report dated Mar. 18, 2010 from the Hungarian Patent Office for Singapore Patent Application No. 2009-00489-6.

Office Action dated Jun. 27, 2011 for U.S. Appl. No. 12/358,161, filed Jan. 22, 2009, which is related to captioned U.S. Appl. No. 12/358,148.

Office Action dated Apr. 5, 2011 for U.S. Appl. No. 12/364,117, filed Feb. 2, 2009, which is related to captioned U.S. Appl. No. 12/358,148.

Office Action dated Oct. 24, 2011 for U.S. Appl. No. 12/364,117, filed Feb. 2, 2009, which is related to captioned U.S. Appl. No. 12/358,148.

Chinese Office Action dated Jun. 3, 2010 for Chinese Application No. 2007-80034435.6.

Japanese Office Action dated Sep. 6, 2011 for Japanese Patent Application No. JP 2009-521703.

* cited by examiner

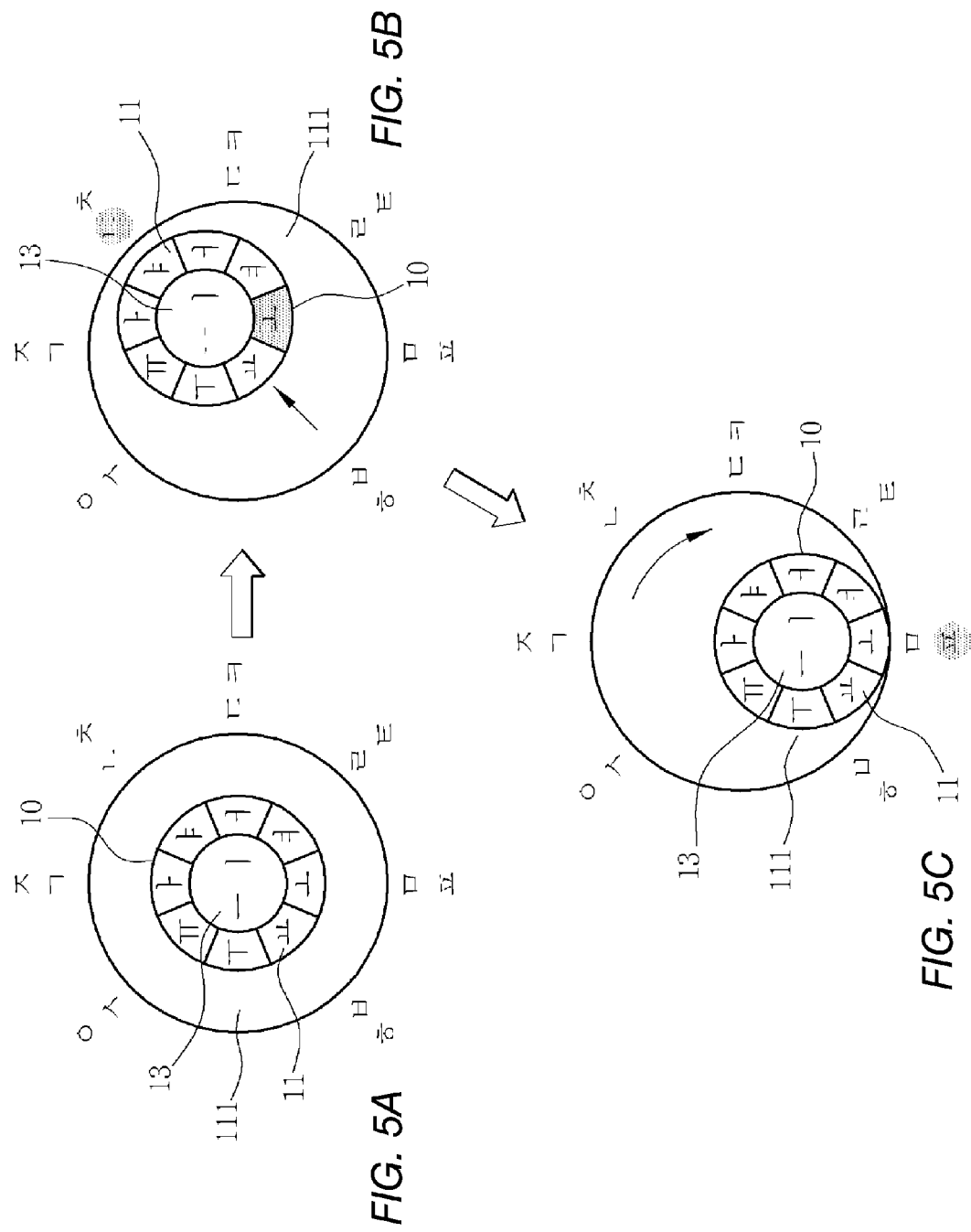

| $M1_1$ | $M1_2$ | $M1_3$ | $M1_4$ | $M1_5$ | $M1_6$ | $M1_7$ | $M1_8$ |
|---|---|---|---|---|---|---|---|
| ㄱ | ㄴ | ㄷ | ㄹ | ㅁ | ㅂ | ㅅ | ㅇ |
| B | C | D | F | G | H | J | K |
| が | さ | た | な | は | ま | ら | わ |
| 1 | 2 | 3 | 4 | 5 | 6 | 7 | 8 |
| $M2_1$ | $M2_2$ | $M2_3$ | $M2_4$ | $M2_5$ | $M2_6$ | $M2_7$ | $M2_8$ |
| ㅈ | ㅊ | ㅋ | ㅌ | ㅍ | ㅎ | ㅐ | ㅔ |
| L | M | N | P | Q | R | S | T |
|  |  |  |  |  |  |  |  |
| $P1_1$ | $P1_2$ | $P1_3$ | $P1_4$ | $P1_5$ | $P1_6$ | $P1_7$ | $P1_8$ |
| ㅏ | ㅑ | ㅓ | ㅕ | ㅗ | ㅛ | ㅜ | ㅠ |
| A | E | I | O | U | W | X | Y |
| あ | え | い | お | う | や | ゆ | よ |
| 9 | 0 | * | # | · | , | − | + |
|  |  |  |  |  |  |  |  |
| $P2_1$ | $P2_2$ | $P2_3$ | $P2_4$ | $P2_5$ | $P2_6$ | $P2_7$ | $P2_8$ |
| ㅡ | ㅣ | ㅒ | ㅖ | Enter | Space | Back Space | ESC |
| V | Z | CII | ING | Enter | Space | Back Space | ESC |
| " | ° |  | | Enter | Space | Back Space | ESC |
|  |  |  |  |  |  |  |  |
| $C1_1$ |  | $C2_1$ |  |  |  |  |  |
| Mode conversion |  | Mouse |  |  |  |  |  |

*FIG. 15*

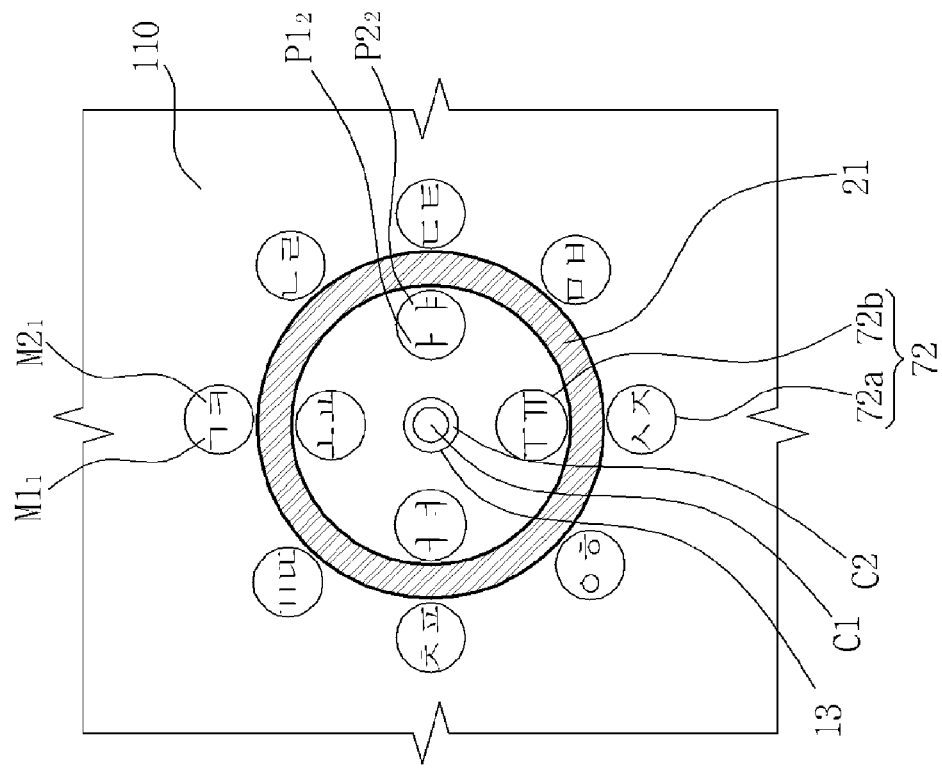
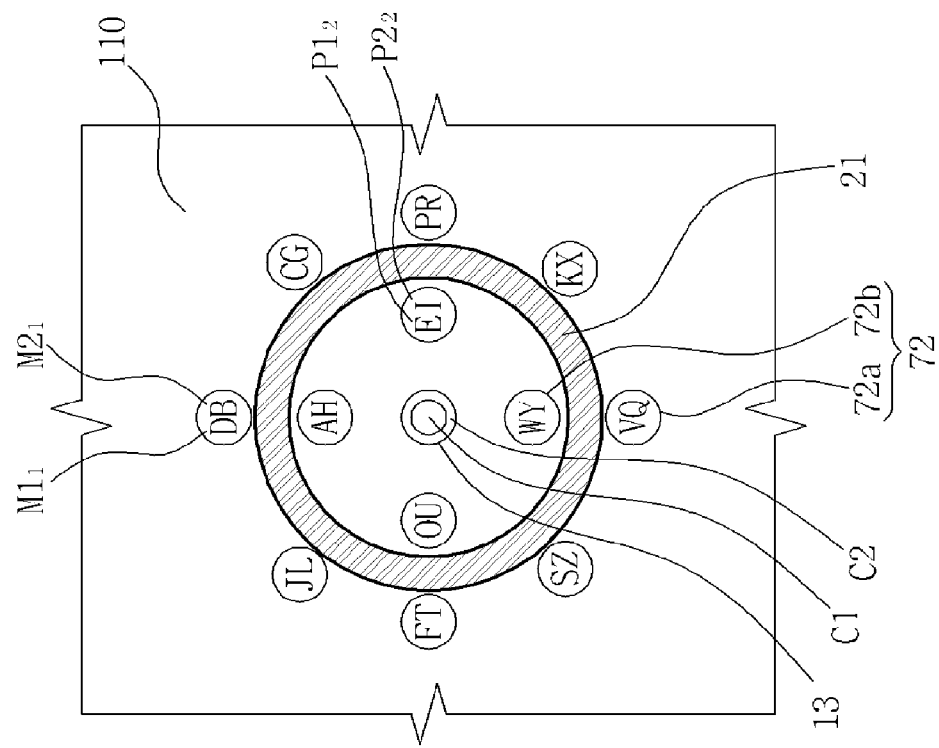

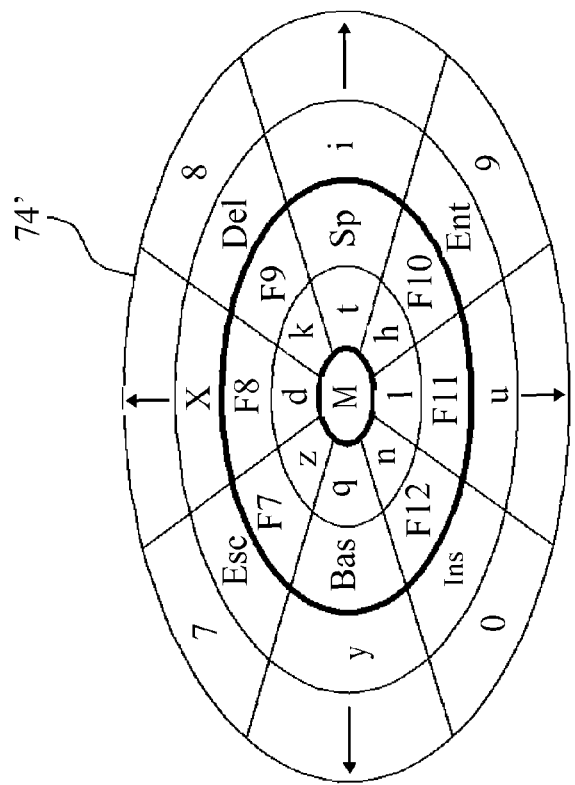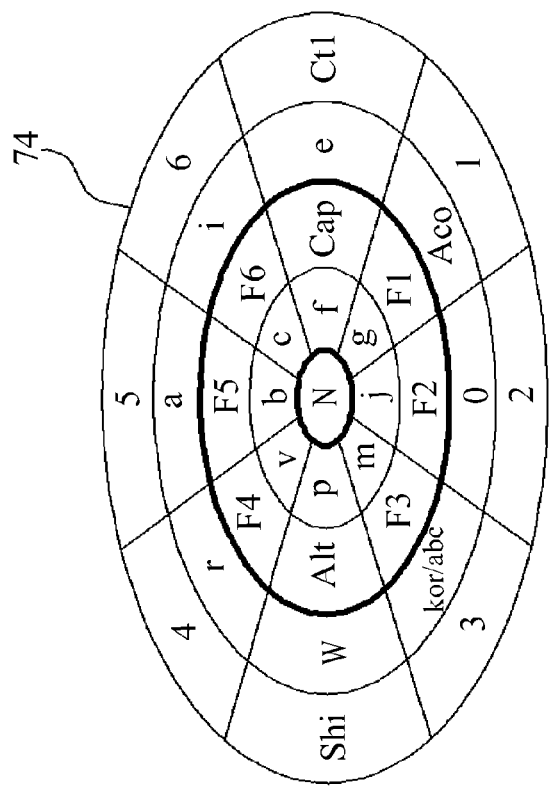
FIG. 31A

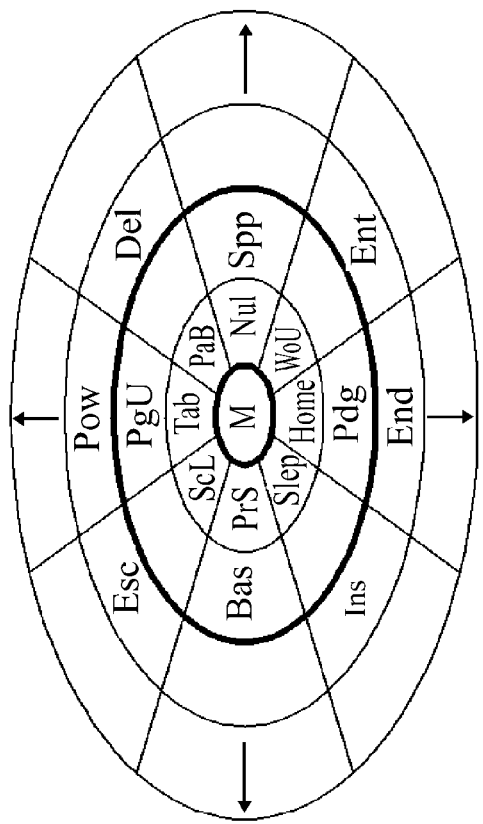
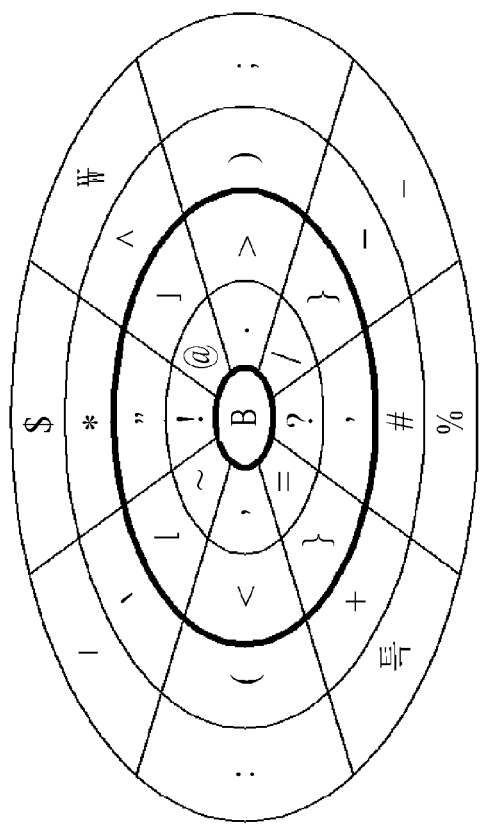
FIG. 31B

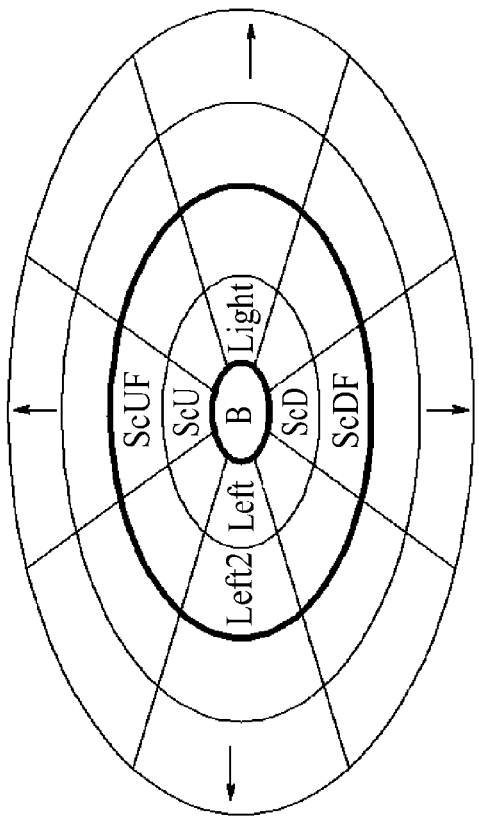
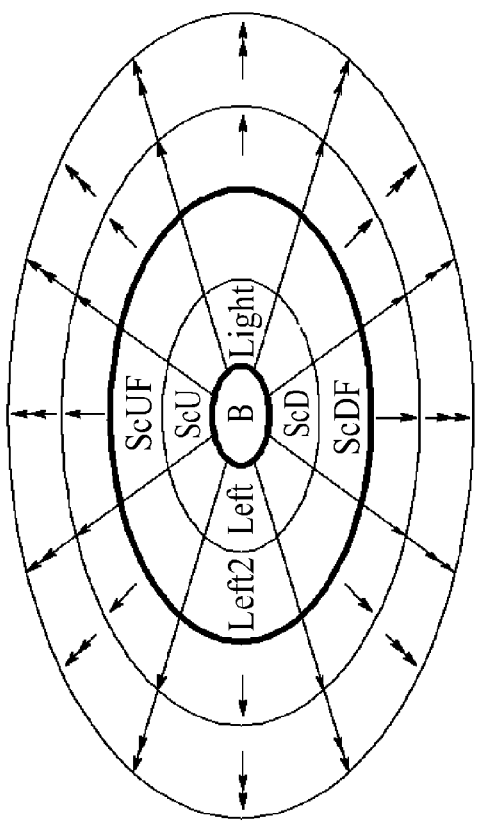
FIG. 31C

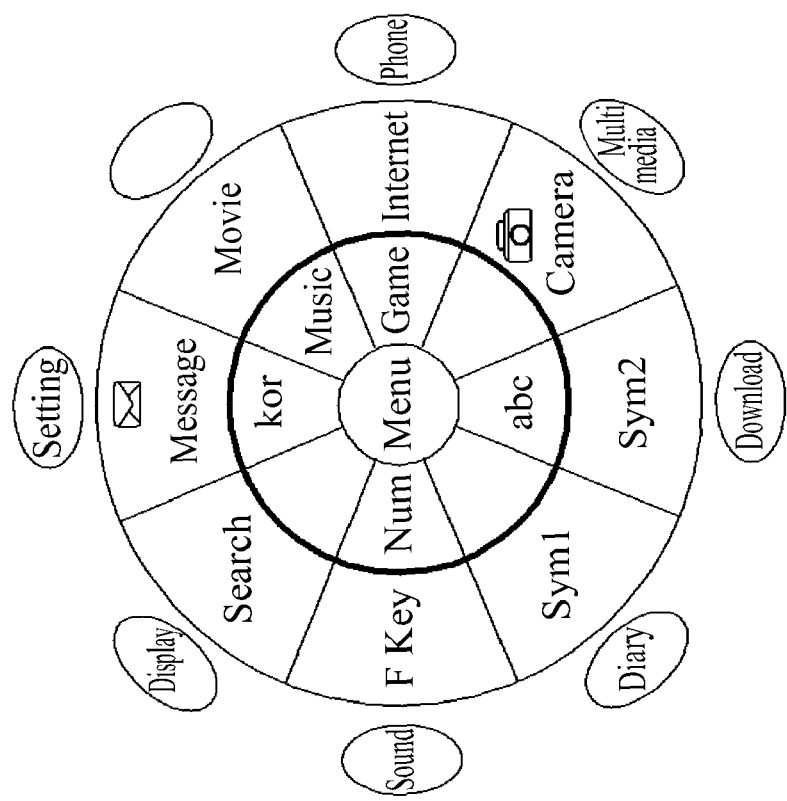
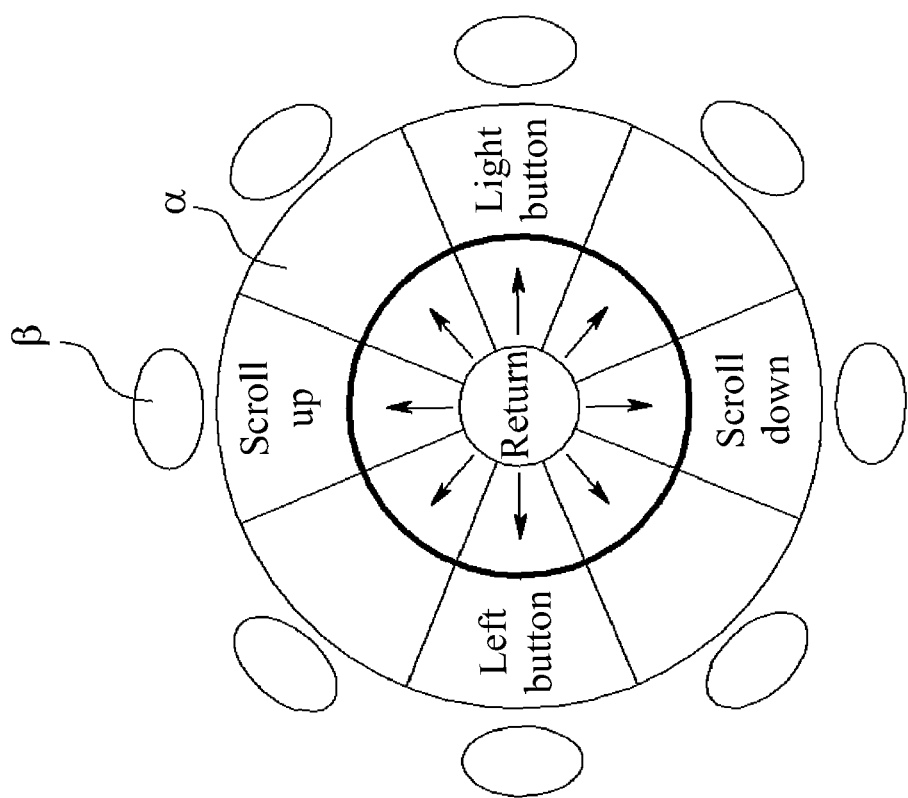
FIG. 32A

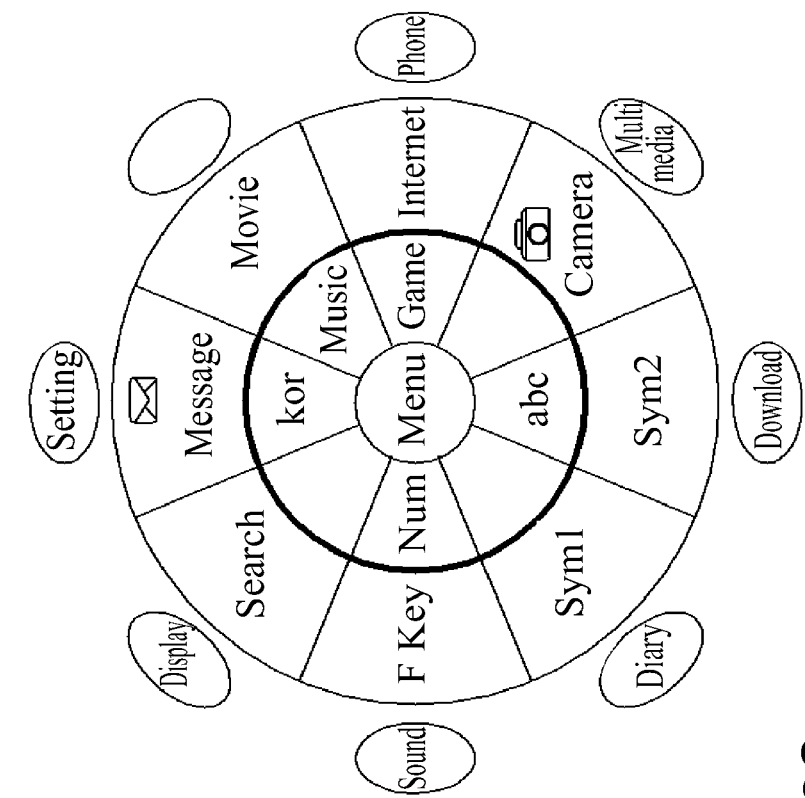
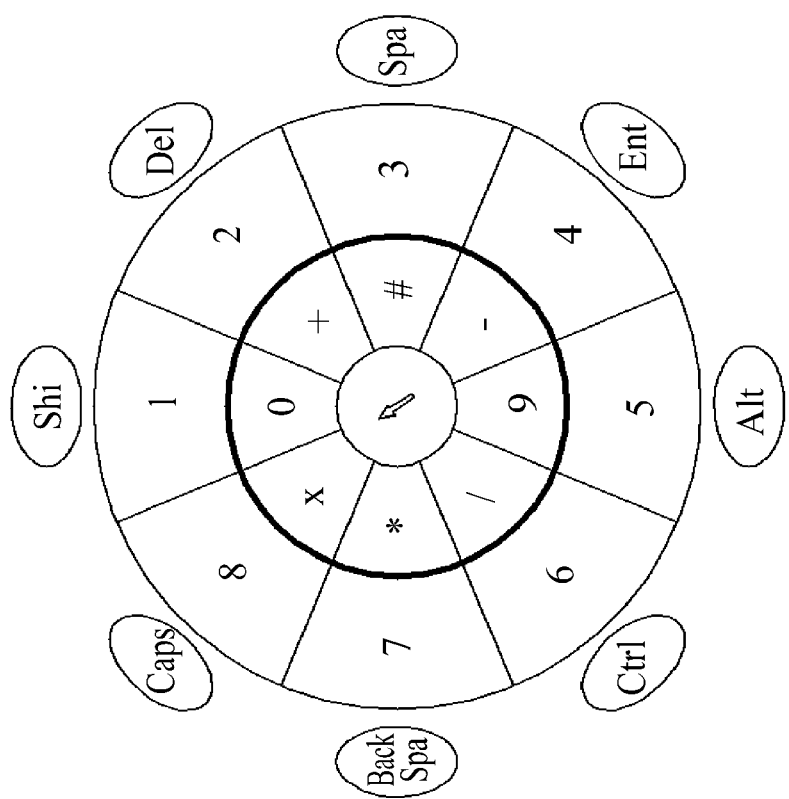
FIG. 32C

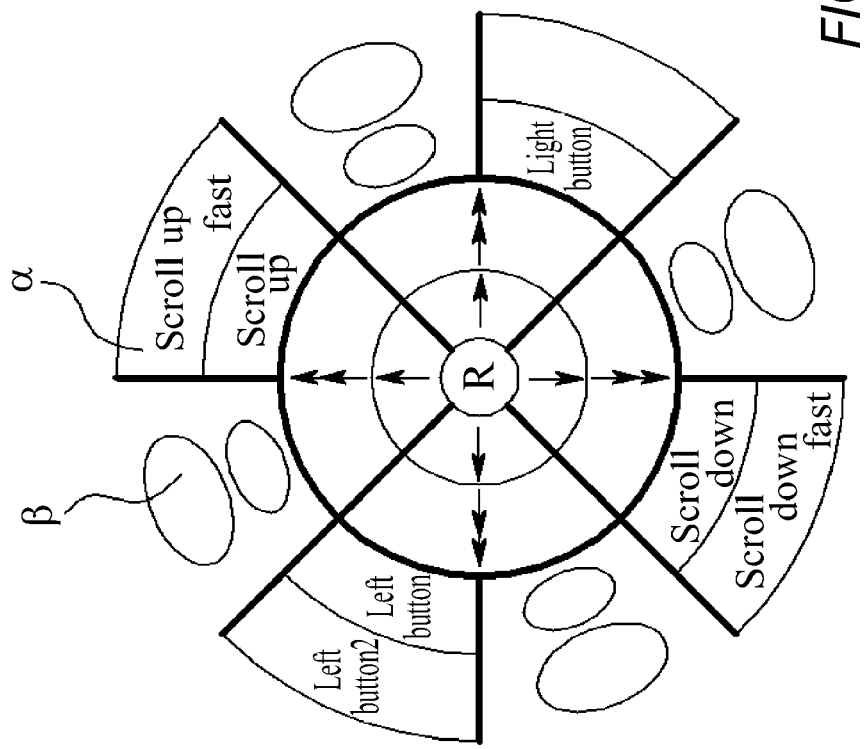
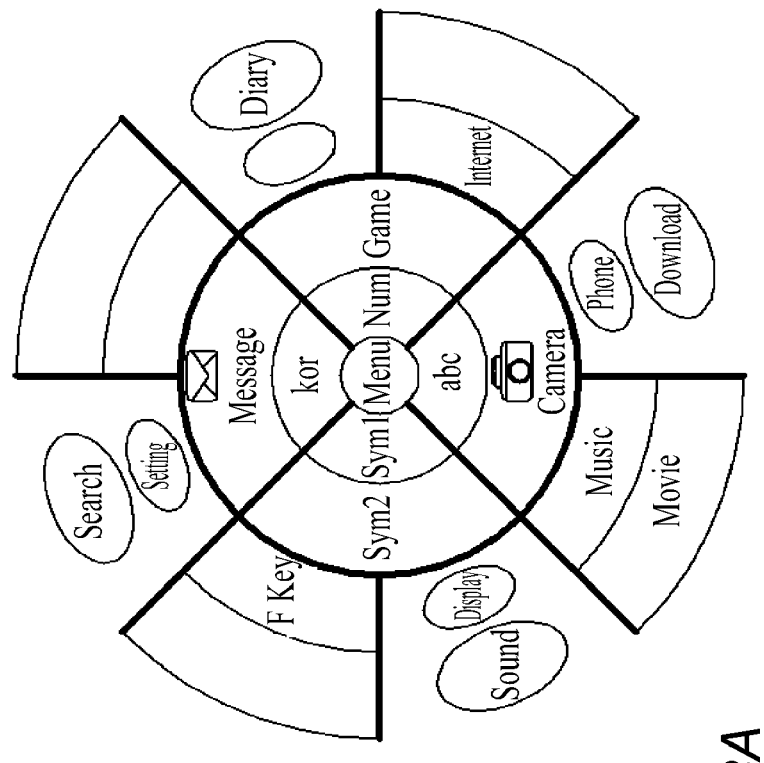
FIG. 33A

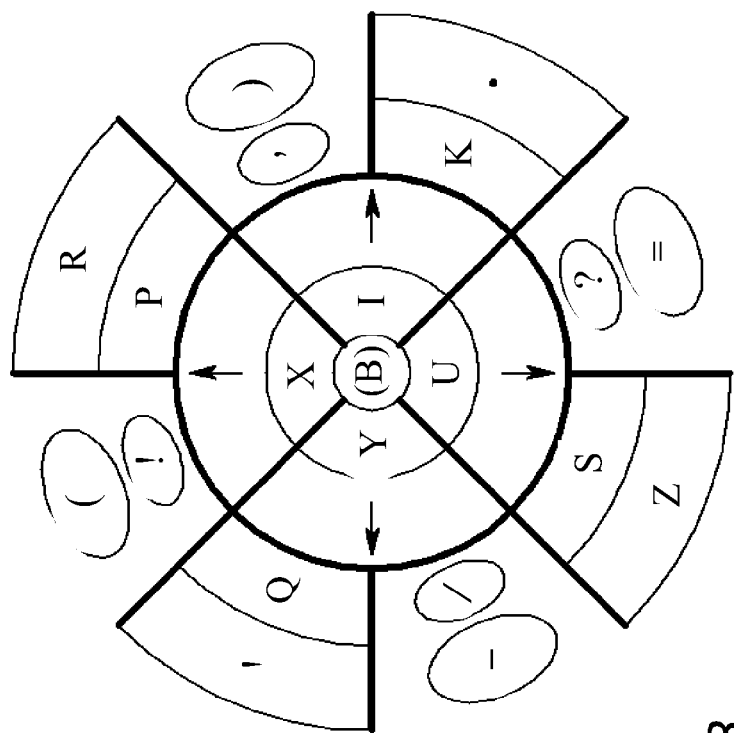
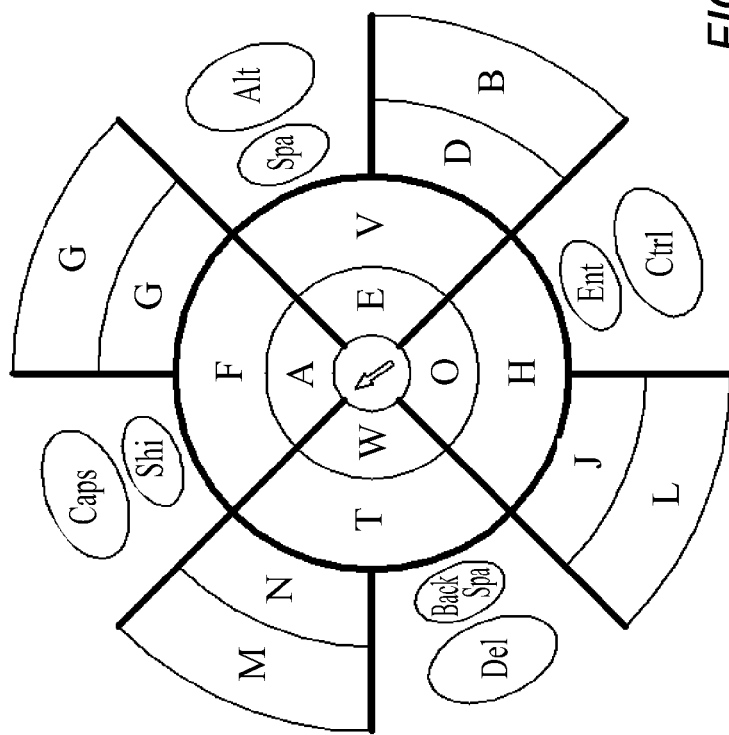
FIG. 33B

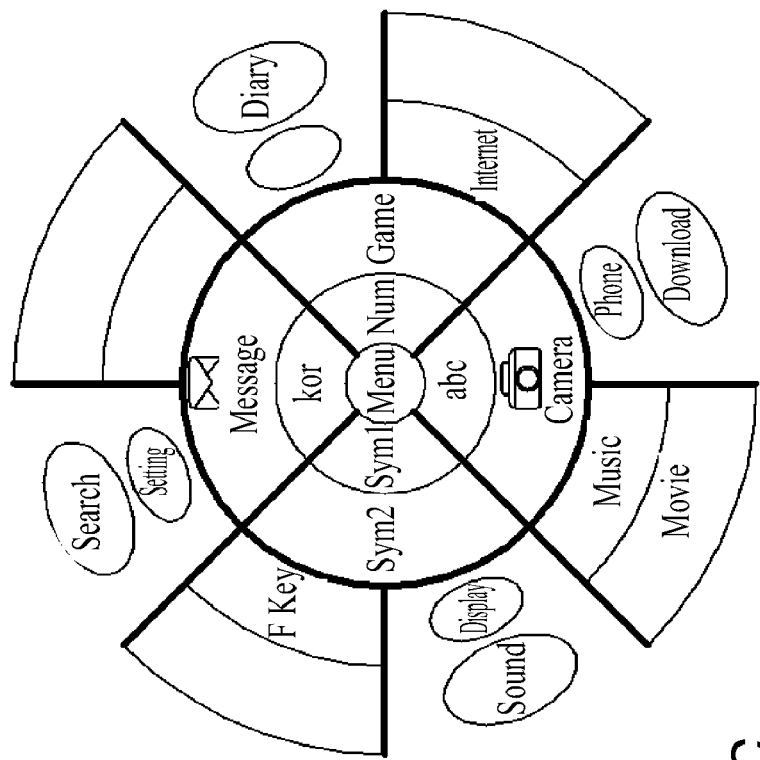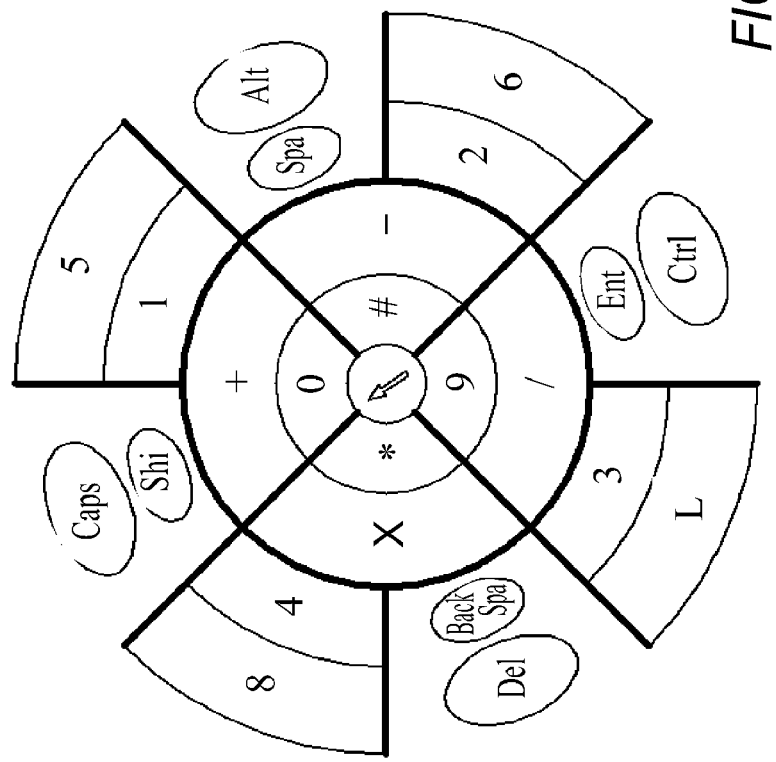
FIG. 33C

DATA INPUT DEVICE

RELATED APPLICATIONS

This application is a continuation application, and claims the benefit under 35 U.S.C. §§120 and 365 of PCT application No. PCT/KR2007/003611, filed on Jul. 26, 2007, which is hereby incorporated by reference.

This application also relates to U.S. patent applications Nos 12/358,161 filed on Jan. 22, 2009 and 12/364,417 filed on Feb. 2, 2009, which are incorporated by reference.

BACKGROUND OF THE INVENTION

1. Field of the Invention

The present invention relates to a character input device and its method, and in particular to a character input device and its method capable of maximizing the number of characters to be input through one-time input operation in a minimum input space and fast and accurately inputting one or more phonemes through the one-time input operation by simultaneously or sequentially performing a first direction input and a second direction input in one input unit.

2. Description of the Related Technology

As software and semiconductor technologies and information processing technology have recently been developed, information devices are tending toward miniaturization. Therefore, in various information devices, the importance of the character input has gradually been increased.

SUMMARY OF CERTAIN INVENTIVE ASPECTS

One aspect of the present invention is a character input device which comprises a new input unit for performing a first direction input and a second direction input independently or in combination, so that a space required for inputting characters and others is minimized and all desired characters are fast and accurately input through one-time input operation, and which maximizes the number of keys capable of being arranged in a predetermined space through a multi-level input function and a two-set configuration, so that all input functions of a keyboard and an input function of a mouse, which are used in a desktop PC, can be also fast and easily performed in a portable terminal.

Another aspect of the present invention is a character input device capable of input one or more phonemes through one-time input operation by adding various input methods or combining them, in addition to the first direction input and the second direction input.

Another aspect of the present invention is a character input device comprising: a base; an input unit provided at the base to allow each of a first direction input M and a second direction input P to be independently performed, the first direction input M is performed by moving the input unit from a reference position S to any one of a plurality of first direction indication positions $M_1, M_2, \ldots$ spaced and arranged radially from the reference position S within a predetermined input area, and the second direction input P is performed by selecting any one of a plurality of second direction indication positions $P_1, P_2, \ldots$ spaced and arranged radially in the input unit itself; a first sensing unit for sensing the movement of the input unit; a second sensing unit for sensing the second direction input P; and a control unit for extracting and running a first character or a second character from a memory unit, the first character being assigned to each of the first direction indication positions $M_1, M_2, \ldots$ in which the movement of the input unit is sensed, or the second character being assigned to each of the second direction indication positions $P_1, P_2, \ldots$ in which the second direction input P is sensed.

The first direction input M may be performed by sliding-moving the input unit from the reference position S toward each first direction indication position $M_1, M_2, \ldots$ The first direction input M may be performed by tilting-moving the input unit toward any one of the first direction indication positions $M_1, M_2, \ldots$.

The second direction input P may be performed by tilting the input unit toward any one of the plurality of second direction indication positions $P_1, P_2, \ldots$.

The second direction input P may be performed by selecting any one of press units positioned on the input unit, corresponding to each second direction indication position $P_1, P_2, \ldots$.

One or more of the first direction input M or the second direction input P may be performed multi-level input of two or more levels.

A central input C may be performed by one or more of the select of a central input key positioned in the center of the input unit or the rise and fall of the input unit with respect to the base.

The central input C is capable of performing multi-level input of two or more levels.

Here, a new data different from a character originally assigned to each direction indication position may be input by performing central combination input CM and CP in which the central input C is simultaneously performed with any one of the first direction input M and the second direction input P.

A direction combination input MP and PM for inputting a third character assigned to the input operation can be performed when in a state where any one of the first direction input M and the second direction input P is first performed, the other is subsequently performed.

In each of the aforementioned exemplary embodiments, two or more input units 10 may be positioned on the base.

The character input device may further include a transceiving unit connected to an external device by one or more manner of a wire manner or a wireless manner so that the character input device 1 be attachable to or detachable from the external device.

Another aspect of the invention is a character input device comprising; a base; two input units positioned at the base to allow each of first direction input M and second direction input P to be performed as multi-level input of two or more levels, the first direction input M being performed by moving the input unit from each reference position S to any one of four first direction indication positions $M_1, M_2, \ldots$ spaced and arranged radially from the reference position S and the second direction input P being performed by selecting any one of four second direction indication positions $P_1, P_2, \ldots$ spaced and arranged radially in the input unit itself; a first sensing unit for sensing the first direction input M; a second sensing unit for sensing the second direction input P; and a control unit for extracting a first character or a second character from a memory unit, the first character being assigned to the first direction indication position $M_1, M_2, \ldots$ in which the movement of the input unit is sensed, and the second character being assigned to the second direction indication position $P_1, P_2, \ldots$ in which the second direction input P is sensed.

Another aspect of the invention is a character input device comprising; a base; two input units positioned at the base to allow a first direction input M and a second direction input P to be performed, the first direction input M being performed by moving the input unit from each reference position S to any one of eight first direction indication positions $M_1, M_2, \ldots$ spaced and arranged radially from the reference position S and the second direction input P being performed by selecting any one of four second direction indication positions $P_1$, $P_2$, . . . spaced and arranged radially in the input unit itself; a first sensing unit for sensing the first direction input M; a second sensing unit for sensing the second direction input P; and a control unit for extracting a first character or a second character from a memory unit, the first character being assigned to the first direction indication position $M_1$, $M_2$, . . . in which the movement of the input unit is sensed, and the second character being assigned to the second direction indication position $P_1$, $P_2$, . . . in which the second direction input P is sensed.

Another aspect of the invention is a character input device comprising; a base; two input units positioned at the base to allow a first direction input M and a second direction input P to be performed, the first direction input M being performed by moving the input unit from each reference position S to any one of four first direction indication positions $M_1$, $M_2$, . . . spaced and arranged radially from the reference position S and the second direction input P being performed by selecting any one of eight second direction indication positions $P_1$, $P_2$, . . . spaced and arranged radially in the input unit itself; a first sensing unit for sensing the first direction input M; a second sensing unit 63 for sensing the second direction input P; and a control unit for extracting a first character or a second character from a memory unit, the first character being assigned to the first direction indication position $M_1$, $M_2$, . . . in which the movement of the input unit is sensed, and the second character being assigned to the second direction indication position $P_1$, $P_2$, . . . in which the second direction input P is sensed.

Here, one or more of the first direction input M and the second direction input P are capable of performing the multi-level input of two or more levels.

Another aspect of the invention is a character input device comprising; a base; an input unit positioned at the base to allow each of first direction input M and second direction input P to be independently performed, the first direction input M being performed by sliding the input unit from a reference position S to any one of a plurality of first direction indication positions $M_1$, $M_2$, . . . spaced and arranged radially from the reference position S within a predetermined input area and the second direction input P being performed by selecting any one of press units positioned at the input unit, corresponding to a plurality of second direction indication positions $P_1$, $P_2$, . . . spaced and arranged radially in the input unit itself; a first sensing unit for sensing the movement of the input unit; a second sensing unit for sensing the selection of the press unit; and a control unit for extracting and inputting a first character assigned to a corresponding first direction position a second character assigned to a corresponding second direction position from a memory unit based on the sensing results of the first sensing unit and the second sensing unit.

Another aspect of the invention is a character input device comprising; a base; an input unit positioned at the base to allow each of first direction input M and second direction input P to be independently performed, the first direction input M being performed by sliding the input unit from a reference position S to any one of a plurality of first direction indication positions $M_1$, $M_2$, . . . spaced and arranged radially from the reference position S within a predetermined input area and the second direction input P being performed by tilting the input unit toward any one of a plurality of second direction indication positions $P_1$, $P_2$, . . . spaced and arranged radially in the input unit itself; a first sensing unit for sensing the movement of the input unit; a second sensing unit for sensing the tilting of the input unit; and a control unit for extracting and inputting a first character assigned to a corresponding first direction position a second character assigned to a corresponding second direction position from a memory unit based on the sensing results of the first sensing unit and the second sensing unit.

Another aspect of the invention is a character input device comprising; a base; an input unit positioned at the base to allow each of first direction input M and second direction input P to be independently performed, the first direction input M being performed by sliding the input unit from a reference position S to any one of a plurality of first direction indication positions $M_1$, $M_2$, . . . spaced and arranged radially from the reference position S within a predetermined input area and the second direction input P being performed by tilting-moving the whole of the input unit toward any one of a plurality of second direction indication positions $P_1$, $P_2$, . . . spaced and arranged radially in the input unit 10 itself; a supporting unit positioned between the input unit and the base, slid simultaneously with the input unit and supporting the tilting-moving of the input unit; a first sensing unit for sensing the movement of the input unit; a second sensing unit for sensing the tilting-moving of the input unit; and a control unit for extracting and inputting a first character assigned to a corresponding first direction position a second character assigned to a corresponding second direction position from a memory unit based on the sensing results of the first sensing unit and the second sensing unit.

Another aspect of the invention is a character input device comprising; a base; an input unit positioned at the base to allow each of first direction input M and second direction input P to be independently performed, the first direction input M being performed by tilting-moving the whole of the input unit from a reference position S to any one of a plurality of first direction indication positions $M_1$, $M_2$, . . . spaced and arranged radially from the reference position S and the second direction input P being performed by tilting the input unit toward any one of a plurality of second direction indication positions $P_1$, $P_2$, . . . spaced and arranged radially in the input unit itself; a supporting unit positioned between the input unit and the base and supporting the tilting-moving of the input unit; a first sensing unit for sensing the tilting-moving of the input unit; a second sensing unit for sensing the tilting of the input unit; and a control unit for extracting and inputting a first character assigned to a corresponding first direction position a second character assigned to a corresponding second direction position from a memory unit based on the sensing results of the first sensing unit 61 and the second sensing unit.

Another aspect of the invention is a character input method of a character input device comprising an input allowing each of first direction input M and second direction input M to be independently performed, the first direction input M being performed by moving the input unit to any one of a plurality of first direction indication positions $M_1$, $M_2$, . . . spaced and arranged radially, centering on the reference position S within a predetermined input area and the second direction input P being performed by selecting any one of a plurality of second direction indication positions $P_1$, $P_2$, . . . spaced and arranged radially in the input unit itself, comprising the steps of: storing character set in which first characters are dividedly assigned to each first direction indication position $M_1$, $M_2$, . . . and second characters are dividedly assigned to each second direction indication position $P_1$, $P_2$, . . . in a memory unit; sensing the first direction input M and the second direction input P; extracting the first character or the second character corresponding to a corresponding direction indication position from the character set based on the sensing signal; and processing input of the extracted first character or second character.

BRIEF DESCRIPTION OF THE DRAWINGS

FIG. 5 is a view illustrating movement of the input unit along a radial direction and along a circumference direction.

FIG. 15 is a table illustrating an example of character arrangement for language of each country assigned to each input operation in the character input device.

FIGS. 16 through 18 are views of main parts of a character input device according to each of various embodiments of the present invention.

FIGS. 29 through 33 are plan views illustrating a key display unit according to various embodiments of the present invention.

DETAILED DESCRIPTION OF CERTAIN INVENTIVE EMBODIMENTS

Figure 1:
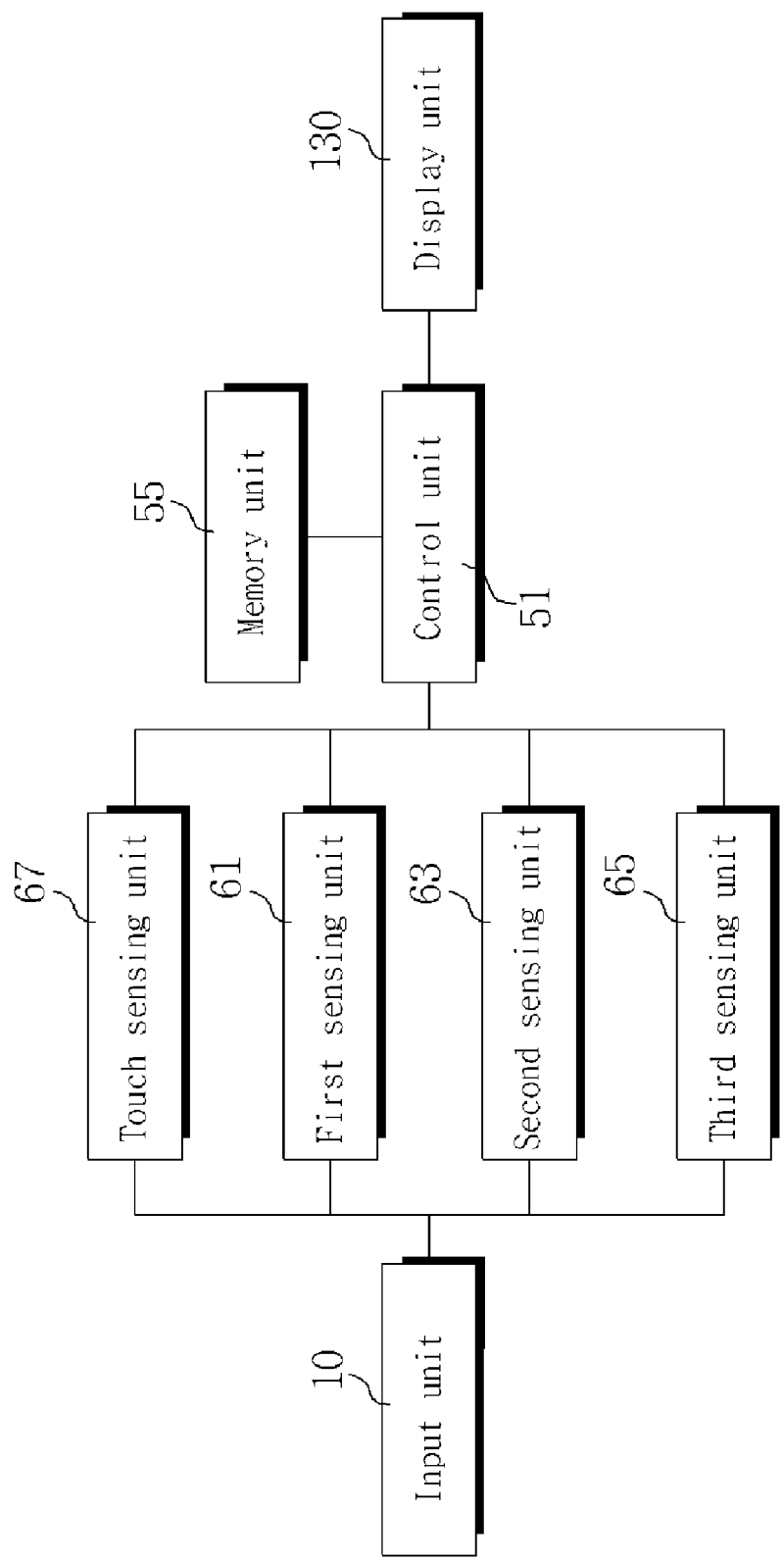
FIG. 1 is a block diagram of a character input device according to one embodiment of the present invention.

Current information devices have many problems in inputting various characters or commands.

For example, since an input device, such as a keyboard used in a personal computer (PC) or a notebook, is restrictive in reducing its size, it is difficult to miniaturize the information devices.

Moreover, since a touch screen mode used in a personal data assistant (PDA) or a keypad mode used in a cellular phone is slow in input speed or makes inaccurate input, it causes a lot of inconvenience.

To input characters, numbers or symbols in the information devices, such as the aforementioned PC, notebook, PDA or cellular phone, at faster speed, it is necessary to perform one-time operation one phoneme input that one phoneme (character) is input through the one-time input operation.

To input the Korean alphabet (HanGeul) by one-time operation one phoneme input, buttons or input keys to input more than twenty-four characters should be arranged on an information device.

When the language to be input is English, Japanese or another foreign language, it may need much more buttons or input keys than those for HanGeul.

As a portable terminal gradually realizes the performance of a desktop PC, the portable terminal needs to perform all input functions of the keyboard including various command keys (enter key, space key, shift key and others), Function key, symbols and so on, in addition to the function of inputting characters.

However, a conventional input device used in various information devices is a manner assigning characters to each input key and inputting them by beating or pressing the input keys using fingers.

Accordingly, in a portable personal information terminal such as the cellular phone in which a space arranged with the input keys is relatively narrow, it is difficult to arrange more than twenty-four input keys in finger size. This is a reason that it was difficult to miniaturize the keyboard up to now.

Particularly, in the case of the cellular phone, since more than twenty-four HanGeul characters are to be input using generally twelve buttons, a number of characters on one button are overlappedly arranged.

Therefore, it is necessary to repeatedly press one button two or three times, in order to input one character (phoneme). Consequently, an input time is longer and typographical errors frequently occur.

Moreover, since a method of inputting characters is very complicated, it takes a long time for a user to easily use the method.

To solve the aforementioned problems, as for the HanGeul character input, there has been suggested a method of inputting characters by combining predetermined characters, such as so-called 'Cheon, Ji, In'.

In this method, since desired characters are generated by combining basic characters, the number of input buttons to which characters are assigned is reduced. However, since it is necessary to repeatedly press the input buttons until the desired characters are combined, the input time is longer as much.

In addition, there has been suggested a technique such as a keyboard capable of being carried with being rolled up or a virtual laser keyboard performing the input by projecting an image of the keyboard onto a flat part and then sensing the positions of fingers when a user takes action such as pressing keys of the keyboard on the image using its fingers.

However, this kind of input device has inconvenience that it needs to be carried. Also, the input can be performed only when the input device is placed on the flat part so that this input device is not suitable to be applied to a portable personal information terminal that can perform an input operation with being held by hand(s) while a user is moving.

Hereinafter, the constructions and embodiments of a character input device according to embodiments of the present invention will be described in detail per each input operation with reference to accompanying drawings.

First Direction Input M

In one embodiment of the present application, the first direction input M means that an input unit 10 moves to any one of a plurality of first direction indication positions $M_1$, $M_2$, ... spaced and arranged radially from a reference position S and inputs characters assigned to each of the first direction indication positions $M_1$, $M_2$, ....

Figure 2:
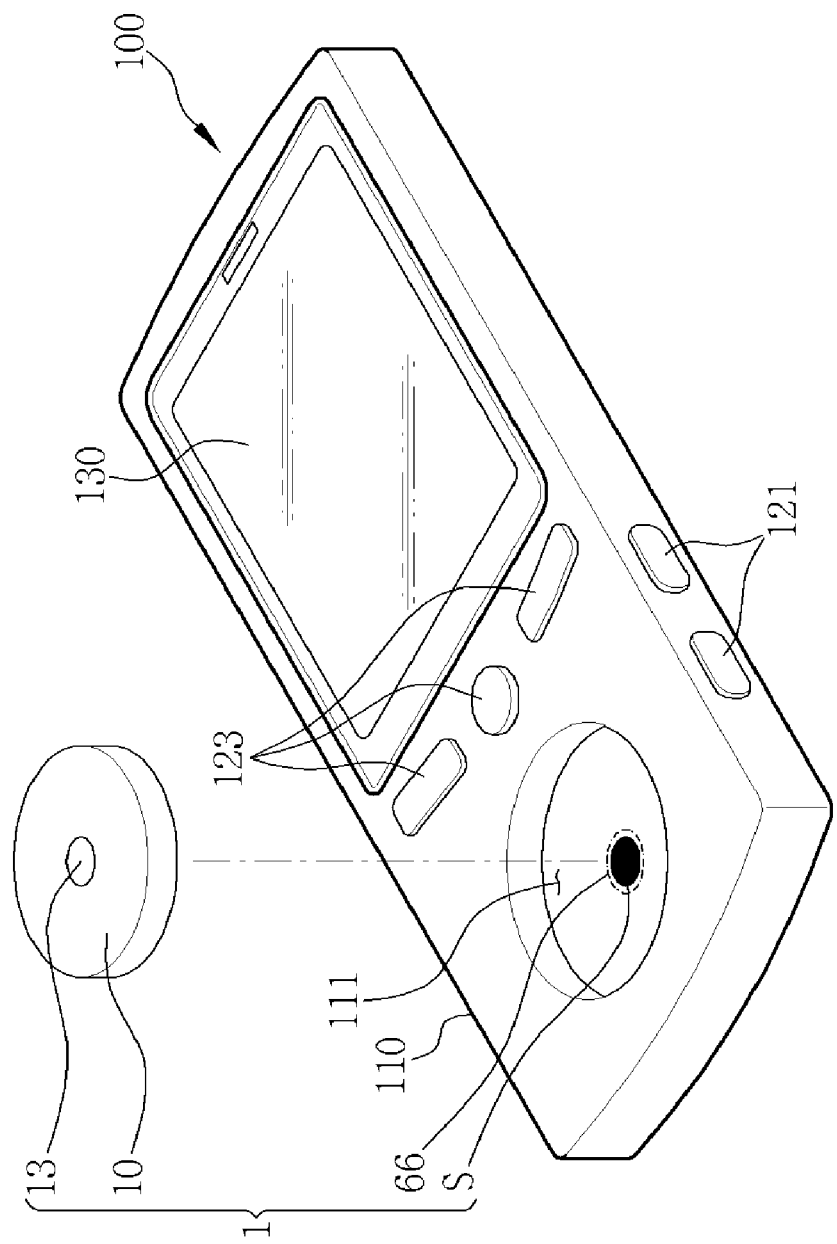
FIG. 2 is a perspective view of a portable mobile communication terminal including the character input device according to one embodiment of the present invention.
Figure 3:
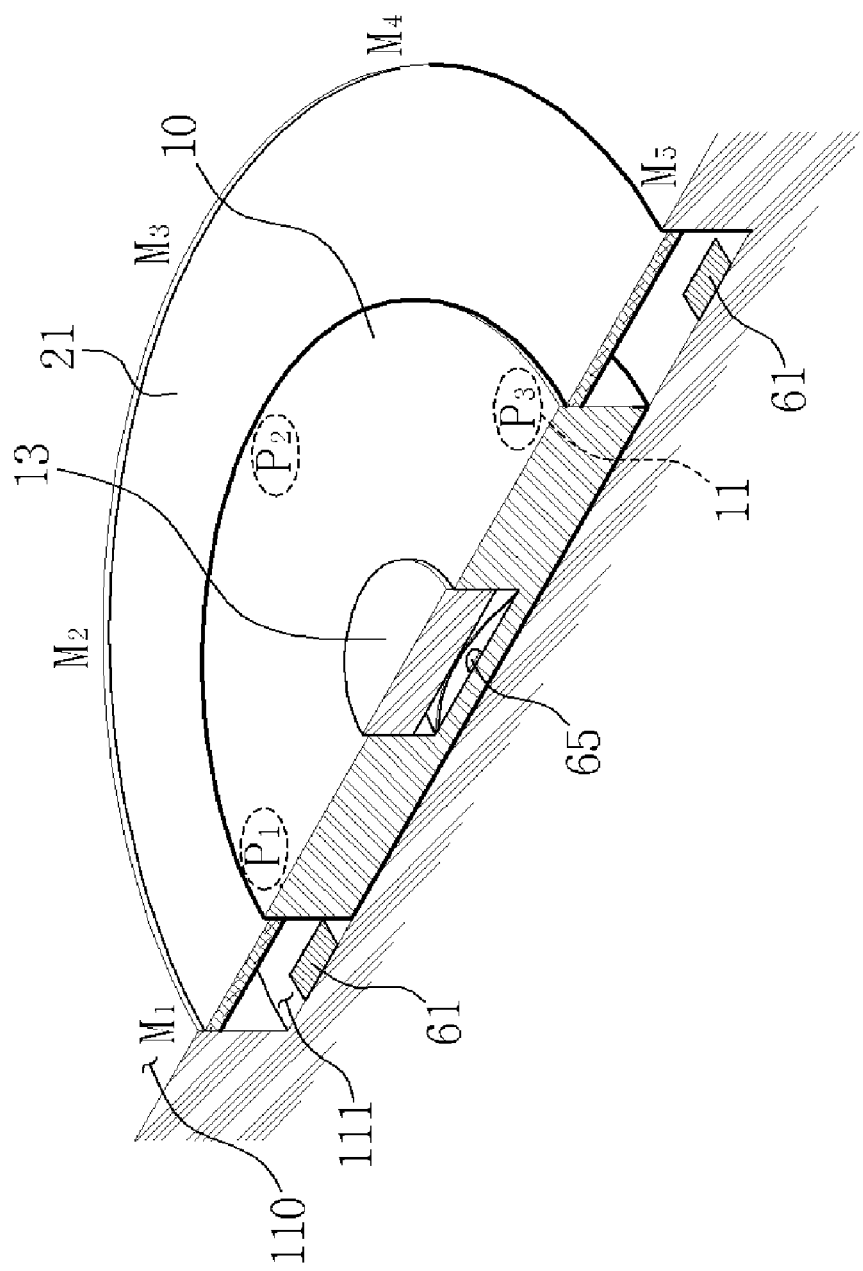
FIG. 3 is a sectional perspective view of a character input device according to an embodiment of the present invention.

FIG. 3 is a coupling sectional view of the input unit 10 and the base 110 according to one embodiment of the present invention as illustrated in FIG. 2.

Referring to these drawings, the reference position S (see FIG. 2) is positioned at one side of an input area 111 on the base 110. A plurality of first direction indication positions $M_1$, $M_2$, ... are spaced and arranged radially from the reference position S.

In the base 110, a first sensing unit 61 for sensing the movement of the input unit 10 corresponding to each of the first direction indication positions $M_1$, $M_2$, ..., is provided.

Accordingly, when the input unit 10 moves from the reference position S to any of the first direction indication positions $M_1$, $M_2$, ..., a control unit 51 extracts a first character assigned to the corresponding one of the first direction indication positions $M_1$, $M_2$, ... from a memory unit 55 and inputs the first character, on the basis of a sensing signal of the first sensing unit 61 sensing the movement of the input unit 10.

Various kinds of the first sensing units 61 may be provided. That is, the first sensing unit 61 may be, for example, a pressure sensor, an optical sensor or a contact sensor. Alternatively, the first sensing unit 61 may be, for example, a touch pad or a touch screen provided over the whole input area 111, and be provided in a track pointer method.

A number of first direction indication positions $M_1$, $M_2$, ... may be provided, if necessary. That is, the number of the first direction indication positions $M_1$, $M_2$, ... may be eight $M_1$ to $M_8$ as illustrated in FIG. 3, but may be four or six.

The first direction input M may be performed in various methods. For example, the first direction input M may be performed by sliding (or horizontal movement, refer to FIG. 4(b)) the input unit 10 positioned at the reference position S (refer to FIG. 4(a)) toward a predetermined first direction position $M_5$ (refer to FIG. 4(b)).

The sliding or horizontal movement is not limited to the exact horizontality to a bottom surface of the base 110 but the sliding or horizontal movement includes all possible angles and directions from the reference position S toward the first direction indication positions $M_1$, $M_2$, ....

In this case, the input unit 10 can perform the first direction input M by being moved along a radial direction from the reference position S, as well as by being slid along the circumferential direction from the reference position S within the input area 111 as shown in FIG. 5(c).

FIG. 5 illustrates an example in which HanGeul characters (one syllable), '술' are input. To input '술' the input unit 10 slides from the reference position S toward the first direction indication positions $M_1$, $M_2$, ... to which 'ㄴ' is assigned (refer to FIG. 5(b)) and then moves along the circumferential direction to input 'ㅍ' (refer to FIG. 5(c)).

A second direction input P and the input of a vowel character 'ㅗ' will be described later.

In the aforementioned example, when the input unit 10 moves along the circumferential direction, the movement of the input unit 10 is sensed by a plurality of the first sensing units 61. In this case, the control unit 51 determines that only the sensing signal of the first sensing unit 61 finally sensing the movement of the input unit 10 is effective.

For example, when the input unit 10 returns to the reference position S, reset signal can be generated, then the control unit 51 may determine that only the sensing signal of the first sensing unit 61 generated just before the generation of the reset signal is effective.

Alternatively, when the signals of the same kind are off by the input operation of the input unit 10, the control unit 51 may determine that only the final signal among the sensing signals of the same kind subsequently generated is effective.

That is, when the input unit 10 moves along the circumferential direction to generate a plurality of sensing signals belonging to the first direction input M and subsequently (that is, without returning to the reference position S) performs a central input C or the second direction input P to generate the sensing signals of different kinds, only the first direction input M just before being changed into the central input C or the second direction input P is effectively input.

In later case, even though the input unit 10 returns to the reference position S not to generate the reset signal, the effective signal among a plurality of sensing signals can be determined.

Alternatively, various functional commands may be input by the movement of the input unit 10 along the circumferential direction. For example, when the input unit 10 moves along the circumferential direction counterclockwise, a cancel command may be input, and when the input unit 10 moves along the circumferential direction clockwise, a space command may be input.

Further, as illustrated in FIG. 4, a supporting unit 25 supporting the movement of the input unit 10 may be provided between the input unit 10 and the base 110.

Figure 10A:
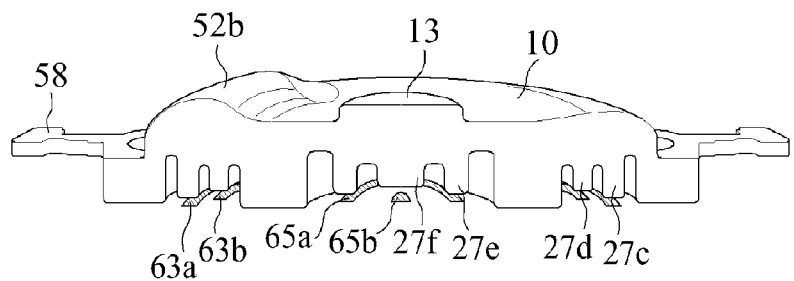
FIG. 10 is a perspective view and a sectional view of an input unit according to each of various embodiments of the present invention.
Figure 10B:
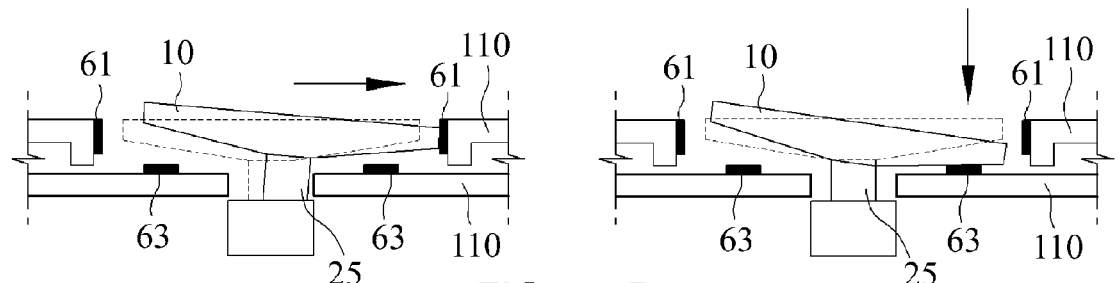

On the other hand, the first direction input M may be performed by allowing the input unit 10 to tilt toward any one of the first direction indication positions $M_1$, $M_2$, ..., as illustrated in FIG. 10(b).

In this case, the supporting unit 25 that supports the input unit 10 so as to be spaced apart at a predetermined height from the base 110 may be further included.

The operation form of the input unit 10 for the first direction input M is not limited to the aforementioned form. The input unit 10 may be made of a material partially or totally deformable by external pressure, so that a deformed direction of the input unit 10 can be sensed upon the input operation.

Alternatively, a sensing unit (for example, touch pad or touch screen) for sensing the movement of finger may be provided instead of the embodied input unit 10, thereby making it possible to perform the first direction input M.

Further, a guide unit 40 guiding the movement of the input unit 10 may be further provided on the base 110. The guide unit 40 allows the input unit 10 to move in an accurate direction as a user intends, so that a correct input is performed without generating any interference upon the first direction input M.

Various kinds of the guide units 40 may be provided. For example, the guide unit 40 may be a straight guide that is formed in a predetermined shape of groove on the base 110, wherein the guide is progressed from the reference position S toward each of the first direction indication positions $M_1$, $M_2$, . . . .

Alternatively, as illustrated in FIG. 2, a groove in a disk shape corresponding to the input area 111 is formed on the base 110 to be able to restrict the movement distance of the input unit 10 along the radial direction and at the same time, to guide the movement of the input unit 10 along the circumferential direction.

Alternatively, as illustrated in FIG. 9, the guide unit may be provided in concave grooves corresponding to each of the first direction indication positions $M_1$, $M_2$, . . . .

Figures 9A, 9B:
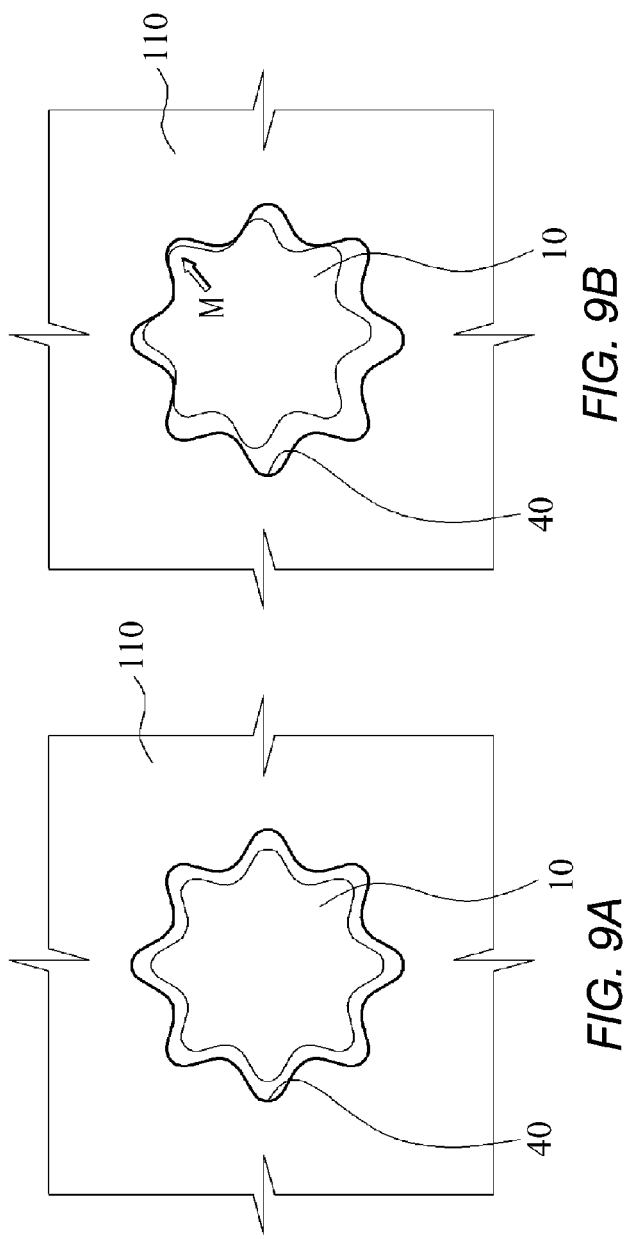
FIG. 9 is a plan view illustrating the input unit and a guide unit according to one embodiment of the present invention.

In this case, the input unit 10 may be provided in the shape corresponding to the guide unit 40. Thus, as illustrated in FIG. 9(b), when the input unit 10 performs the first direction input M, although the user moves the input unit 10 in an inaccurate direction, the input unit 10 is able to move to any of the first direction indication positions $M_1$, $M_2$, . . . , along the guide unit 40.

The guide unit 40 may be made of various materials, for example, an elastic material.

Further, the first direction input M is capable of performing multi-level input of two or more levels, depending on a difference in the movement distance of the input unit 10 or strength in the movement pressure thereof.

That is, as illustrated in FIG. 3, when the first direction input M is performed through the horizontal movement (or sliding) of the input unit 10, two or more first sensing units 61 may be provided on the movement path of the input unit 10 from the reference position S toward each of the first direction indication positions $M_1$, $M_2$, . . . .

Alternatively, contact units 27a and 27b projected to have different lengths toward the first sensing unit 61 may be further provided in any one of the input unit 10 or an elastic member 21 positioned under the input unit 10.

Figure 6:
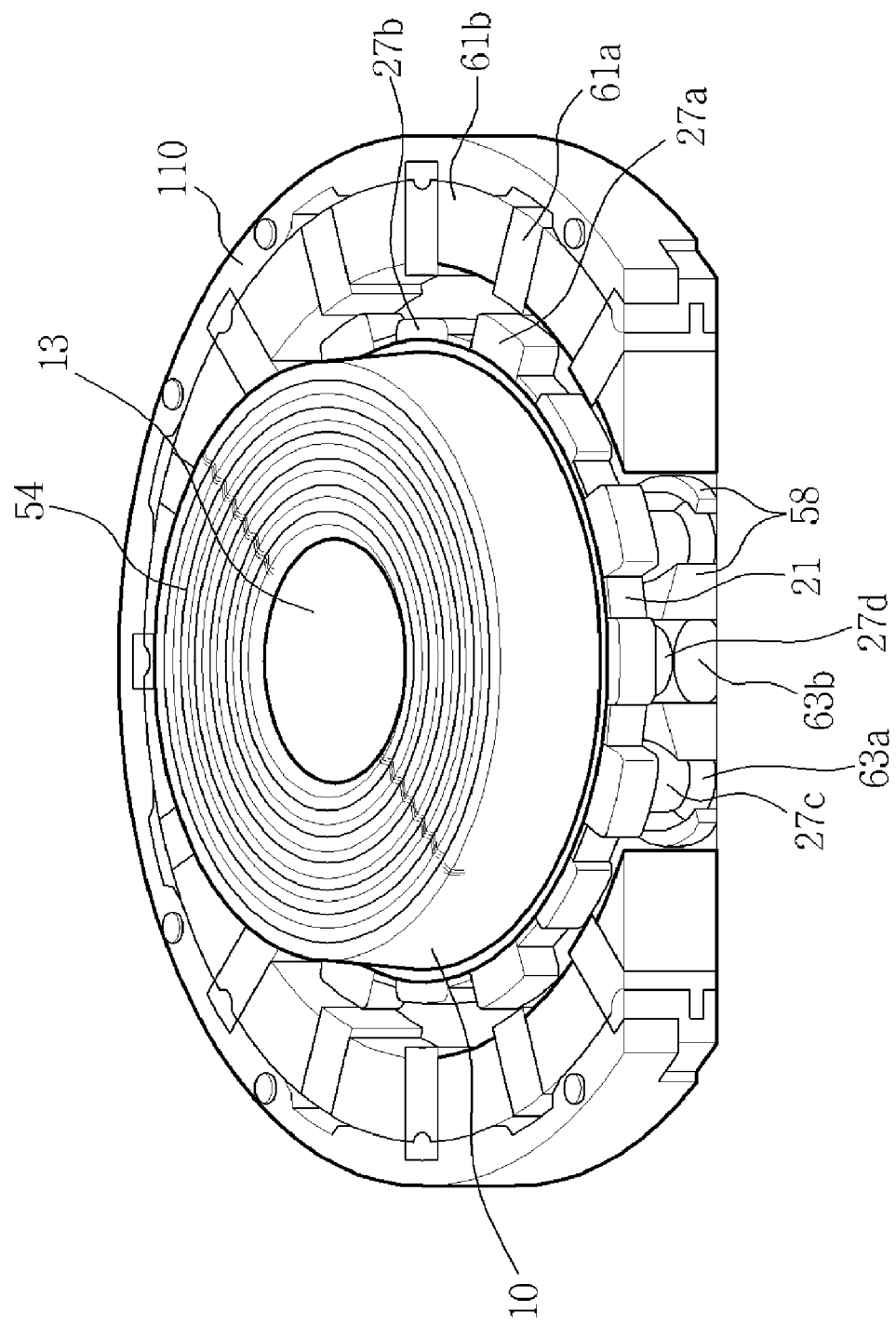
FIG. 6 is a partial sectional perspective view of the character input device according to one embodiment of the present invention.
Figure 7A:
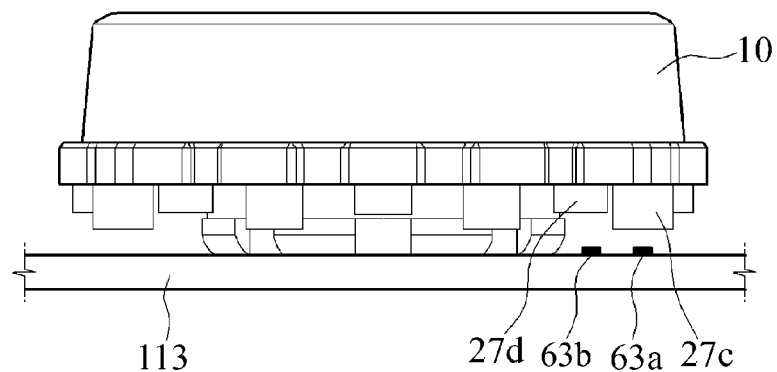
FIG. 7 is a sectional view of a main part of the character input device of FIG. 6.
Figure 7B:
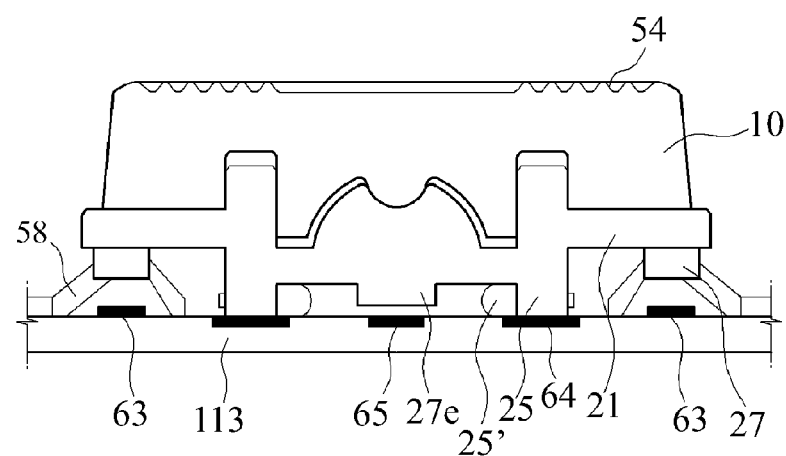
Figure 7C:
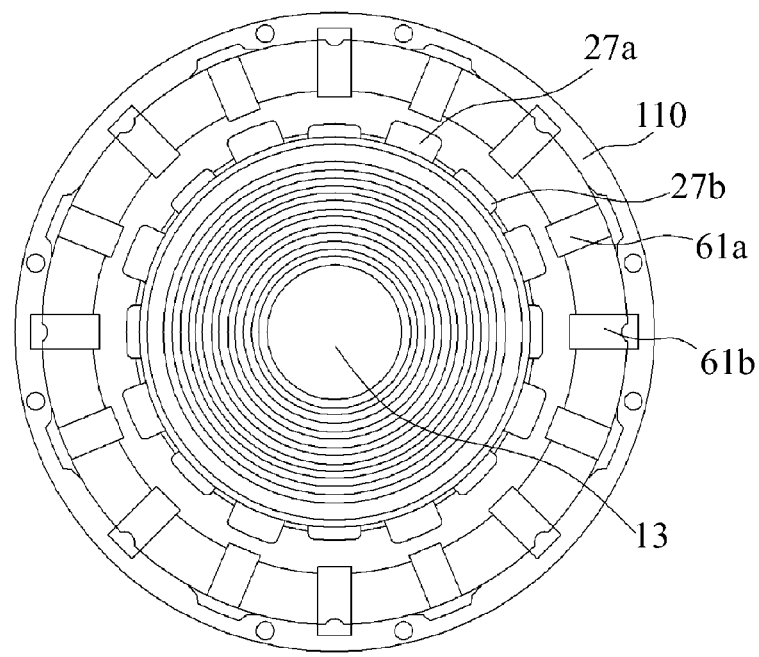

Referring to FIGS. 6 and 7(c), the first contact unit 27a being relatively longer and the second contact unit 27b being relatively shorter are provided, along the rim of the elastic member 21 provided on the lower of the input unit 10, and first sensing units 61a and 61b contacted with the respective contact units 27a and 27b are provided at one side of the base 110 corresponding thereto.

Accordingly, when the input unit 10 moves at one-level in a predetermined direction, the first contact unit 27a first comes into contact with the first sensing unit 61a, and when the input unit 10 moves at two-level, the second contact unit 27b comes into contact with the first sensing unit 61b.

As illustrated in FIG. 7(c), the first contact unit 27a and the second contact unit 27b may be provided to be sequentially crossed along the input unit 10 or the rim of the elastic member 21. The elastic member 21 includes a conductive material and is connected to a ground terminal 64 of the central processing unit (CPU) so that a ground signal is transferred to the contact units 27a and 27b.

Alternatively, when the first direction input M is performed by tilting the input unit 10, one or more optical sensors sensing the tilting of the input unit 10 or the supporting unit 25, depending on an angle of the tilting may be provided.

The method of the first sensing units 61 for distinguishing and sensing the two-level input is not limited to the aforementioned example and may have various changes.

An example of a signal processing method of the control unit 51 upon the multi-level input will be described below.

For example, when the first direction input M is performed at two-level, one-level input is first performed. Therefore, after the first direction input M of one-level is performed, the control unit 51 waits whether or not the first direction input M of two-level is performed within a predetermined standby time, to determine whether or not two-level input is performed.

In one embodiment, when the first direction input M of one-level is performed, the control unit 51 processes one-level input, without waiting the standby time. However, when two-level input is performed within the standby time, the control unit 51 may cancel one-level input to convert it into two-level input. In this case, the delay of the input may be prevented during the standby time.

Alternatively, the control unit 51 may determined whether one-level input is changed, according to whether the one-level input is off (for example, whether the input unit 10 returns to the reference position S after the first direction input M is performed, or when the sensing signal of the one-level input is off), instead of whether the predetermined standby time is elapsed.

That is, when the one-level input is off, the final input is determined.

Accordingly, when the one-level input is performed, the input is immediately processed, and when the one-level input is off, the input is determined. However, irrespective of the standby time, the one-level input is continuously performed without making the off of the one-level input in a state where it is performed, so that the two-level input is performed. At this time, the one-level input is canceled and changed into the two-level input.

In the aforementioned signal processing method, when the one-level input is processed by a wrong input upon performing the two-level input, the two-level input is immediately performed in the state where the one-level input is processed without needing to perform the two-level input after canceling the one-level input so that the one-level input is changed into the two-level input, making it possible to faster process the input.

As described above, when any input signal is sensed, the input processing is immediately preformed but the final input determination is made only when the input is off. In this case, when the first direction input M or the second direction input P is erroneously performed, the wrong input can be corrected to a desired input before the final input determination is made, without again performing the input after deleting the input processed contents, so that the input becomes simple.

Alternatively, when the first sensing unit 61 or the second sensing unit 63 is provided as a pressure sensor, the final input is determined, based on the maximum pressure value generated within the standby time. Or, the one-level input and the two-level input may be distinguished based on a sensing time that the first sensing unit 61 senses the input unit 10.

For example, when the sensing time is below 0.5 seconds, it may be determined to be the one-level input, and when the sensing time is above 0.5 seconds, it may be determined to be two-level input.

As described above even in the case of the pressure sensor, when the one-level input is performed, the input processing is immediately performed and when the one-level input is off, the input determination is made, so that when a sensing value corresponding to the two-level input is additionally sensed before the one-level input is off, the one-level input is cancelled and the input determination of the two-level input is made.

The aforementioned signal process of the control unit 51 relating to the multi-level input may be applied, in the same manner, the second direction input P, the central input C, the direction combination inputs MP and PM and the central combination inputs CM and CP, including the first direction input M.

As described above, when the first direction input M is formed in the multi-level input, the number of characters being assigned (or the number of characters capable of being input through the first direction input M) increases as many. Therefore, when many characters need to be input through the first direction input M, the characters can be input through the multi-level input, without recklessly increasing the number of the first direction indication positions $M_1, M_2, \ldots$. As a result, an optimum input environment can be realized by properly controlling the number of the first direction indication positions $M_1, M_2, \ldots$ and whether or not the multi-level is input.

When two of the first direction indication positions $M_1, M_2, \ldots$ are overlappedly selected upon the first direction input M, for example, when the input unit 10 moves to the middle region between the two first direction indication positions $M_1$ and $M_2$ and then, the movement of the input unit 10 is simultaneously sensed by the two first sensing units 61, the interference between the input signals may occur.

In this case, the control unit 51 may determine that only the first generated sensing signal among a plurality of sensing signals is effective.

That is, the first input signal is effectively input-processed while the other signals being input before the first signal is off (for example, before the input unit 10 performs the first direction input and then, returns to the reference position S) or within the predetermined time are disregarded.

Alternatively, all signal values which may be sensed by the interference may be databased and processed. For example, when the sensing signals are generated in the first sensing units 61, which may be one, two, or three, at predetermined positions, the input values of each signal are databased, to output and process a corresponding input value in a corresponding database when any signals are sensed.

When the first sensing unit 61 is the pressure sensor, it is determined that only a sensed position having the maximum pressure value is effective.

The input units 10 may have various shapes. For example, the input unit 10 may have a disk shape as illustrated in FIG. 2, but may have a polygonal shape or a shape with a side projected toward each of the first direction indication positions $M_1, M_2, \ldots$ as illustrated in FIG. 9.

Figure 9C:
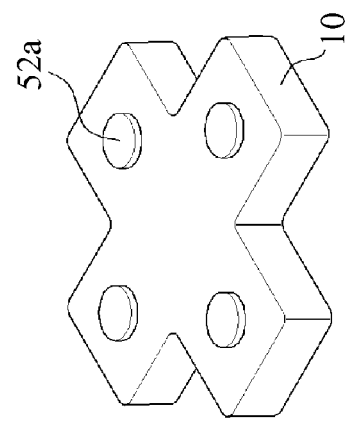

Alternatively, as illustrated in FIG. 9(c), when there are four second direction indication positions $P_1, P_2, \ldots$, the input unit may be have a cross shape. In this case, a button-shaped protrusion 52a may be formed on the upper surface of the input unit 10 corresponding to each of the second direction indication positions $P_1, P_2, \ldots$.

The input unit 10 may be made of various materials, for example, an elastic material.

Figure 25:
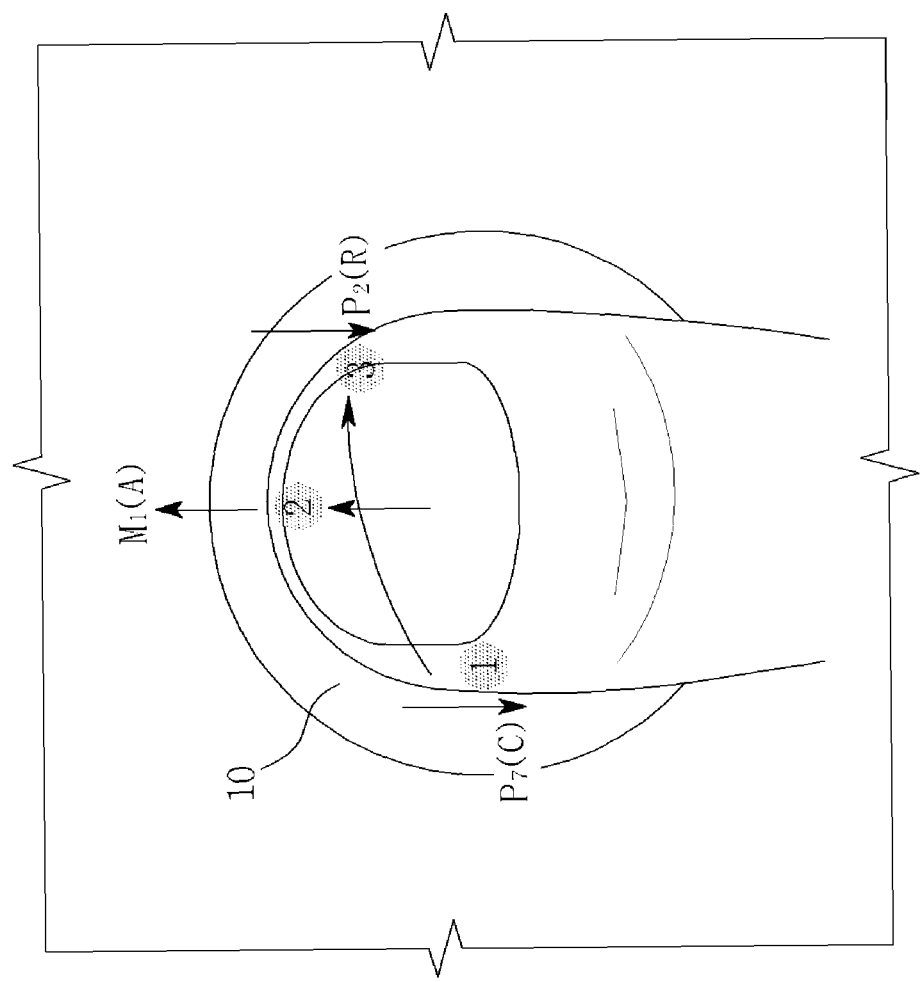
FIG. 25 is a view illustrating an example in which characters are input through the input unit in the character input device according to one embodiment.

Upon the first direction input M, the movement area of the input unit 10 is not limited. In one embodiment, as illustrated in FIG. 25, the input unit 10 may be movable within the movement area of fingers placed on the input unit 10.

Figure 11B:
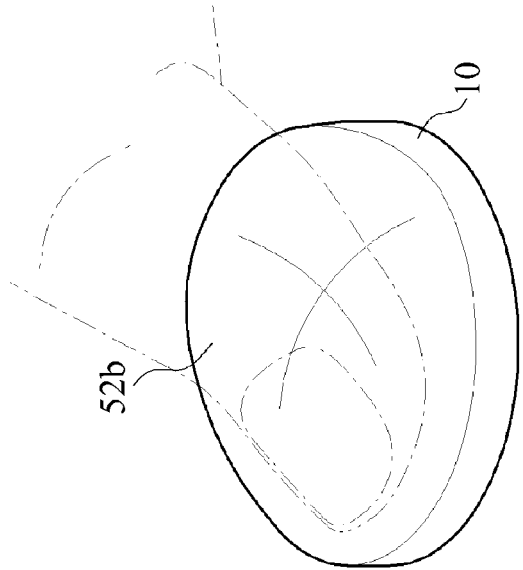
FIG. 11 is a perspective view of an input unit according to each of various embodiments of the present invention.
Figure 11D:
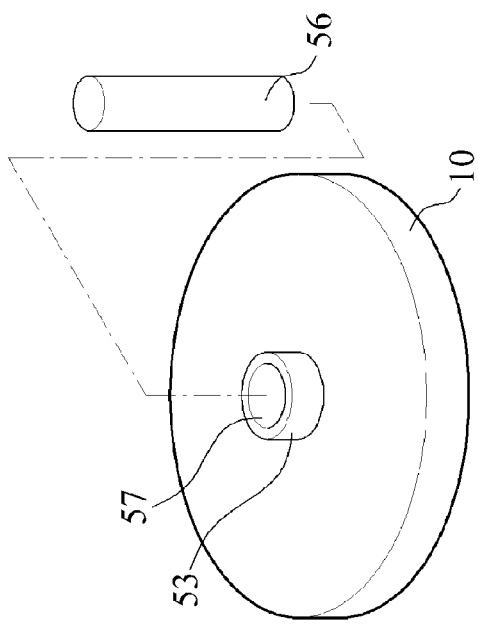
Figure 11A:
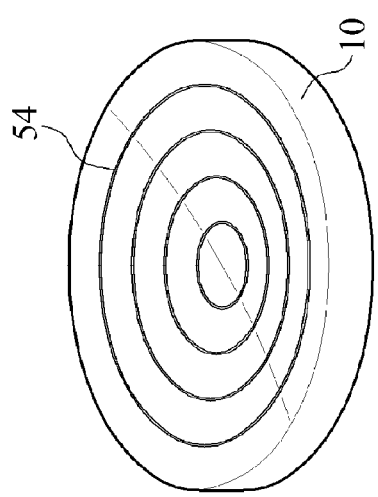

As described in FIG. 11(a), a skid prevention unit 54, which prevents the finger contacting with the input unit 10 from being skidded upon the first direction input M, may be provided on the upper surface of the input unit 10.

The skid prevention unit 54 may have various kinds. For example, the skid prevention unit 54 may be made by forming prominence and depression on the upper surface of the input unit 10, by forming a concave groove in the middle of the input unit 10 or by forming both of the aforementioned prominence and depression and concave groove.

Figure 11C:
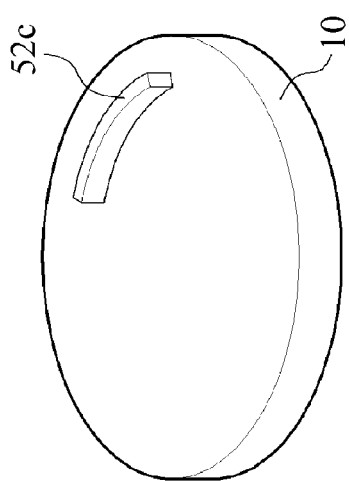

Alternatively, as illustrated in FIG. 11(b) or 11(c), protrusions 52b and 52c may be formed at one side of the upper end of the input unit 10, for making it easy for fingers to hold and operate the input unit 10, upon the second direction input P.

On the other hand, as illustrated in FIG. 11(d), the input unit 10 may further include a projection 53 projected from the middle of the upper surface of the input unit 10 to make it possible to smoothly operate the input unit 10, upon the first direction input M or the second direction input P.

The projection 53 is to make it easy to input, when the character input device 1 is placed and used on the table or the ground or even when the thumb as well as the index finger or the middle finger is used.

The projection 53 may have various shapes. For example, the projection 53 may have a ring shape as illustrated in FIG. 11(d) or a convex or concave shape.

On the other hand, the input unit 10 include an operation rod 56 of which one end is inserted into the projection 53. The projection 53 is provided on the top of the input unit 10 as FIG. 11(d), and is provided with a connection unit 57 into which the operation rod 56 is inserted. Therefore, the input unit 10 may be operated with the operation rod 56 inserted into the projection 53.

Second Direction Input P

In the present application, the second direction input P means that any one of a plurality of second direction indication positions $P_1, P_2, \ldots$ which are spaced and arranged radially in the input unit 10 itself is selected, thereby inputting a second character assigned to a corresponding one of the second direction indication positions $P_1, P_2, \ldots$.

That is, the first direction input M is performed by moving the whole of the input unit 10 and the supporting unit 25 toward the first direction indication positions $M_1, M_2, \ldots$ arranged outside the input unit 10, however, the second direction input P is performed without making a horizontal movement (or sliding) or a tilting-moving of the whole of the input unit 10 and the supporting unit 25 by selecting the second direction indication positions $P_1, P_2, \ldots$ arranged in the input unit 10 itself.

The second direction input P may be performed in various manners. For example, as illustrated in FIG. 4(c), the second direction input P may be performed by tilting the input unit 10 toward any one of the second direction indication positions $P_1, P_2, \ldots$. (Here, the supporting unit 25 may be moved slightly when only the input unit 10 is tilted, the moving of the supporting unit 25 is insignificant.).

In this case, the character input device may further comprise a supporting unit 25 supporting the input unit 10 that can be tilted from an initial horizontal state toward the direction of any area.

Alternatively, as illustrated in FIG. 5, the second direction input P may be performed by selectively pressing any one of press units 11 provided in the input unit 10, corresponding to each of the second direction indication positions $P_1, P_2, \ldots$.

The press unit 11 includes all shapes (except for the tilting of only the input unit 10) capable of independently selecting each of the second direction indication positions $P_1, P_2, \ldots$ in the input unit 10.

For example, the press unit 11 may be a press button or a press switch separately provided in the input unit 10, corresponding to each of the second direction indication positions $P_1, P_2, \ldots$. Otherwise, the press unit 11 may be a press switch in which only the second sensing unit 63 is provided on the upper end or in the inner portion of the input unit 10, corresponding to each of the second direction indication positions $P_1, P_2, \ldots$.

Meanwhile, the second direction input P is capable of performing a circumferential input as in the first direction input M. The input function and signal process relating to the circumferential input are the same as those of the first direction input M.

The input unit 10 may have various sizes. In one embodiment, as illustrated in FIG. 25, when the press unit 11 is provided on the upper end of the input unit 10, the input unit 10 may have the size capable of selecting each press unit 11 in a state where the fingers are placed on the input unit 10.

Likewise, even when the second direction input P is performed by tilting the input unit 10, the input unit 10 may have the size capable of tilting the input unit 10 toward each of the second direction indication positions $P_1, P_2, \ldots$ by tilting the finger in a state where one finger is in contact with the input unit 10.

Various second sensing units 63 may be provided, depending on the forms of performing the second direction input P.

For example, when the second direction input P is performed by tilting the input unit 10, stepped levels sequentially contacted with the base 110 as the input unit 10 is tilted, may be formed at the lower rim of the input unit 10.

In this case, the second sensing unit 63 may be provided as a contact sensor for sensing the contact between the input unit 10 and the base 110 or an optical sensor for sensing the tilting of the input unit 10, wherein the contact sensor or the optical sensor may be provided on the stepped levels or the base 110.

Alternatively, when the second direction input P is performed by each press unit 11 provided in the input unit 10, the second sensing unit 63 may be provided as a contact sensor, a press switch or a pressure sensor provided on the lower of each press unit 11.

Meanwhile, the second direction input P may be capable of performing multi-level input of two or more levels. For example, the second direction input P may separately input each multi-level input according to the degree of the tilting of the input unit 10, or difference in the press strength or press distance of the press unit 11.

Figure 4A:
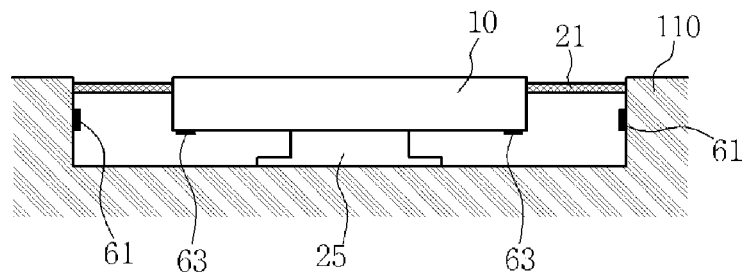
FIG. 4 is a view illustrating each input operation when first direction input, second direction input and central input are performed in an input unit according to one embodiment of the present invention.
Figure 4B:
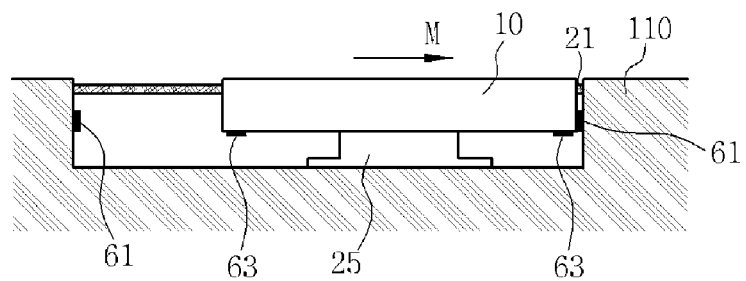
Figure 4C:
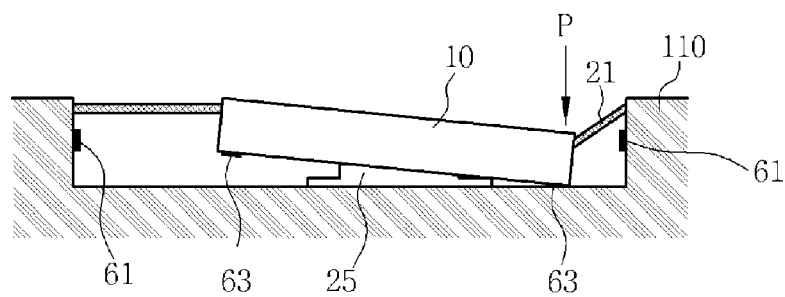
Figure 4D:
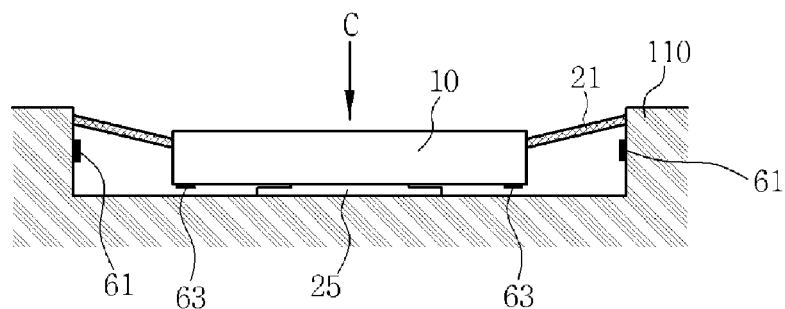
Figure 4E:
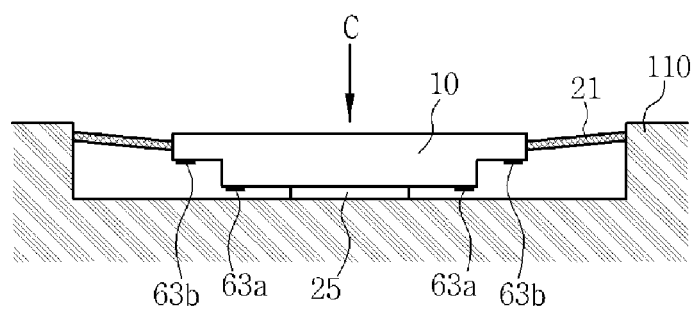

Referring to FIG. 4(e), when the second direction input P is provided at two-level, for example, the stepped levels are formed along the lower rim of the input unit 10, a lower second sensing unit 63a is in contact with the base 110 by means of the tilting of one-level and a upper second sensing unit 63b is in contact with the base 110 by means of the tilting of two-level.

Alternatively, as illustrated in FIG. 7(a), a third contact unit 27c or a fourth contact unit 27d projected in different lengths toward the second sensing units 63a and 63b may be provided in the elastic member 21 provided on the lower of the input unit 10 or in the input unit 10.

In this case, according to the tilting degree of the input unit 10, the third contact unit 27c, which is relatively longer, first contacts with the second sensing unit 63a, and then the fourth contact unit 27d contacts with the second sensing unit 63b upon the two-level input.

The contact units 27a and 27b may be formed of conductive members having elasticity.

As for the signal process of the control unit 51 in the case where the second direction input P of multi-levels is performed, the aforementioned method in the first direction input M may be likewise applied.

Meanwhile, a touch input sensing an approach or touch to the second direction indication positions $P_1, P_2, \ldots$ to input different characters overlappedly assigned to the corresponding second direction indication positions $P_1, P_2, \ldots$ may be provided.

Figure 8:
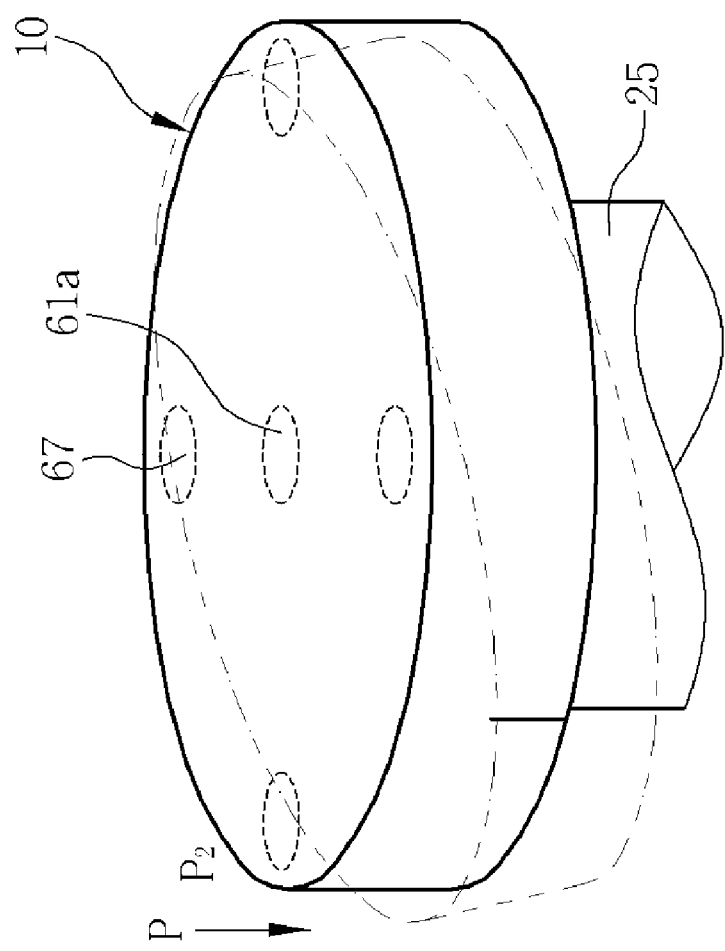
FIG. 8 is a perspective view of an input unit according to another embodiment of the present invention.

In this case, as illustrate in FIG. 8, a touch sensing unit 67 may be provided at the upper end of each input unit 10 or each press unit 11 corresponding to each of the second direction indication positions $P_1, P_2, \ldots$.

For example, in FIG. 8, a character 'A' is input by contacting with a predetermined second direction position $P_2$ and a character 'B' is input by tilting the input unit 10 toward a corresponding second direction position $P_2$.

Therefore, the number of characters capable of being assigned to the second direction indication positions $P_1, P_2, \ldots$ through the touch input can be increased. Further, when the second direction input P is formed of the multi-level, much more characters can be assigned.

A numbers of the first direction indication positions $M_1, M_2, \ldots$ and the second direction indication positions $P_1, P_2, \ldots$ may be provided, for example, any one of four directions to twelve directions may be provided.

In one embodiment, the first direction indication positions $M_1, M_2, \ldots$ and the second direction indication positions $P_1, P_2, \ldots$ may be eight or less. The reason is that when the number of input directions capable of operated by user's fingers is in excess of eight, the input accuracy may be reduced because the distance between the direction indication positions becomes narrow.

In this case, with respect to insufficient numbers of the direction indication positions, the central input C to be described later may be combined or the input unit 10 may be arranged in two sets on the right and left, so that all characters necessary for input are arranged and the optimum input conditions are realized.

Further, the number of the first direction indication positions $M_1, M_2, \ldots$ and the number of the second direction indication positions $P_1, P_2, \ldots$ may be same as or different from each other.

Embodiments of Combination of First Direction Input M and Second Direction Input P Hereinafter, in the character input device, exemplary embodiments of the combination of the aforementioned first direction input M and second direction input P will be described.

As a first embodiment, the first direction input M is performed by sliding the input unit 10 from the reference position S toward the first direction indication positions $M_1, M_2, \ldots$, and the second direction input P is performed by selecting the press unit 11 provided on the upper end of the input unit 10, corresponding to each of the second direction indication positions $P_1, P_2, \ldots$ as illustrated in FIG. 3.

In this case, the first sensing unit 61 for sensing the first direction input M may be provided at the base 110 on the lower side of the input unit 10, as illustrated in FIG. 3 or be provided at the base 110 on the rim side of the input unit 10, as illustrated in FIGS. 4(a) and 4(b).

As illustrated in FIG. 10(a), the second direction input P may be performed by providing the contact units 27c and 27b on the lower of the input unit 10 and pressing the press unit 11 to contact them with the second sensing unit 63.

In this case, each of the contact units 27c and 27d has different lengths, so that the third contact unit 27c contacts with the second direction input P of one-level and the fourth contact unit 27d contacts with the second direction input P of two-level.

Meanwhile, a fifth contact unit 27e contacting with a third sensing unit 65a upon the central input C of one-level and a sixth contact unit 27f contacting with a third sensing unit 65b upon the central input C of two-level are projected in different lengths on the lower of a central input key 13.

Further, the external rim of the input unit 10 is provided with a return member 58 formed of an elastic material to return the input unit 10 to the reference position S after the first direction input M is performed.

FIGS. 6 and 7 illustrate a character input device 1 according to a second exemplary embodiment of the present invention. Referring to these drawings, the first direction input M is performed by sliding the input unit 10 from the reference position S toward the first direction indication positions $M_1$, $M_2$, . . . , and the second direction input P is performed by tilting the input unit 10 from the horizontal position toward any one of the second direction indication positions $P_1$, $P_2$, . . . .

As illustrated in FIG. 7(c), the first direction input M is performed by the contact units 27a and 27b projected along the input unit 10 or the rim of the elastic member 21, and first sensing units 61a and 61b provided at the base 110, corresponding to the contact units 27a and 27b.

As described above, the multi-level input of two or more levels may be performed by differentiating the projected length of each of the contact units 27a and 27b.

The character input device 1 may further comprise a supporting unit 25 supporting the input unit 10 that can be tilted for the second direction input P.

The supporting unit 25 may be formed in various kinds. Or, a sliding supporting unit 25' supporting the sliding of the input unit 10 may be provided.

On the other hand, referring to FIG. 7(b), the return member 58 which returns the input unit 10 to an original position after the second direction input P is performed, is provided on the lower of the input unit 10.

The return member 58 is positioned at an elastic member 21 (or the input unit 10) and a PCB substrate 113 to be applied to both of the sliding and tilting input operations of the input unit 10.

Alternatively, the input unit 10 may be formed of an elastic material, without providing the supporting unit 25, or a deformable elastic substance may be provided between the input unit 10 and the base 110, making it possible to tilt the input unit 10.

At this time, although the input unit 10 performs the second direction input P in a predetermined direction in a state where the first direction input M is performed in a predetermined direction, the second sensing units 63a and 63b have predetermined shape and size (area) so as to be able to sense it by the contact units 27c and 27d.

Figure 10C:
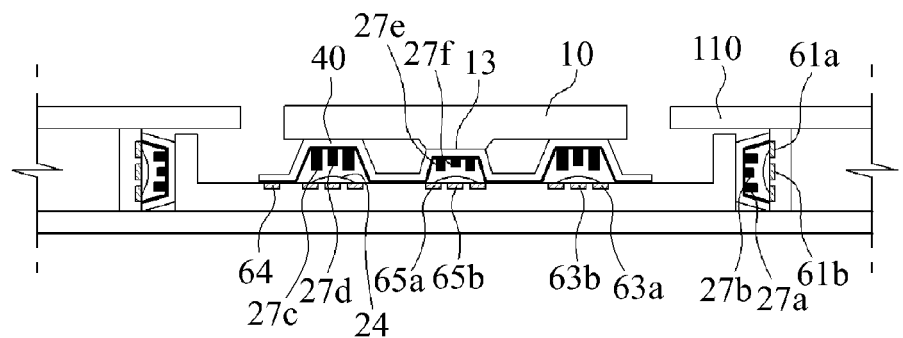

FIG. 10(c) illustrates another example according to the exemplary embodiment of the present invention.

Referring to FIG. 10(c), an elastic member 40 forming a press space may be provided between the input unit 10 and the base 110, and sensing units 61, 63 and 65 may be provided on the lower of the elastic member 40.

At this time, the contact units 27a, 27b, 27c, 27d, 27e and 27f projected in different lengths toward the respective sensing units 61, 63, 65 may be provided in the internal side of the elastic member 40, making it possible to perform the multi-level input.

A conductive member 23 is interposed between the contact units 27a and 27b and the elastic member 40. One end of the conductive member 23 is connected to a ground terminal 64 and the other end thereof is connected to the contact units 27a through 27f, so that the sensing signal is transferred to a control unit 60 through the contact units 27a through 27f.

For example, when the first direction input M1 of one-level is performed, the outside contact unit 27a is in contact with a metal dome 58, thereby generating a direction input signal of one-level. At this time, since the contact unit 27a contacts with the edge of the metal dome 24, the metal dome 24 maintains its original shape.

Subsequently, when the first direction input M2 of two-level is performed, the inside contact unit 27b moves down to deform the metal dome 24 to be in contact with the first sensing unit 61b, thereby generating a direction input signal of two-level.

In this process, when the metal dome 24 is deformed, click feeling may be provided so that a user can easily distinguish between the input of two-level and the input of one-level.

In a character input device 1 according to a third embodiment of the present invention, the first direction input M is performed by sliding the input unit 10 from the reference position S toward the first direction indication positions $M_1$, $M_2$, . . . , and the second direction input P is performed by tilting-moving the input unit 10 toward the second direction indication positions $P_1$, $P_2$, . . . .

The 'tilting-moving' means that the whole of the input unit 10 is tilted and is moved (or simultaneous with the supporting unit 25) toward a predetermined direction as illustrated at the left of FIG. 10(b).

However, the 'tilting' means that the input unit 10 is tilted to the supporting unit 25 as illustrated at the right of FIG. 10(b).

As illustrated in FIG. 8, the first direction input M may be performed by sliding the input unit 10, and the second direction input P may be performed by tilting the input unit 10, although it is not the aforementioned tilting-moving.

Alternatively, the first direction input M is preformed by the sliding, the second direction input P is performed by the tilting-moving, as well as the input unit 10 may be tilted at its position.

In each of the aforementioned exemplary embodiments, the input unit 10 may be positioned to be projected and received outside and inside the base 110.

Therefore, the volume can be minimized by allowing the input unit 10 to be received in the base 110, and the input unit 10 is easily operated by allowing it to be protruded.

FIG. 10(b) illustrates a character input device 1 according to a fourth embodiment of the present invention.

Referring to FIG. 10(b), the first direction input M is performed by tilting—moving the input unit 10 (refer to the left of FIG. 10(b)), and the second direction input P is performed by downward tilting the input unit 10 (refer to the right of FIG. 10(b)).

The input unit 10 is supported by the supporting unit 25. The supporting unit 25 includes an elastic material, thereby making it possible to performing the tilting movement of the input unit 10 toward each of the first direction indication positions $M_1$, $M_2$, . . . .

The rim of the input unit 10 is in contacts with a first sensing unit 61 positioned at a base 110 so that the tilting-moving of the input unit 10 is performed.

A second sensing unit 63 for sensing the second direction input P by tilting the input unit 10 is arranged on a PCB substrate 113 corresponding to the lower of the input unit 10.

In each of the aforementioned exemplary embodiments, the first direction input M or the second direction input P may be the same as or different from each other in the number of direction indication positions.

Further, at least one of the first direction input M and the second direction input P may be capable of performing the multi-level input.

For example, the first direction input M may be of the one-level input and the second direction input P may be of the two-level input. In this case, a consonant character may be input by the second direction input P, and a vowel character may be input by the first direction input M.

This is because in most of each country's character, consonant characters are relatively more in numbers and use frequency than vowel characters and the second direction input P is relatively easier than the first direction input M upon the multi-level input.

As described above, the character input device 1 according to one embodiment of the present invention is capable of faster and accurately inputting the characters by combining the first direction input M and the second direction input P which have the input operations distinguished from each other.

This is because it is possible to input characters by distinguishing the consonants and the vowels depending on each input operation, in inputting almost all of each country's character in which the consonant and the vowel are repeatedly mixed and arranged.

Furthermore, since the first direction input M and the second direction input P do not have any restriction (that is, in order to perform any one input operation, another input operation must be essentially performed, etc.) between the respective input operations, a plurality of input operations are continuously performed like one input operation.

For example, an input example using the character input device 1 according to one embodiment of the present invention will be described with reference to FIG. 25. When the user wants to input alphabet characters 'CAR', the user can tilt the input unit 10 toward the second direction indication position $P_7$ to which the consonant 'C' is assigned (or selecting the press unit 11) and then, move the input unit 10 toward the first direction indication position $M_1$ to which a vowel 'A' is assigned. Subsequently, the user again tilts the input unit 10 toward the second direction indication position $P_2$ to which a consonant 'R' is assigned. Since the aforementioned three operations can be performed simultaneously or sequentially at a little interval, the word formed of a plurality of characters can be input like a continuous one operation.

Each of the aforementioned embodiments describes the basic form combining the first direction input M and the second direction input P in the character input device 1 according to one embodiment of the present invention. However, additional combinations of various configurations may be possible, and there is no limitation in modifying shape, size and material, etc. of each configuration.

Hereinafter, additional configurations and various modified examples which can be included in the aforementioned basic form will be described in detail.

Each configuration to be described later may be applied by itself or two or more configurations may be simultaneously applied. In this case, various combinations are possible.

Central Input C

In the present application, the central input C means an input performed by selecting a central input key 13 provided in the center of the input unit 10 or moving the input unit 10 itself up and down, unlike the first direction input M or the second direction input P.

For example, as illustrated in FIG. 3, the central input C may be performed by the central input key 13 selectable in the center of the input unit 10, and a third sensing unit 65 for sensing the selection of the central input key 13.

Alternatively, as illustrated in FIG. 4(d), the central input C is performed so that the whole of the input unit 10 may be moved up and down with respect to the base 110, and the up and down movement of the input unit 10 may be sensed in any one of the input unit 10 or the base 110.

The central inputs C may be provided in both or either of forms described above.

On the other hand, the central input C is capable of performing multi-level input, i.e., two or more levels, depending on the press distance or press strength of the central input key 13, or the rising and falling distance of the input unit 10 itself.

The touch input inputting other characters overlappedly assigned to the central input key 13 may be performed by sensing the approach or the touch to the central input key 13.

In this case, the central input key 18 is provided with a central touch sensing unit 61a for sensing the approach or the touch of the finger.

In the case where the central touch sensing unit 61a is provided, when the touch of the finger is sensed in a central input key sensing unit 69 over a predetermined time, the control unit 51 may disregard a sensing result of the touch sensing unit 67, thereby allowing the touch input not to be performed.

Central Combination Inputs CM and CP

In the present application, the central combination inputs CM and CP mean that the central input C is performed simultaneously with any one of the first direction input M and the second direction input P.

For example, when the first direction input M is performed as illustrated in FIG. 4(b), the input unit 10 is moved toward the predetermined first direction indication positions $M_1$, $M_2$, ... while the central input key 13 illustrated in FIG. 3 is pressed, or when the second direction input P is performed as illustrated in FIG. 4(c), the input unit 10 is tilted toward the predetermined second direction indication positions $P_1$, $P_2$, ... while the central input key 13 is pressed.

Figure 12:
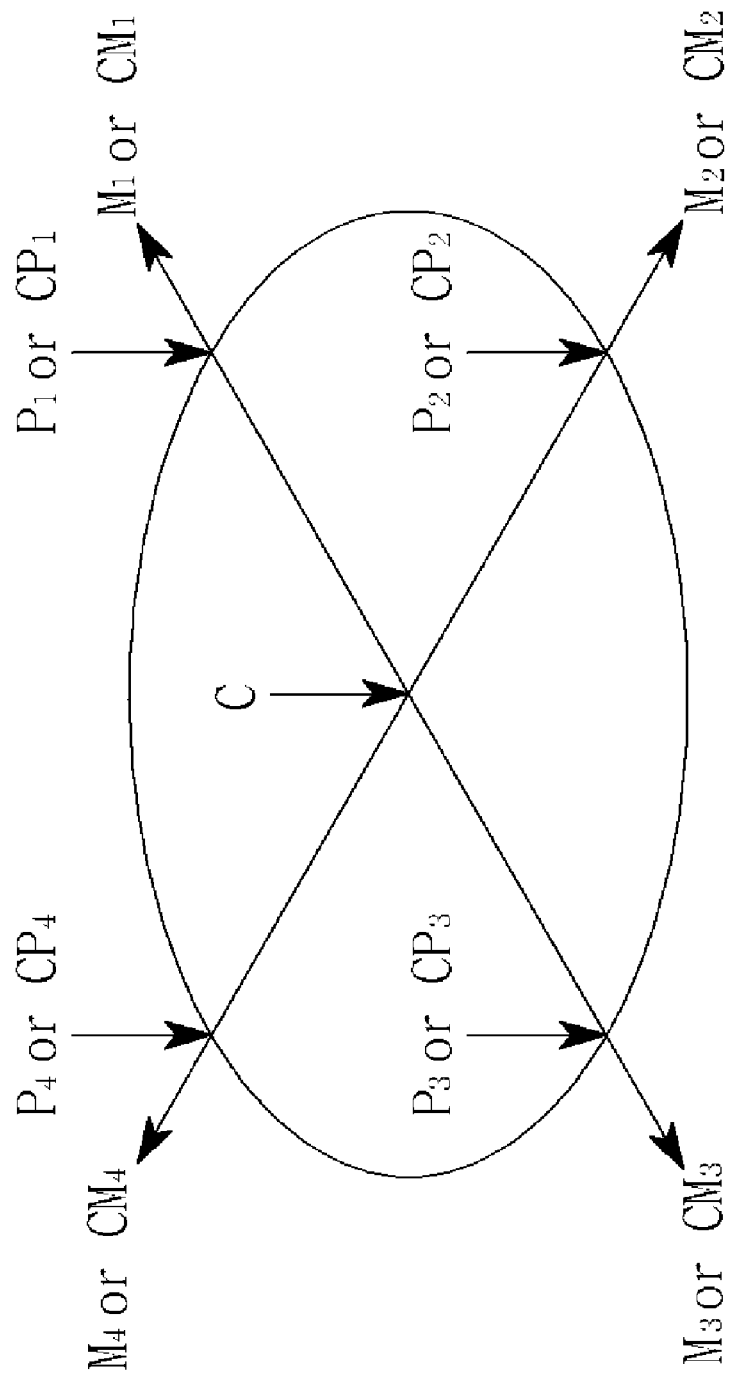
FIG. 12 is a concept view for explaining central combination input.

FIG. 12 is a concept view for explaining an input method of the central combination inputs CM and CP.

Referring to FIG. 12, an example of a case where the first direction input M and the central input C are combined will be described. When the central input C is performed in the process that the input unit 10 is moved to a predetermined first direction indication position $M_1$, a direction combination input $CM_1$ is performed. However, when only the input unit 10 is moved without performing the central input C, the first direction input $M_1$ is performed.

The central combination inputs CM and CP may be also applied to the case where at least one of the first direction input M, the second direction input P and the central input C is formed of the multi-level input of two or more levels.

Figure 17:
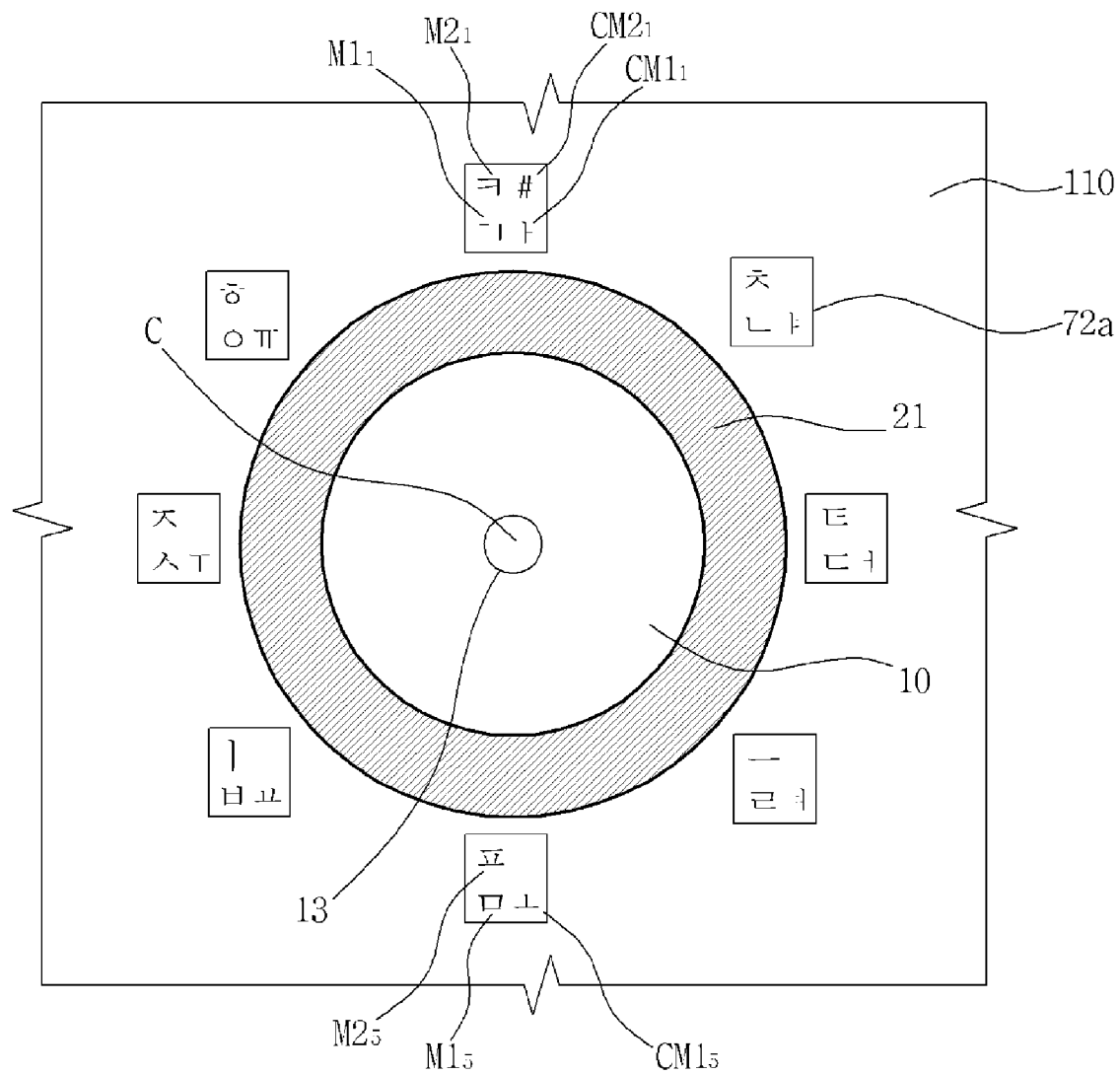

For example, as illustrated in FIG. 17, when the first direction input M is formed of two-level, the central combination input $CM1_1$ of one-level that the first direction input $M1_1$, of one-level and the central input C are combined, and a central combination input $CM2_2$ of two-level that the first direction input $M2_1$ of two-level and the central input C are combined, can be performed.

Figure 18:
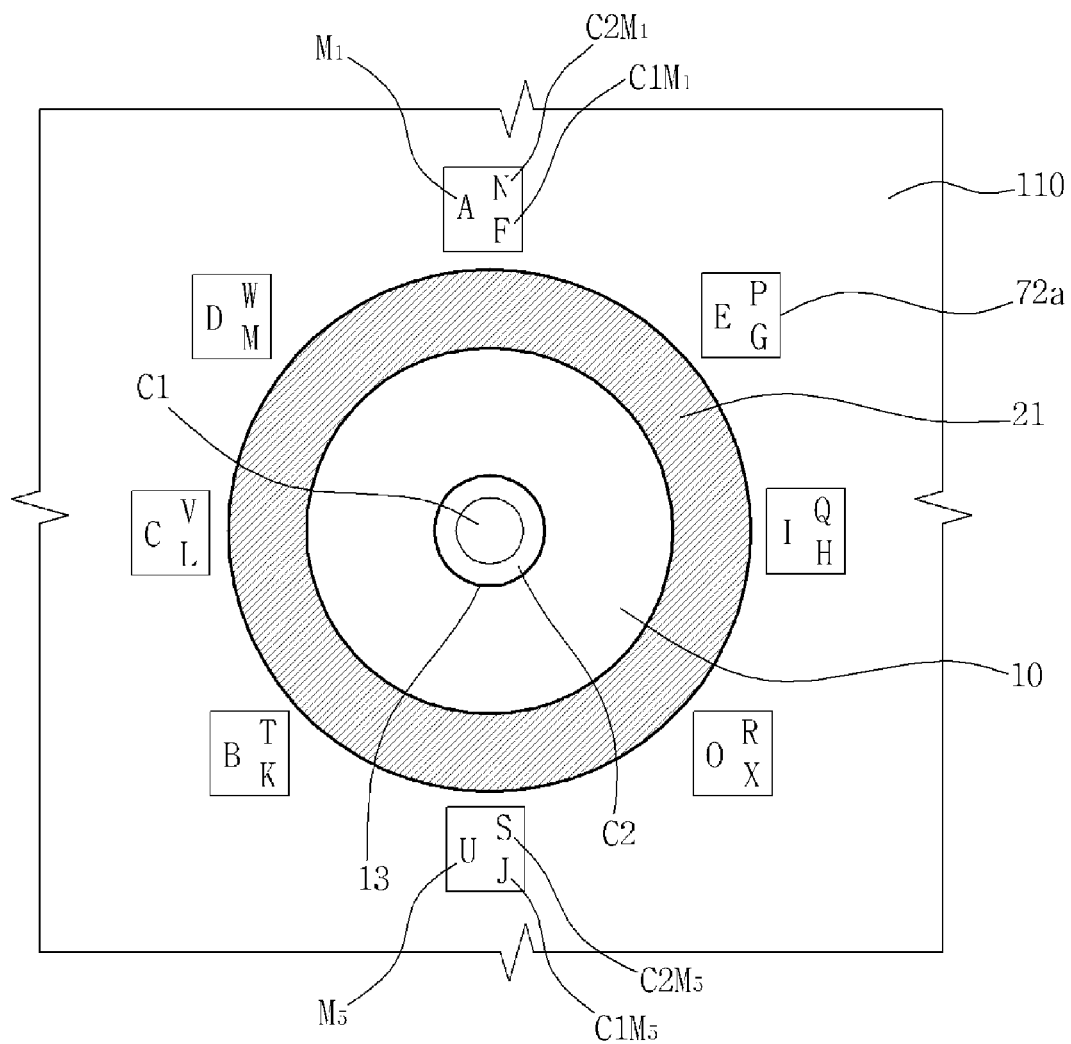

Otherwise, as illustrated in FIG. 18, the first direction input M is formed of one-level and the central input C1 and C2 is formed of two-level so that a central combination input $C1M_1$ of one-level that the first direction input $M_1$ and a central input C1 of one-level are combined, and a central combination input $C2M_1$ of two-level that the first direction input $M_1$ and a central input C2 of two-level are combined.

Accordingly, when the central combination inputs CM and CP can be performed, since the characters can be overlappedly assigned to the first direction indication positions $M_1$, $M_2$, ... and the second direction indication positions $P_1$, $P_2$, ..., the input capacity (the number of characters capable of being input) increases without having any additional configurations.

In the aforementioned two cases, of course, the central combination inputs CM and CP may be combined with the second direction input P, instead of the first direction input M.

That is, the central combination inputs CM and CP may be performed by combining the first direction input M and the second direction input P in all the aforementioned forms with the central input C in all the aforementioned forms, without limitation.

Direction Combination Inputs (MP and PM)

In the present application, the direction combination inputs MP and PM mean that when any one of the first direction input M and the second direction input P is first performed and the other is subsequently performed, a third character assigned to the input operation is input.

That is, the direction combination inputs MP and PM mean that in the state where the first direction input M is first performed as illustrated in FIG. 4(b), that is, the input unit 10 is moved to the first direction indication positions $M_1$, $M_2$, . . . , the second direction input P is performed as illustrated in FIG. 4(c), or vice versa.

FIG. 13 is a concept view for explaining a method of the direction combination inputs MP and PM.

Figure 13A:
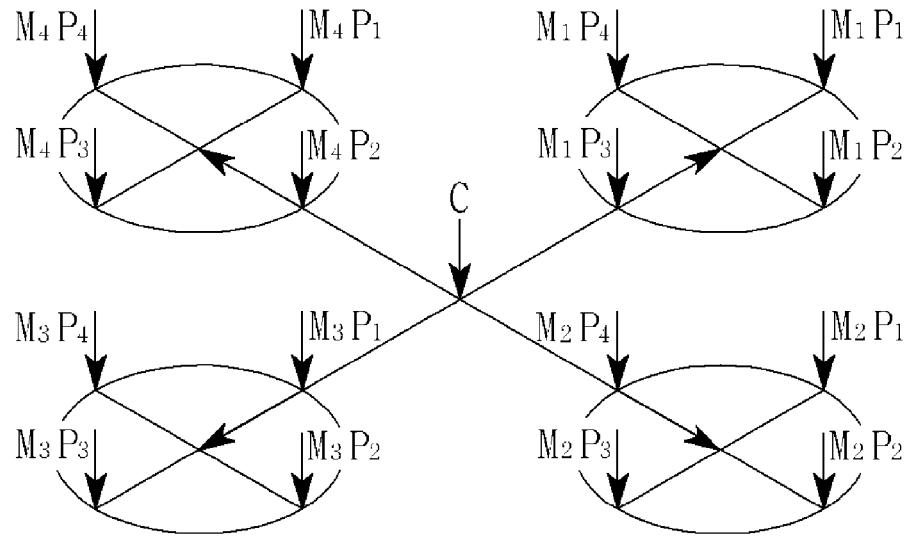
FIG. 13 is a concept view for explaining direction combination input and a plan view of the input unit.

FIG. 13(a) illustrates a case where the second direction input P is performed after the first direction input M is first performed. The direction combination input $M_1P_1$ represents that the second direction input P is performed toward the second direction indication position $P_1$ in the state where the input unit 10 is moved to the first direction indication position $M_1$.

Figure 13B:
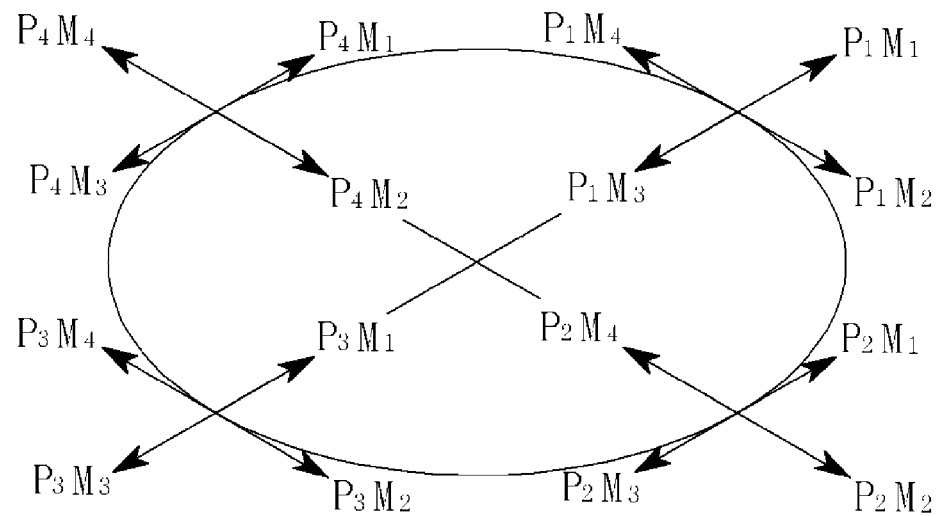

To the contrary, FIG. 13(b) illustrates that the first direction input M is performed in the state where the second direction input P is first performed. The direction combination input $P_1M_1$ represents that the first direction input M is performed toward the first direction indication position $M_1$ in the state where the second direction input P is performed toward the second direction indication position $P_1$.

Figure 14B:
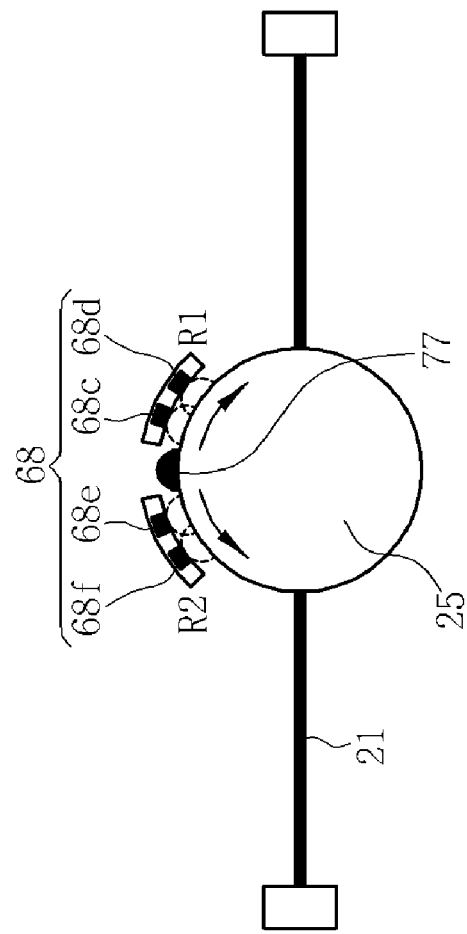
FIG. 14 is a plan view of a supporting unit for explaining direction rotation input.
Figure 14A:
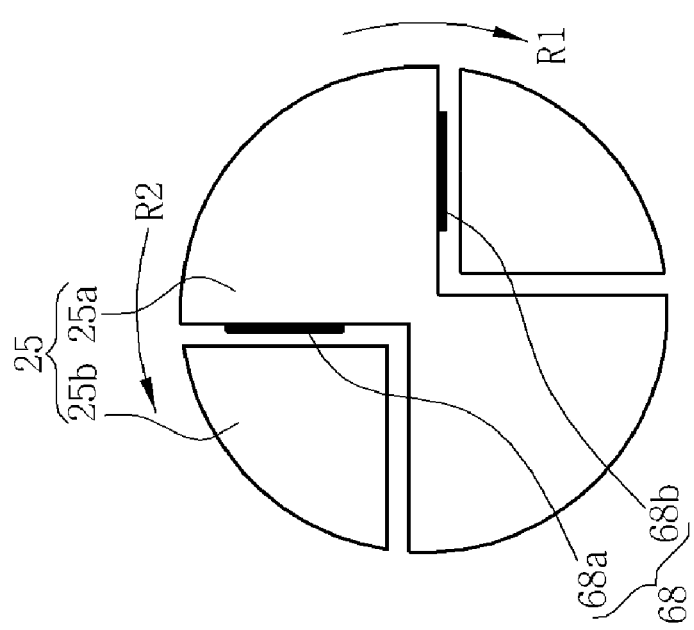
Figures 14C, 14D:
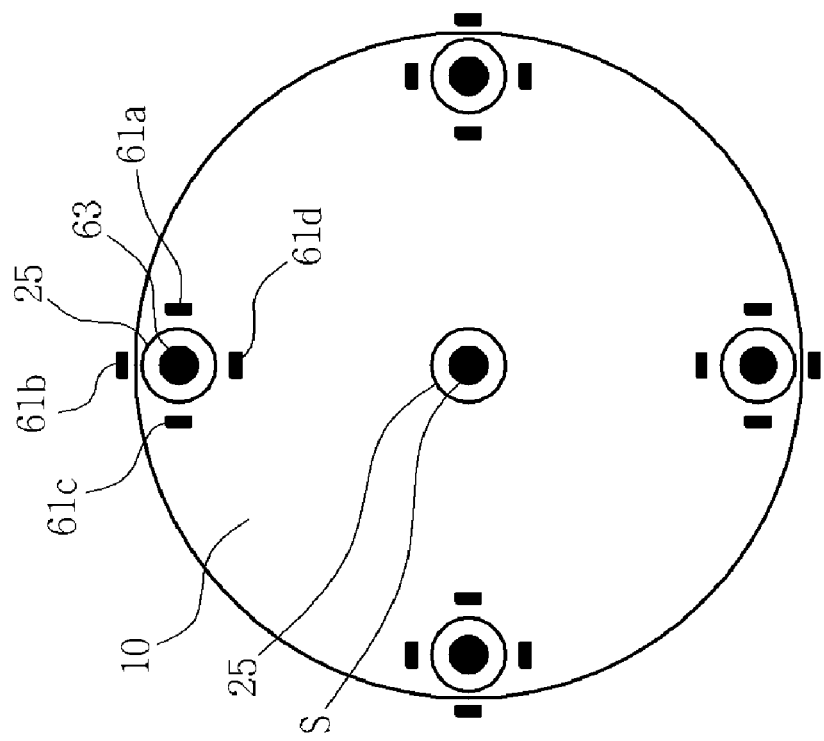

When the first direction input M is performed after the second direction input P is first performed, the first sensing unit 61 may be arranged around the second sensing unit 63 corresponding to each press unit 11, as illustrated in FIG. 14(c).

The first direction indication positions $M_1$, $M_2$, . . . and the second direction indication positions $P_1$, $P_2$, . . . may be combined with respect to all directions.

That is, as illustrated in FIG. 13(a), if the second direction input P is performed toward the second direction indication position $P_4$ in the state where the input unit 10 is moved to the first direction indication position $M_2$, the direction combination input $M_2P_4$ is performed.

As described above, in the direction combination inputs $M_1P_1$ and $P_1M_1$, different characters may be input according to the order of the first direction input and the second direction input P to be combined with each other, but the same character may be input, irrespective of the combination order.

That is, the same characters may be input by the direction combination input $M_1P_1$ and the direction combination input $P_1M_1$.

Meanwhile, when the direction combination inputs MP and PM are not available, even though the first direction input M and the second direction input P are performed simultaneously, each input is independently performed.

That is, in the embodiment illustrated in FIG. 5, when the second direction input P for inputting 'ㅗ' and the first direction input M for inputting 'ㄴ' are simultaneously performed, a HanGeul character 'ㅗ' rather than a combined new character is input by each input operation.

On the other hand, when at least one of the first direction input M and the second direction input P is provided to be able to perform multi-level input of two or more levels, the direction combination inputs MP and PM are generated as many as the number of combinations corresponding thereto, thereby maximizing the input capacity.

Accordingly, it may be advantageous when the characters including fifty or more phonemes, such as Chinese characters or Japanese characters, are input through the direction combination inputs MP and PM.

It is noted that the aforementioned central input C, the central combination inputs CM and CP, and the direction combination inputs MP and PM may be freely combined together with the first direction input M and the second directions input P, if necessary, as well as the number of direction indication positions in each input may be changed without limitation.

Direction Rotation Input R

In the present application, the direction rotation input R means that assigned characters or data are input by rotating the input unit 10 itself centering on the reference position on the base 110 in the right and left direction.

The rotation of the input unit 10 may be realized in variously manners. For example, as illustrated in FIG. 14(a), the supporting unit 25 may be divided into a first supporting unit 25a and a second supporting unit 25b which are relatively movable.

The first supporting unit 25a may be fixed and the second supporting unit 25b may rotate in the direction of the first supporting unit 25a, and vice versa.

Rotation sensing units 68a and 68b are respectively provided in each rotation direction between the first supporting unit 25a and the second supporting unit 25b.

Accordingly, when the input unit 10 is rotated in the right direction R1, the first supporting unit 25a is rotated so that the rotation sensing unit 68b senses the rotation, and when the input unit 10 is rotated in the left direction R2, the rotation sensing unit 68a senses the rotation thereof.

Alternatively, as illustrated in FIG. 14(b), a rotation protrusion 77 may be formed at one side of the input unit 10, and each of rotation sensing units 68c, 68d, 68e and 68f may be sequentially arranged in the direction of the rotation distance of the rotation protrusion 77 in the right and left sides of the rotation protrusion 77.

The aforementioned rotation of the input unit 10 in the right and left directions may be a two-level rotation, depending on the rotation distance (or an angle of rotation).

That is, when the input unit 10 is rotated to the right at one-level, the rotation sensing unit 68c first positioned at the right side can sense one-level rotation, and when the input unit 10 is further rotated to the right direction at two-level, the rotation sensing unit 68d second positioned at the right side can sense two-level rotation.

On the other hand, in each case described above, the input unit 10 may have various rotation angles, if necessary. For example, as illustrated in FIG. 14(a) or 14(b), the input unit 10 may be pivoted by a predetermined angle and be rotated at 360 degrees or more.

Also, by direction rotation of the input unit 10, the same data in all press units 11 may be input, but different data may be input for every press unit 11 selectively combined with each press unit 11.

Arrangement of Characters

In the present application, the 'character(s)' means a character in the narrow meaning according to each country's language, such as, HanGeul characters, English characters or Japanese characters.

Data capable of being input in the character input device according to one embodiment of the present invention shall not be limited to the aforementioned characters, but may include various functional commands such as numbers, symbols or enter/space/cancel keys and so on.

Further, in the present application, a 'vowel' is considered to have its pronunciation corresponding to a HanGeul vowel in the case of a foreign language or to belong to an alphabet group which has a relatively less number when the alphabet of the same foreign language is divided into two kinds according to the linguistic classification standards.

In the character input device 1 according to one embodiment of the present invention, there is no special limitation in a method of arranging characters in relation to the aforementioned first direction input M, second direction input P, central input C, central combination inputs CM and CP or direction combination inputs MP and PM.

However, for more efficient character input, characters may be arranged in the following method:

In arranging each country's character, consonant characters and vowel characters may be input by different input operations.

For example, the consonant characters may be input by the first direction input M and the vowel characters may be input by the second direction input P, or vice versa.

Since a user can easily associate a character to be input by each input operation, there is a merit in that the user can be easily used to the character input device 1 according to one embodiment of the present invention.

FIG. 15 is a table illustrating an example where each country's characters are arranged according to the aforementioned exemplary embodiments.

Referring to FIG. 15, the consonant characters of each country's characters may be arranged in the first direction input M of two-level, and the vowel characters thereof may be arranged in the second direction input P of two-level.

At this time, the consonants and vowels are basically dividedly arranged at the first direction indication positions $M_1$, $M_2$, . . . and the second direction indication positions $P_1$, $P_2$, . . . , but may be assigned to different direction indication positions, if necessary.

For example, in HanGeul characters, vowels 'ㅒ' and 'ㅖ' may be arranged in the first direction indication positions $M_1$, $M_2$, . . . , or in the English alphabet, consonants 'V' and 'Z' may be assigned to the second direction indication positions $P_1$, $P_2$, . . . .

In this case, in addition to the vowel characters, the functional commands, such as enter, space, back cursor, ESC and so on, may be assigned to the second direction indication positions $P_1$, $P_2$, . . . .

Further, in the English alphabet, continued characters with a high use frequency, for example, 'CH' and 'ING' and so on, may be assigned to one direction indication position.

In the present application, since 'W, X, Y' have the same effect as the vowel, these are defined as vowel parts, in addition to the English alphabet vowels 'A, E, I, O, U'.

Further, a mode conversion window function may be assigned to the central input C1 of one-level, and a mouse mode conversion function may be assigned to the central input C2 of two-level.

As illustrated in FIG. 16(a), when four second direction indication positions $P_1$, $P_2$, . . . are provided and the second direction input P is capable of performing two-level input, 'A, X', 'E, I', 'W, Y' and 'O, U' are assigned to the second direction indication positions $P_1$, $P_2$, . . . in arranging the alphabet, and the overlappedly assigned respective characters may be distinguished and input by the second direction input P of one-level and two-level.

That is, 'E ($P1_2$)' may be input by the second direction input P of one-level, and 'I ($P2_2$)' is input by the second direction input P of two-level.

Further, when arranging HanGeul characters, as illustrated in FIG. 16(b), groups of 'ㅏ, ㅑ', 'ㅓ, ㅕ', 'ㅗ, ㅛ' and 'ㅜ, ㅠ' may be overlappedly assigned to the second direction input P so that the assigned respective characters may be distinguished and input by the second direction input of one-level and two-level.

Contrary to the illustration of FIG. 16, the first direction input M forms the two-level input by four first direction indication positions $M_1$, $M_2$, . . . , so that the vowel characters may be input through the first direction input M.

In the case of being arranged among characters having a similar shape as described above in English alphabet and Korean alphabet, that is, HanGeul, the shape of the vowel character is associated from the second direction indication positions $P_1$, $P_2$, . . . , so that a user can become familiar therewith.

Specifically, in HanGeul, when vowel characters, 'ㅏ', 'ㅓ', 'ㅜ' and 'ㅗ' are respectively arranged in the east, west, south and north directions as described above, the shapes of vowel characters are associated according to the directions, so that a user can become easily familiar therewith.

Alternatively, in the English alphabet, each character may be arranged by binding among characters having a similar shape.

For example, two characters, such as 'b, d', 'p, q', 'i, j', 'm, w', 'u, v', 'k, x', 'c, o', 'a, e', 's, z', 'l, r', 'f, t', 'n, h' or 'y, g', may be overlappedly assigned to the same direction indication position and may be distinguished and input by the multi-level input of one-level and two-level.

Alternatively, any one of the binded two characters may be assigned to the first direction input M, and the other may be assigned to the second direction input P.

On the other hand, any one of the numbers, symbols, various functional commands and mode conversions may be performed by the first direction input M or the second direction input P, and other various functional commands, such as input mode conversion, enter, OK and so on, may be performed by the central input C.

Upon a telephone mode, they may be performed by a call/end button.

On the other hand, the character input device 1 according to one embodiment of the present invention may perform a function of a mouse, which is an input device by using the input unit 10. In this case, in a mouse input mode, the movement of a pointer may be performed by the first direction input M of the input unit 10, and right and left buttons and scroll functions of the mouse may be performed by the second direction input P or the central input C and the second direction input P.

At this time, in the second direction input P, the input unit 10 may be vertically divided into two parts, so that a left part may correspond to the left button of the mouse and a right part correspond to the right button of the mouse. Alternatively, the input unit 10 may be divided into four parts in an 'X' shape, so that the left part may correspond to the left button of the mouse, the right part correspond to the right button of the mouse, and upper and lower parts correspond to a wheel of the mouse.

In this case, when the first direction input M is performed with performing the second direction input P in the direction corresponding to the left button of the mouse, 'drag' can be made as in the mouse.

A signal processing method generally used in a mouse may be used for the relevant signal process in the character input device 1, as it is.

Alternatively, when the first direction input M is performed at multi-level, the movement speed of the mouse pointer may be controlled by steps.

The aforementioned conversion into the mouse mode may be performed using a separate mode conversion key 121, but be performed through the input unit 10. For example, by moving the input unit 10 along the circumferential direction, performing the central input C of one-level or two-level, or performing the first direction input M at two-level, the input mode may be changed.

When the central input C is performed, an input mode conversion window capable of moving to other modes is displayed so that the movement to various modes can be made through the first direction input M or the second direction input P.

Alternatively, various modes, for example, HanGeul input mode, English alphabet input mode, number input mode, symbol input mode and mouse mode, may be selected through the first direction input M or the second direction input P in a state of performing the central input C.

That is, while maintaining the state performing the central mode C, each input mode instead of the character originally assigned to each direction indication position is displayed in a character display unit 72 or a key display unit 74.

Figure 32B:
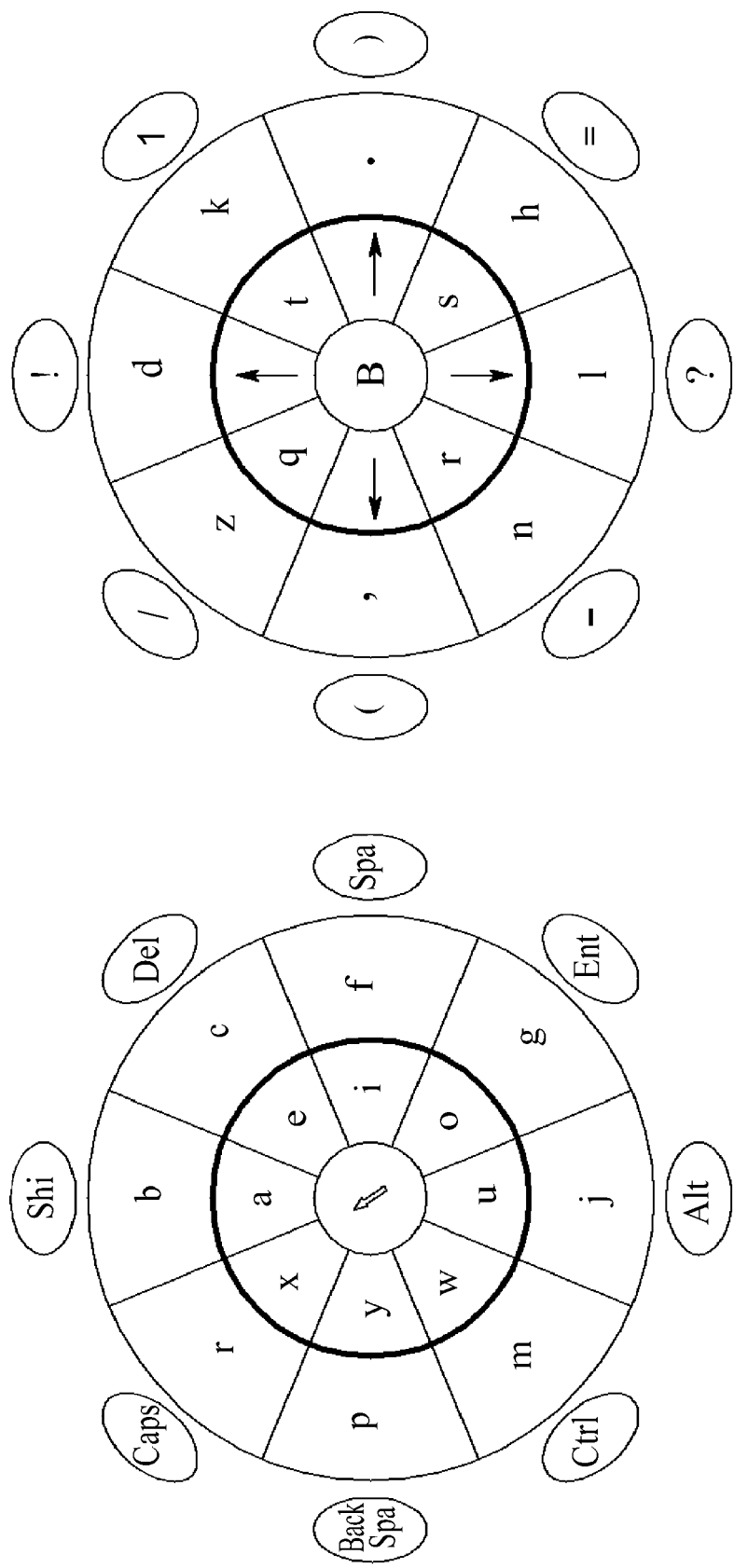
Figure 34:
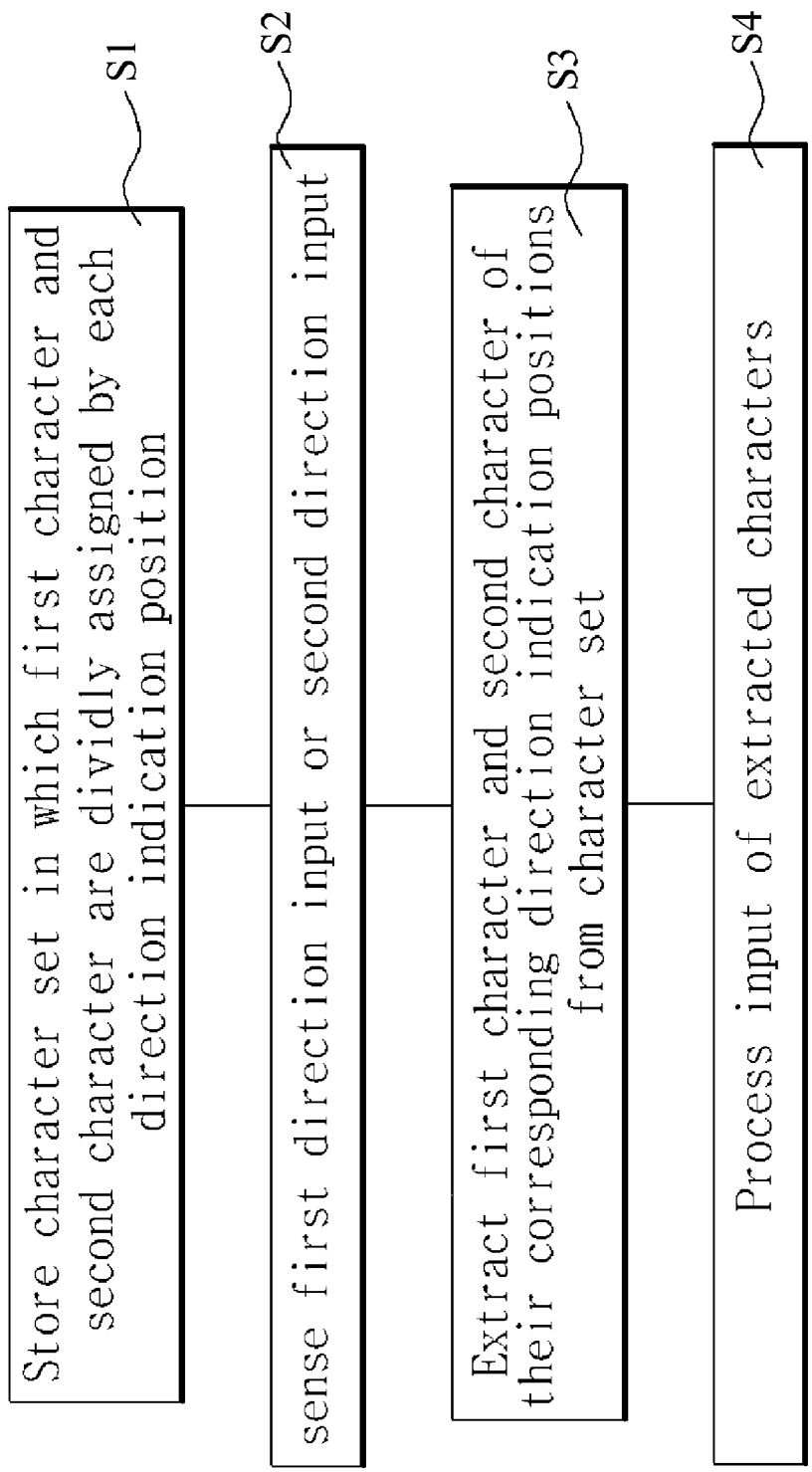
FIG. 34 is a flow chart of a character input method according to one embodiment of the present invention.

FIGS. 31 through 33 illustrate examples of keys arrangement in a keyboard when the input unit 10 is provided in two sets on the right and left.

First, FIG. 31 illustrates an example that each of the first direction input M and the second direction input P has eight direction indication positions and is made of two-level input.

'N' or 'M' in the center is indicative of data input by the central input C, two lines from the farthest outer edge are indicative of data input by the first direction input M of one- and two-level, and two lines in the middle are indicative of data input by the second direction input P of one- and two-level.

Characters are arranged at one-level of the first direction input M and one-level of the second direction input P of each input unit 10.

FIG. 31(*a*) illustrates a basic input window in which a total of sixty-four data including twenty-six characters, ten numbers, twelve F keys, ten functional keys, four direction keys, two conversion keys are arranged.

Symbols or the other keys having a low use frequency may be arranged in a next window converted by selecting an 'N' key provided in the center of the left key display unit 74 (refer to FIG. 31(*b*)).

Alternatively, the direction keys may be arranged in the second direction input P, or the F keys may be arranged in the next window and the symbols may be arranged in the basic input window.

On the other hand, when the 'M' key provided in the center of the right key display unit 74' is selected, the basic input window is converted into a mouse input window illustrated in FIG. 31(*c*).

The next window and the mouse input window can be used as the central combination inputs CM and CP, and for example, when removing the finger after performing the central combination input CM and CP in a predetermined input window, they can be returned to a just previous input window.

Meanwhile, when the aforementioned central sensing function is used in the character input device 1 according to one embodiment of the present invention, each character distinguished by an input method may be separately displayed.

That is, 'a' in FIGS. 32 and 33 represents a character input when the second direction input P is performed in a state where the finger is in contact with the central input key 13, and 'β' in FIGS. 32 and 33 represents a character input when only the second direction input P is performed.

In this case, since the capacity of the input assigned to the second direction input P increases twice, sixteen characters per one input unit 10, that is, a total of thirty-two characters may be further arranged.

Accordingly, in the embodiment illustrated in FIG. 31, the number of data capable of being maximally arranged in one key display unit 74 may be fifty in one input unit 10, including sixteen by the first direction input M of two-level, sixteen by the second direction input P of two-level, sixteen by the combination of the central input key 13 and the second direction input P, and two by the central input C of two-level.

Consequently, the total hundred data may be arranged in the two sets.

Accordingly, all keys of the currently used keyboard can be arranged in one window, without having the next window.

FIGS. 32 and 33 illustrate an example of a key display in a small-sized device such as a portable mobile communication terminal 100.

Referring to FIG. 32, each of the first direction input M and the second direction input P has eight direction indication positions and is formed of one-level, and referring to FIG. 33, each of the first direction input M and the second direction input P has four direction indication positions and is formed of two-level.

An outer line in FIG. 32 and outer two lines in FIG. 33 are indicative of data input by the second direction input P, an inter line in FIG. 32 and inner two lines in FIG. 33 are indicative of data input by the first direction input M, a key inside an circular arc in each FIGS. 32 and 33 (refer to β) is indicative of data input when each second direction input P is performed without placing the finger on the input unit 10.

Specifically, the left side in FIGS. 32(*a*) and 33(*a*) represents a mouse input window and the right side therein represents a basic input window.

Each of FIGS. 32(*b*) and 33(*b*) represents an English alphabet input window, and the left side in FIGS. 32(*c*) and 33(*c*) represents a number input window and the right side therein represents a basic input window.

In both embodiments, when an 'alphabet' key in a right key display unit 74' in FIGS. 32(*a*) and 33(*a*) is selected, both sides are converted as illustrated in FIGS. 32(*b*) and 33(*b*).

At this time, when an 'arrow' key in the center of the left side in FIGS. 32(*b*) and 33(*b*) is selected, the conversion into the mouse mode in FIGS. 32(*a*) and 33(*a*) is made. When a 'B' key in the right side is selected, the conversion into the basic input window is made.

Alternatively, when a 'number' key in the right key display unit 74' in FIGS. 32(*a*) and 33(*a*) may be selected, the key display unit 74 on the right is fixed and only a left key display unit 74' can be converted into the mouse input window.

In the embodiments of FIGS. 32 and 33, unlike the embodiment of FIG. 31, characters, numbers, F keys, symbols and others are arranged so as to be input through the mode conversion.

Accordingly, in this case, the first direction input M and the second direction input P may be formed of one-level, or the number of direction indication positions may be reduced to four, thereby performing the input.

Further, when power of the terminal 100 is on, the mouse input window may be displayed on one side and the basic input window may be displayed on the other side at the beginning.

In this state, the conversion into the alphabet input window or the number input window can be made by selecting a desired mode through the basic input window.

At this time, the left input window may convert the mode through the central input C, so as to be able to used as the mouse input window even in any mode, and return to the basic input window can be made on the right.

Of course, each of the input window may perform the mouse function in a predetermined mode through the central combination inputs CM and CP at any time, or the mode conversion may be performed on the right input window.

Two Sets

Two or more character input devices 1 according to one embodiment of the present invention may be provided in the base 110.

FIG. 19 is an operation view illustrating an input example in a state where two input units 10 and 10' are provided at the right and left of the base 110 of the portable mobile communication terminal 100.

In this case, the two input unit 10 and 10' may have the same or different configuration.

That is, the left input unit 10 may be perform the first direction input M, the second direction input P and the central input C, and the right input unit 10' may perform the central combination inputs CM and CP or the direction combination inputs MP or PM in addition to the first direction input M, the second direction input P and the central input C.

Further, the numbers of each direction indication position in the input units 10 and 10' may be different. Any one of the input units 10 and 10' may be capable of performing the two-level input.

Figure 21A:
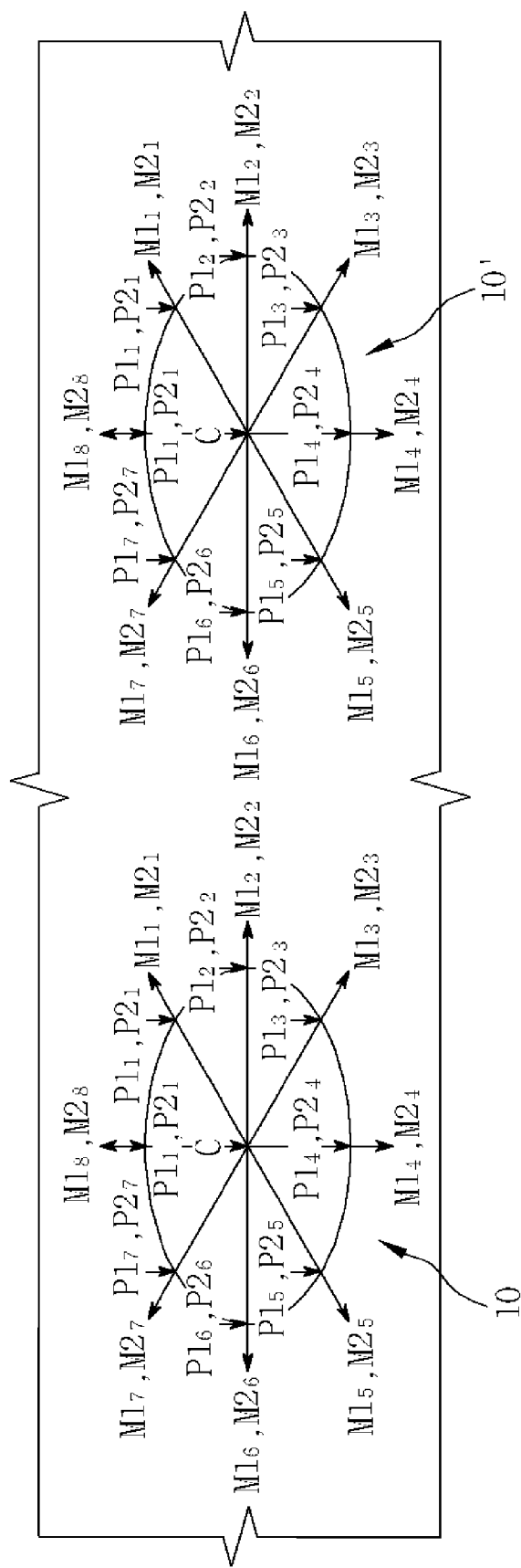
FIGS. 21 and 22 are concept views of various combinational examples of the input operation when the input units are provided in two sets.
Figure 21B:
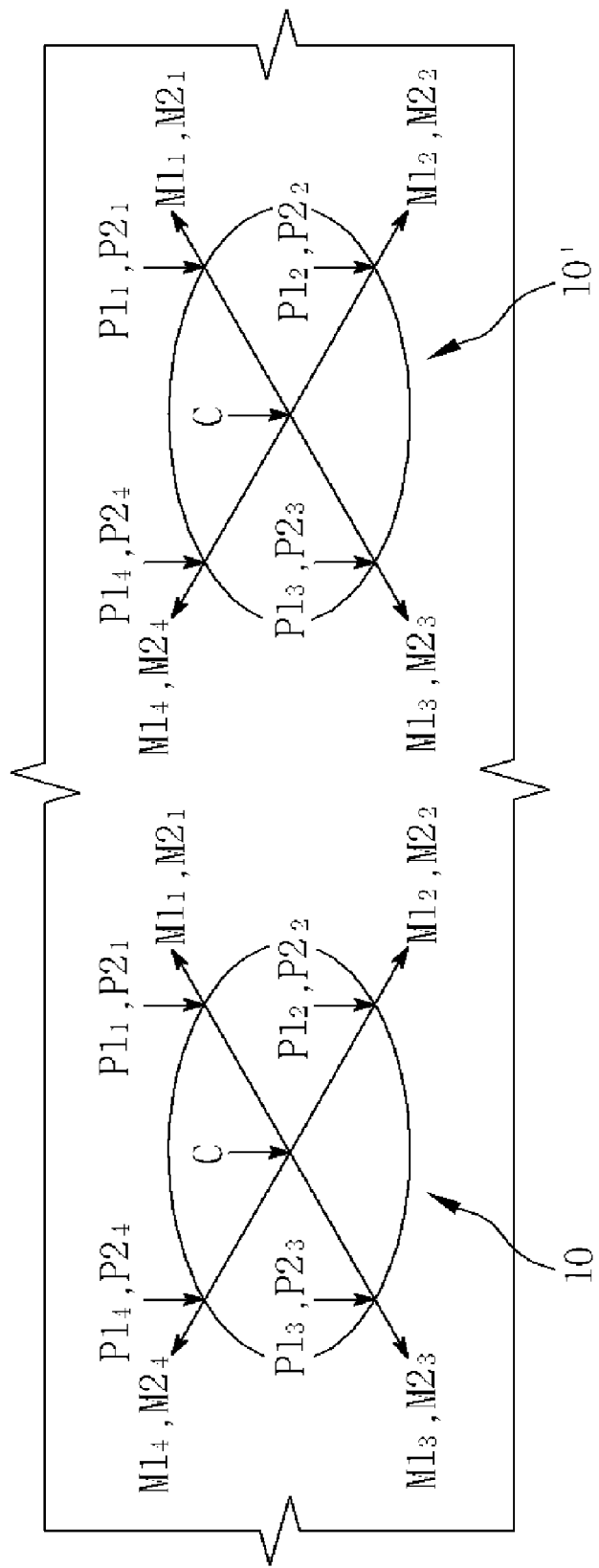

FIG. 21 is a concept view illustrating an example of the constitutions of each of input units 10 and 10' when two sets of the input units 10 and 10' are provided.

Referring to FIG. 21(*a*), each of the input unit 10 and 10' is configured to perform the first direction input M of two-level and the second direction input P of two-level, in which eight first direction indication positions $M_1$, $M_2$, . . . and eight second direction indication positions $P_1$, $P_2$, . . . are respectively provided.

Accordingly, the number of characters capable of being input through the input units 10 and 10' is a total of thirty-two including sixteen through the first direction input M and sixteen through the second direction input P, except for the central input C.

Since two input units 10 and 10' are provided at the left and right, the total number of characters capable of being input is sixty-four.

Since this is input capacity enough to arrange all of twenty-four HanGeul characters and twenty-six English alphabet characters, one operation one phoneme input is possible and symbols, numbers or various functional commands and others may be additionally input in the remaining direction indication positions.

Accordingly, since characters, numbers, symbols and others can be directly input without performing a separate mode change, a fast character input is possible.

For example, character input may be performed by the second direction input P of two-level in each of the two input units 10 and 10' and the movement of a mouse pointer, function commands such as enter, space, cancellation and so on, mode change, direction indication input and the like may be performed by the first direction input M. Cursor movement, menu movement, channel/volume control, and so on may be performed through the direction indication input.

The first direction input M may be only constituted of one-level input. However, as illustrate in FIG. 21(*a*), in the case where the first direction input M is constituted of two-level input, numbers, symbols and the like may be further arranged.

To the contrary, the character input may be performed by the first direction input M of two-level in each of the two input units 10 and 10' and the functional commands, mode change, direction indication input and the like may be performed by the second direction input P.

Alternatively, when each of the two input units 10 and 10' has eight first direction indication positions $M_1$, $M_2$, . . . and eight second direction indication positions $P_1$, $P_2$, . . . , characters may be arranged only in the first direction input M of one-level and the second direction input P of one-level.

Alternatively, as illustrated in FIG. 21(*b*), when each of the two input units 10 and 10' has four first direction indication positions $M_1$, $M_2$, . . . and four second direction indication positions $P_1$, $P_2$, . . . , characters may be arranged in the first direction input M of multi-level and the second direction input P of multi-level Alternatively, characters may be input by any one input unit 10, and the aforementioned movement of mouse pointer, functional command, mode change and direction indication input and the like may be performed, or numbers or symbols, etc. may be input by the other input unit 10'.

In this case, since the input of the characters and the use of the mouse can be simultaneously performed, effect simultaneously using the keyboard and the mouse in a desktop computer can be obtained. Accordingly, various works as well as a game, etc. requiring complicated operation which must simultaneously use the keyboard and the mouse, may be performed even in a small-sized terminal.

In the aforementioned case, when one or more of the first direction input M and the second direction input P are formed of two-level, numbers, symbols and the like may be further arranged to perform the input.

Figure 22B:
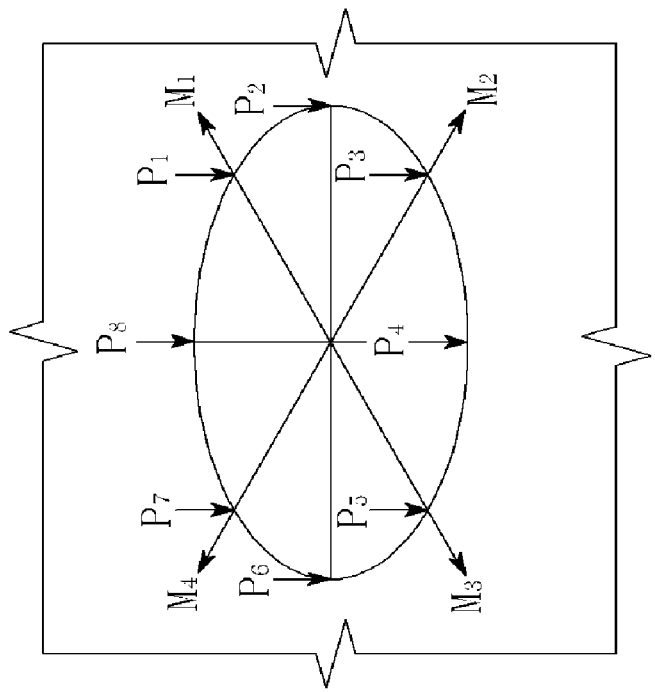
Figure 22A:
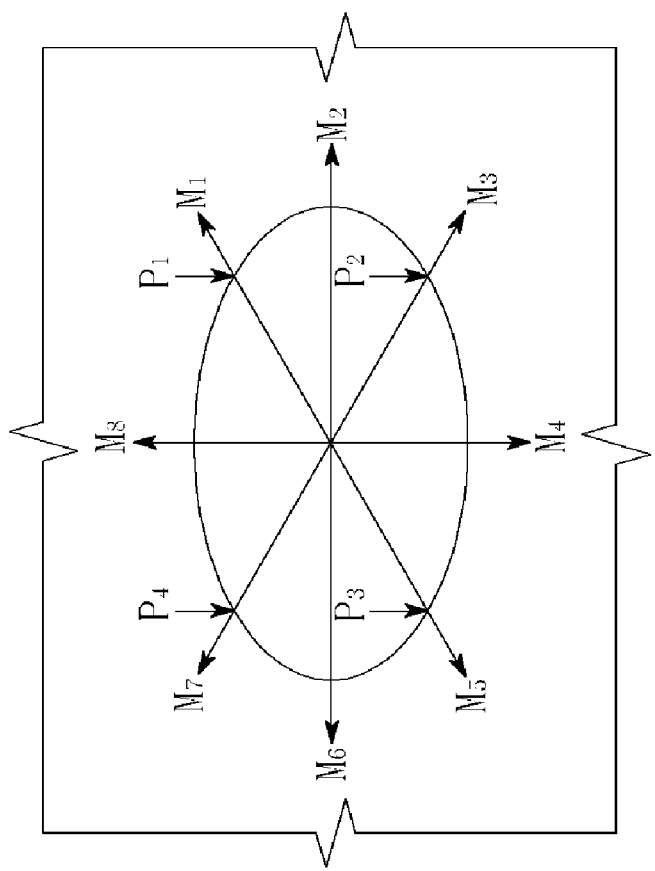

FIG. 22 is a concept view illustrating the configurations of input units 10 and 10' according to another embodiment of the present invention. Each of FIGS. 22(*a*) and 22(*b*) illustrates only one of two-set input units 10 and 10' having the same configuration.

In FIG. 22(*a*), the first direction input M has eight first direction indication positions $M_1$, $M_2$, . . . and the second direction input P has four second direction indication positions $P_1$, $P_2$, . . . .

To the contrary, in FIG. 22(*b*) the first direction input M has four first direction indication positions $M_1$, $M_2$, . . . and the second direction input P has eight second direction indication positions $P_1$, $P_2$, . . . .

Accordingly, in each embodiment, since the number of characters capable of being input through one input unit 10 is a total of twelve, the total twenty-four characters can be input through two input units 10 and 10'.

Herein, when any one of the first direction input M and the second direction input P is formed of two-level input, the number of characters to be assigned may further increase.

In this case, the first direction input M may have eight first direction indication positions $M_1$, $M_2$, . . . and the second direction input P may have six second direction indication positions $P_1$, $P_2$, . . . .

That is, in FIG. 22(*a*), when the first direction input M is formed of two-level, the total twenty characters may be assigned to one input unit 10, and when the second direction input P is formed of two-level, the total sixteen characters may be assigned thereto.

When two sets of the input units 10 are provided on the base 110, the characters assigned to each of the input units 10 and 10' and each input operation may be variously arranged.

For example, the vowel characters may be assigned to only one side of the two input units 10 and 10', or may be dividedly assigned to any one of the first direction input M and the second direction input P performed in each of the input units 10 and 10'.

On the other hand, when conversion to the mouse mode is made, the movement of the mouse pointer may be performed by any one of the two input units 10 and the operation thereof be performed by the other.

Others

The input unit 10 may have a returning function for automatically returning to the reference position S after performing the first direction input M or the second direction input P.

The returning function may be realized in various methods. For example, as illustrated in FIG. 3, the elastic member 21 may be provided between the input unit 10 and the base 110 so that the input unit 10 may return to the reference position S after performing the first direction input M.

Alternatively, in the input unit 10 illustrated in FIG. 6, the supporting unit 25 may be formed of the elastic member. Or, in the second direction input, the input unit 10 may be formed of the elastic material.

In addition to the return function, the aforementioned elastic member 21 may distinguish and input each input when the first direction input M is performed at multi-level.

Figure 23:
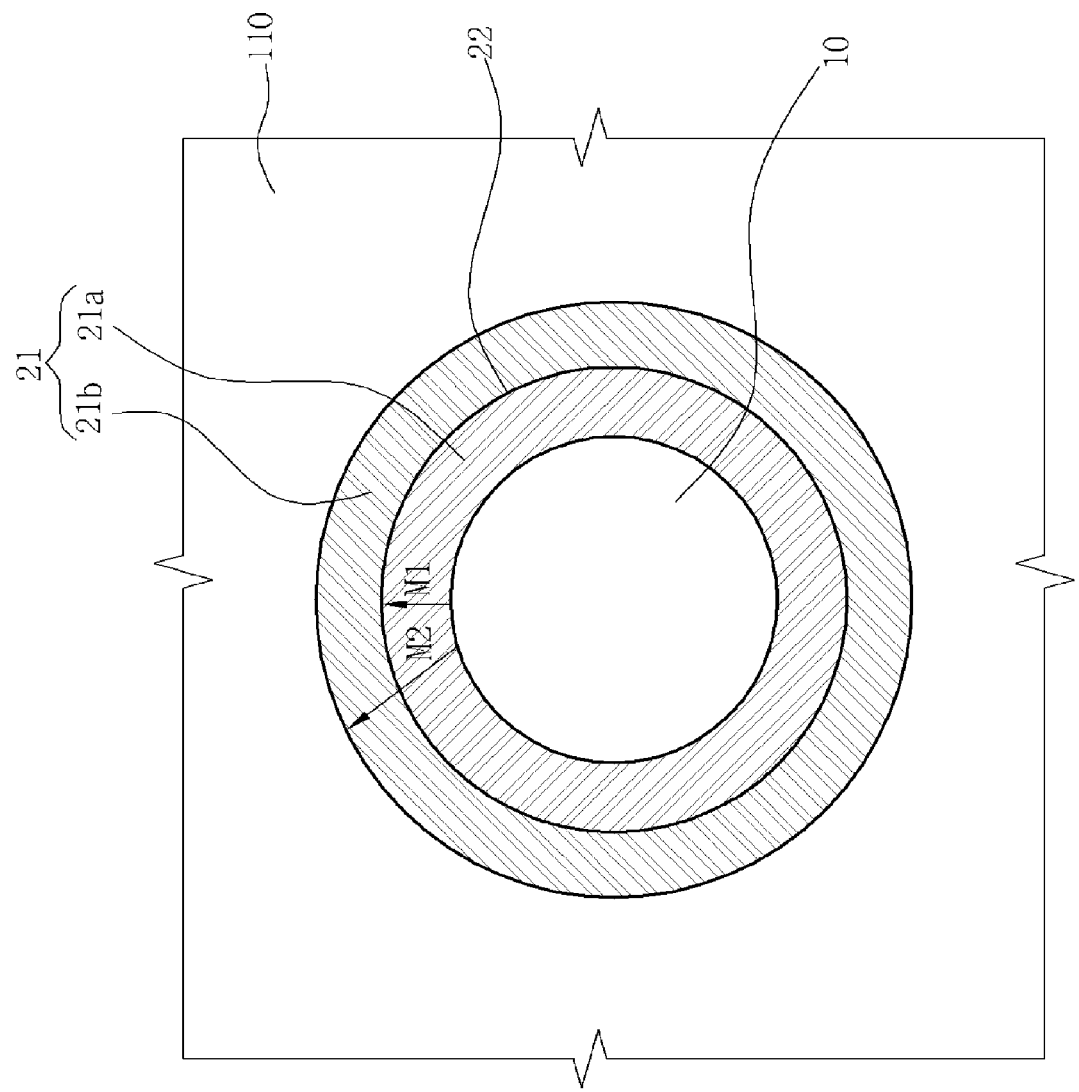
FIG. 23 is a view of a main part illustrating the input unit and the elastic member.

That is, as illustrated in FIG. 23, when the first direction input M is formed of two-level, two elastic member 21 (refer to 21a and 21b of FIG. 23) with different elasticity coefficients may be provided.

Accordingly, a plurality of the elastic members 21 may be formed of different materials or in different shapes.

In one embodiment, each elastic member 21 are sequentially arranged so that the elasticity coefficient thereof gradually increase as the elastic member 21 goes far from the input unit 10 (that is, $K_{21a} < K_{21b}$), thereby allowing resistance force to be felt at the boundary surface of one-level input and two-level input, due to difference in elasticity coefficient.

Accordingly, since force required for performing the two-level input is larger than force required for performing the one-level input due to the difference in elasticity coefficient, the user can distinguish between the one-level input and the two-level input.

On the other hand, the aforementioned method may be likewise applied to the second direction input P.

A supporting ring 22 may be further provided between the elastic members 21 and 21b.

On the other hand, when one or more of the first direction input M, the second direction input P and the central input C is performed, a click unit for giving clicking feeling may be provided.

The click unit of known various kinds may be used. For example, in the first direction input M, a protrusion may be provided on the movement path of the input unit 10 so that the clicking feeling can be transferred when the input unit 10 passes through it.

The click unit may be applied to all or a part of the respective input operations. For example, when the first direction input M, the second direction input P or the central input C, etc. is capable of performing the multi-level input, the clicking feeling may be generated only upon the second-level input, thereby allowing the user to be able to distinguish between the first level input and the second level input.

Referring to FIG. 2, one or more of a mode conversion key 121 for converting an input mode or a functional key 123 for inputting the functional commands such as enter, cancellation, cursor and so on may be further provided at one side of the base 110.

The aforementioned mode conversion key 121 or functional key 123 may be provided by a touch sensing method.

On the other hand, a display unit 130 for displaying an input command extracted by the control unit 51 may be provided at the other side of the base 110.

Figure 19A:
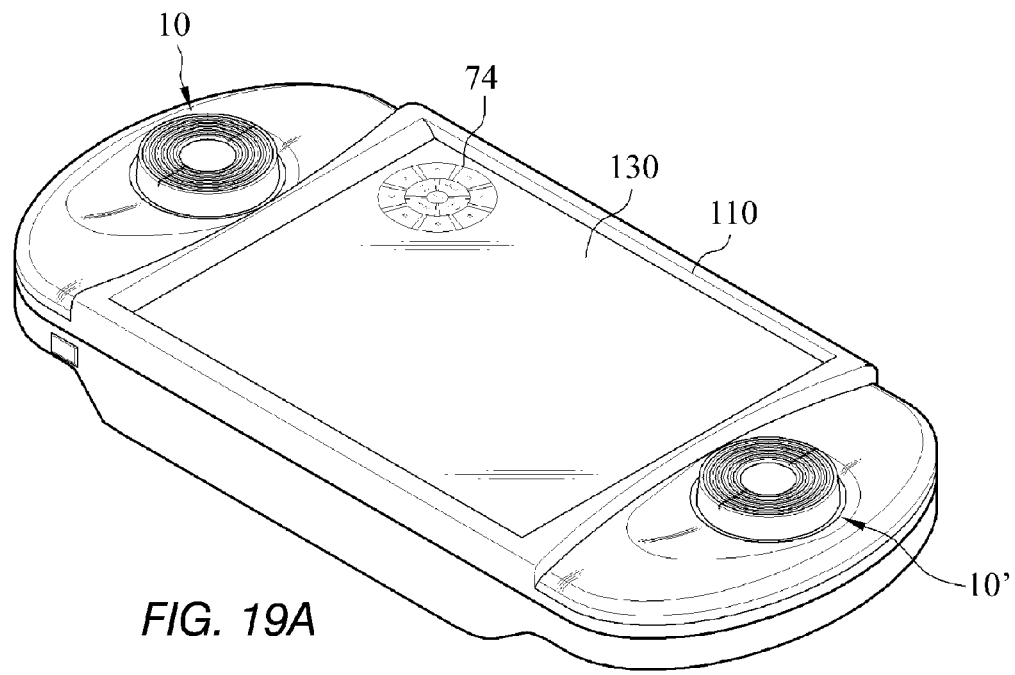
FIG. 19 is a perspective view of a portable terminal in which the input units are provided in two sets on right and left.

At this time, as illustrated in FIG. 19(a), the display unit 130 may be provided with the key display unit 74 for displaying the input contents according to the input operation of the user or the characters assigned in the selected input mode.

Figure 19B:
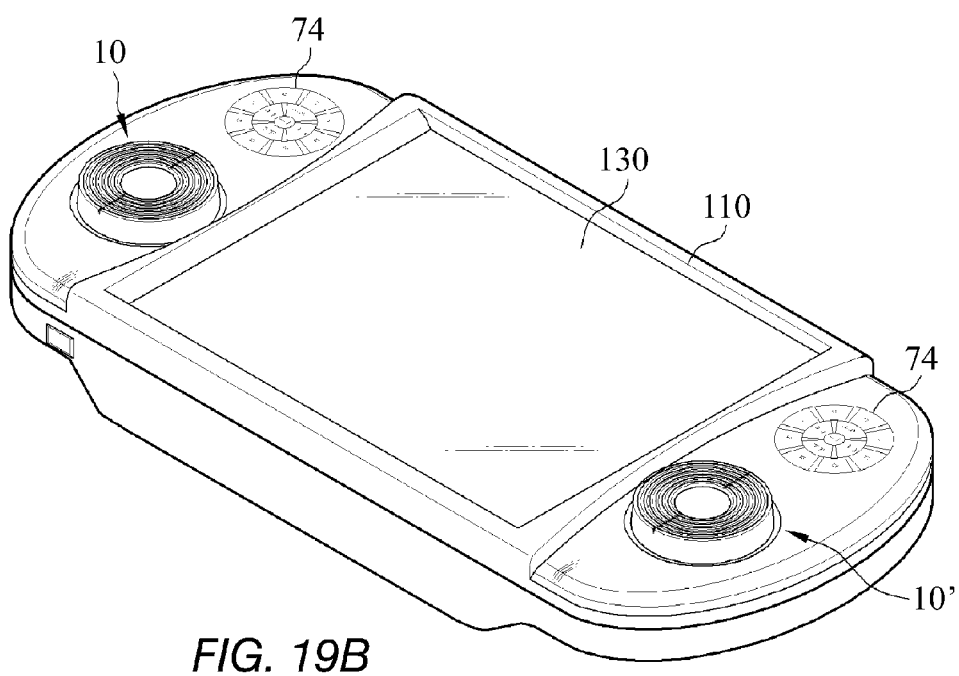

Further, as illustrated in FIG. 19(b), the key display unit 74 may be provided at one side of the base 110 adjacent to the input unit 10.

Figure 20:
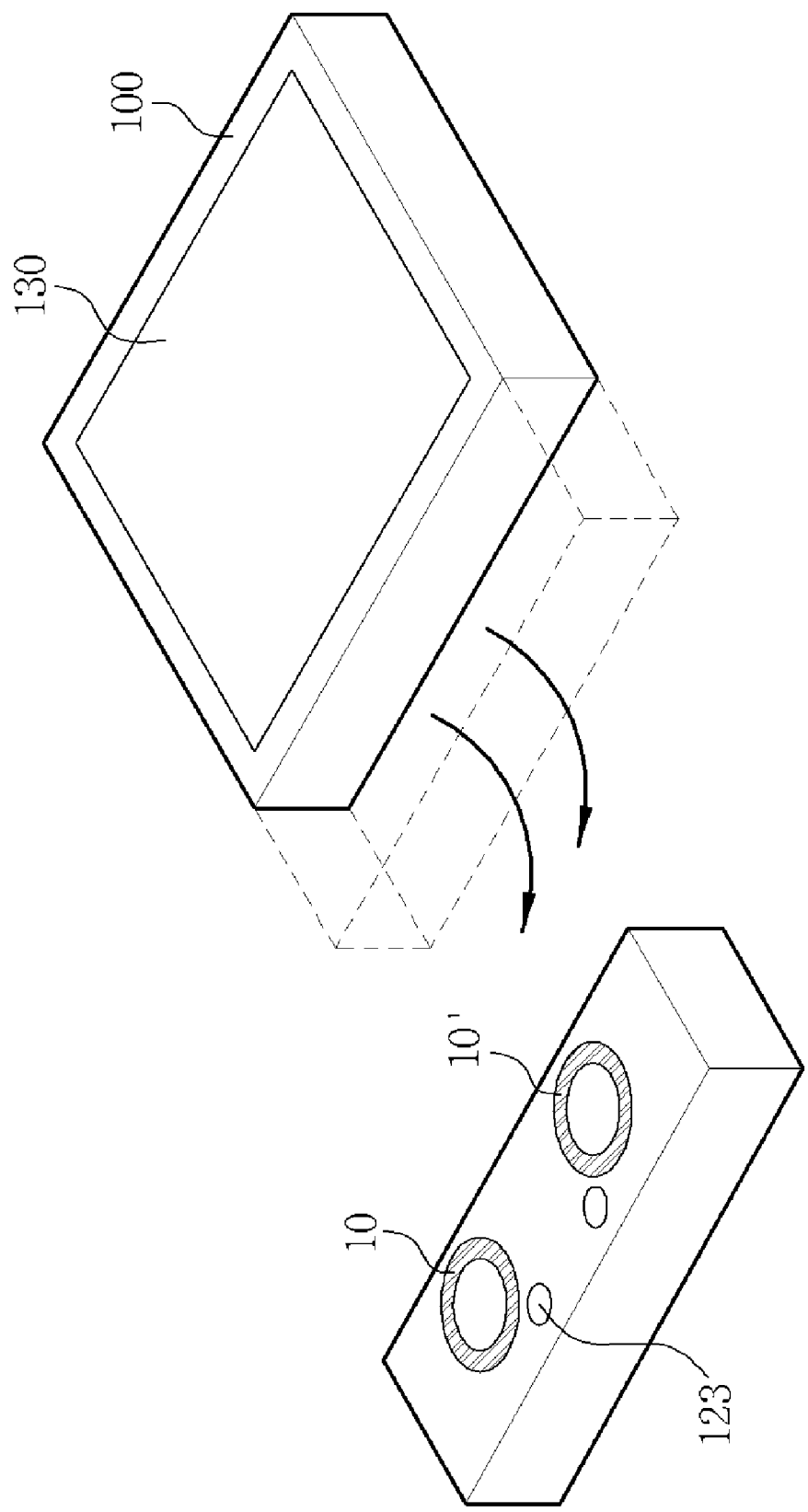
FIG. 20 is a separate perspective illustrating a state where the character input device is attached or detached from the portable terminal.

The display unit 130 may be provided to be attachable to or detachable from the based 110 as illustrated in FIG. 20.

That is, the character input device 1 according to one embodiment of the present invention may be provided to be attachable to or detachable from a body of an external device on which the display unit 130 is mounted.

In this case, the character input device 1 may further include a transceiving unit connected to the external device by one or more manner of a wire manner or a wireless manner to transceive data extracted by the control unit 51 to/from the external device.

Accordingly, the character input device 1 may be used as a remote controller for remotely controlling a computer or a television. In this case, channel change or volume control and so on may be performed by any one of the first direction input M or the second direction input P.

Specifically, in a digital TV capable of performing bidirectional communication, since the character input device 1 may perform character input for searching or saving a program, in addition to aforementioned general remote controller function, it is very efficient.

Alternatively, number input or mode change may be performed by the first direction input M, and channel or volume control can be performed by the second direction input P.

On the other hand, as illustrated in FIG. 16, any one of the base 110 and the input unit 10 may be further provided with a first character display unit 72a for displaying first characters assigned to each of the first direction indication positions $M_1$, $M_2$, ... corresponding to each of the first direction indication positions $M_1$, $M_2$, ..., and a second character display unit 72b for displaying second characters assigned to each of the second direction indication positions $P_1$, $P_2$, ... corresponding to each of the second direction indication positions $P_1$, $P_2$, ....

When two or more characters are overlappedly assigned, the first character display unit 72a and the second character display unit 72b may change and display the characters input according to the input mode.

For example, the first character display unit 72a or the second character display unit 72b may be formed of an LCD window, thereby making it possible to display only the HanGeul characters when inputting the HanGeul characters and display only the English characters when inputting the English characters.

On the other hand, as illustrated in FIG. 2, a reference position sensing unit 66 positioned at the reference position S and sensing that the input unit 10 is positioned at the reference position S, may be further included.

The reference position sensing unit 66 senses that the input unit 10 is positioned at the reference position S, and a sensing signal of the reference position sensing unit 66 may be used as a reset signal for inputting the characters and the like.

Figure 24:
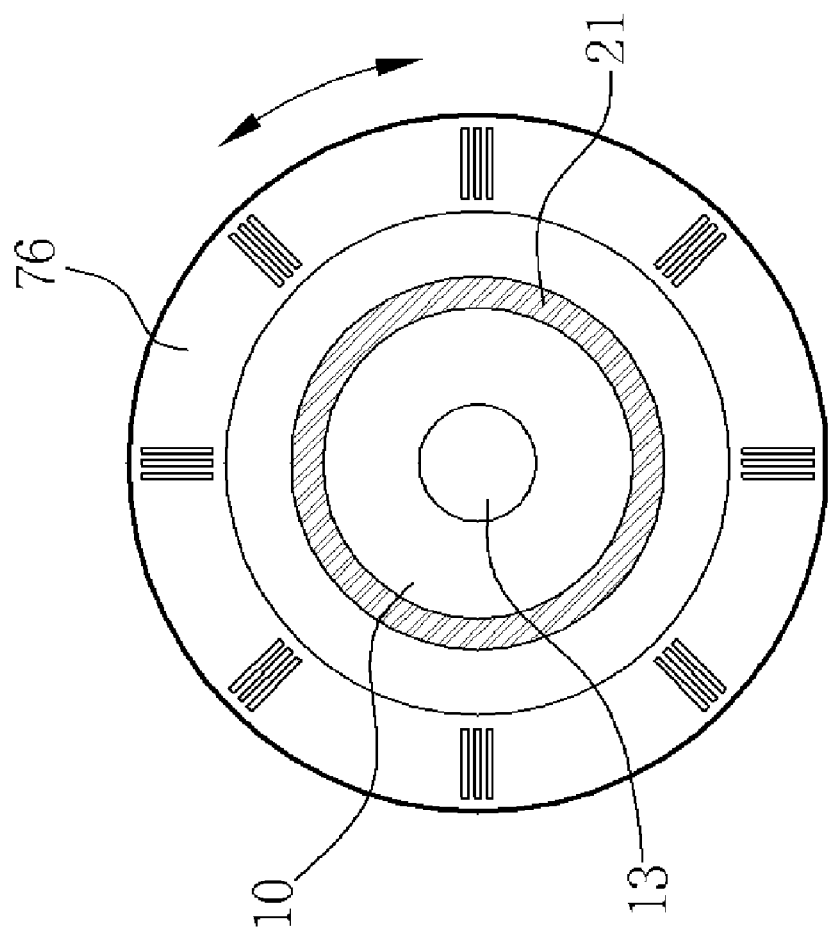
FIG. 24 is a plan view illustrating a rotation wheel positioned around the input unit.

Referring to FIG. 24, a rotation wheel 76 positioned adjacently to the input area 111 of the base 110 and performing the functions of scroll, volume control or search according to the input mode of the input unit 10 can be provided.

Alternatively, instead of the rotation wheel 76, a sensing unit in a round strip shape performing the function of the scroll and the like, or a plurality of sensing units arranged in a round shape around the input unit 10 can be provided.

Figure 26:
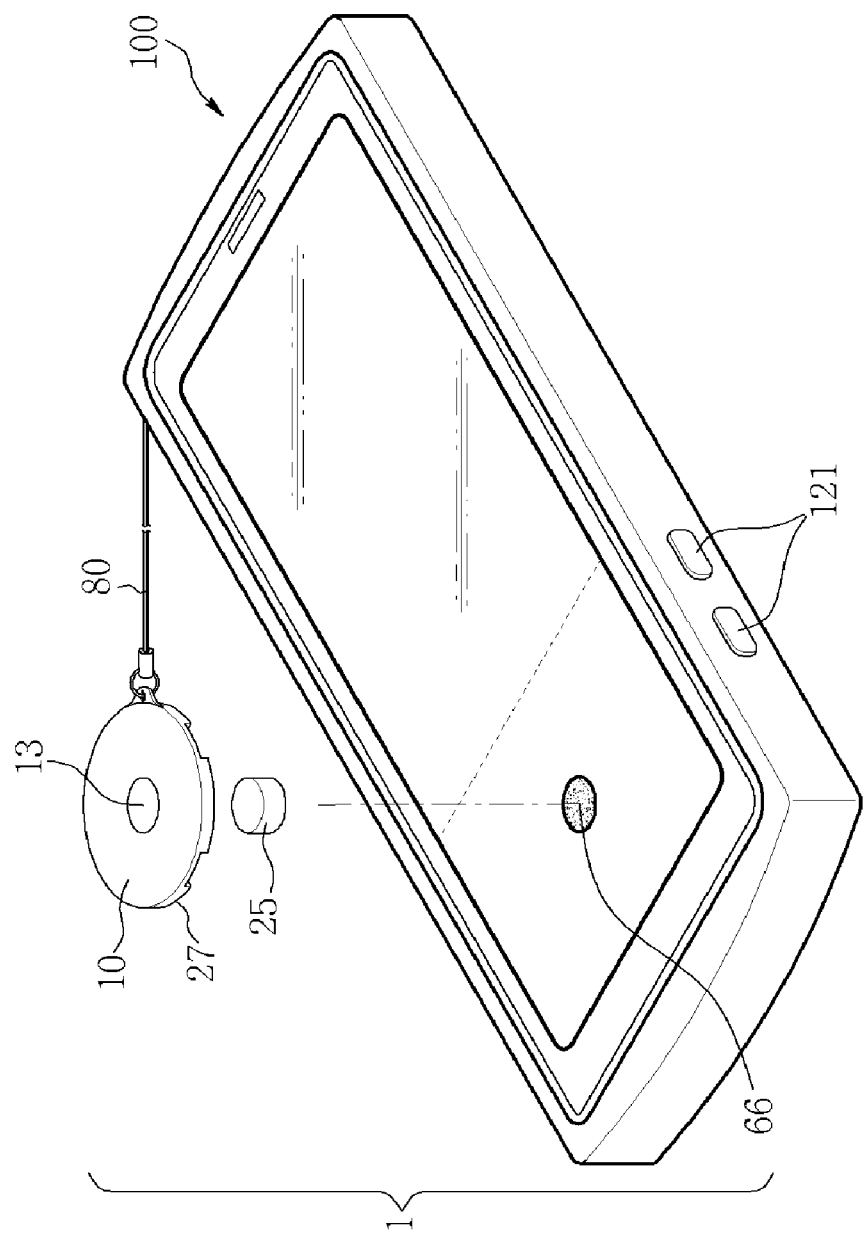
FIGS. 26 through 28 are operation views illustrating the connection relationship between the input unit and the base according to various embodiments of the present invention.
Figure 27:
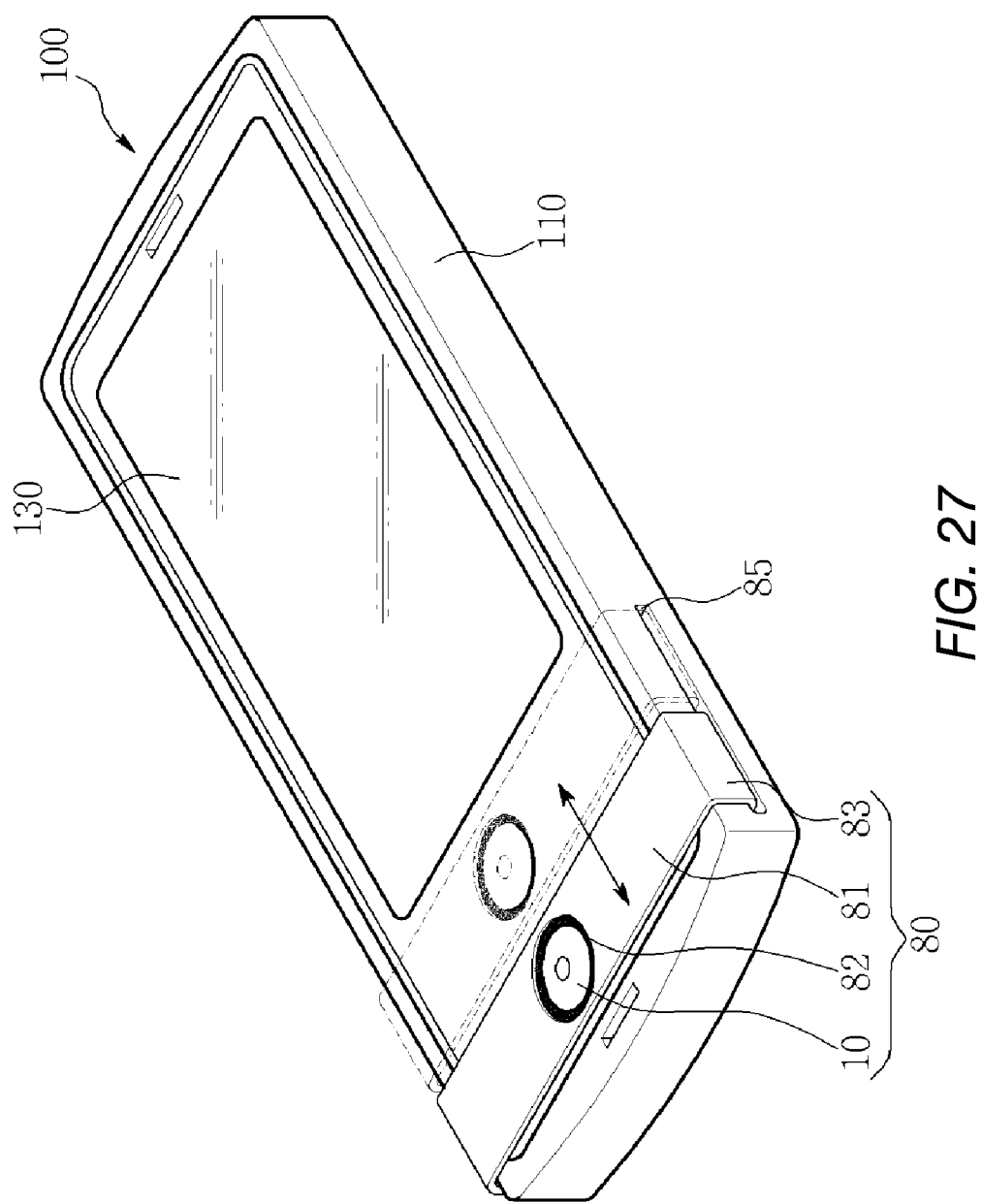
Figure 28:
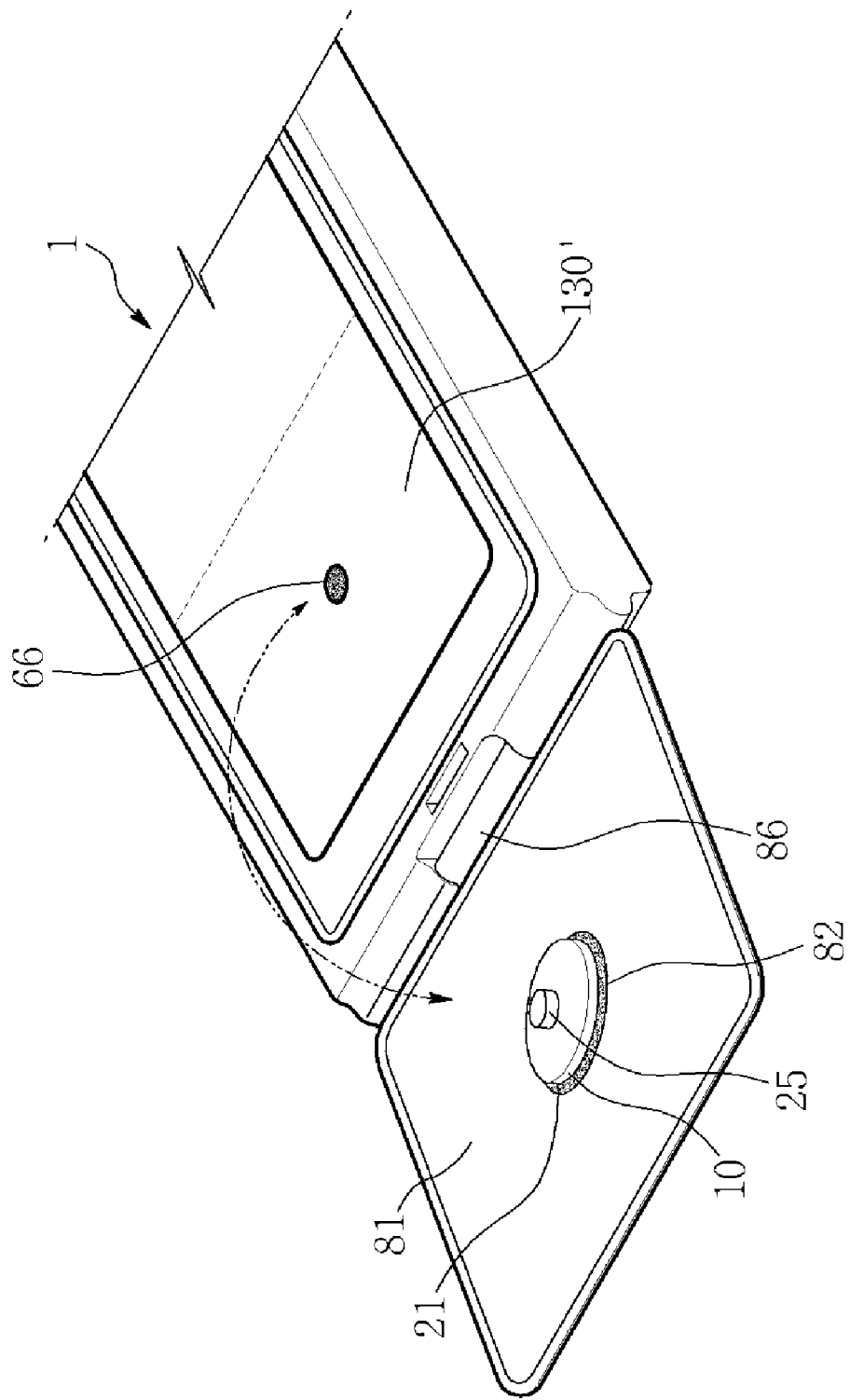

On the other hand, as illustrated in FIGS. 26 through 28, the input unit 10 is attachable to or detachable from or movable to/from the base 100, thereby allowing the user to be able to freely change the input position.

For example, as illustrated in FIG. 26, when the character input unit 1 according to one embodiment of the present invention is mounted on the portable mobile communication terminal 100, the input unit 10 is connected to the terminal 100 using a connection member 80 such as a string formed of various materials, thereby making it possible to place and use the input unit 10 on a touch screen 130' and others only upon data input.

In this case, the touch screen 130' is provided with the reference position sensing unit 66, so that when the contact of the input unit 10 or the supporting unit 25 is sensed, conversion into the input mode can be automatically performed.

Alternatively, as illustrated in FIG. 27, the connection member 80 may comprising a body 81 in a strip shape, a receiving unit 82 positioned at the body 81 and receiving the input unit 10 so that the first direction input M and the second direction input P can be performed, and a movement supporting unit 83 positioned at both ends of the body 81 and connected with and slid on slide grooves 85 formed in the base 110 may be provided.

In this case, the connection member 80 moves along the base 110 so that the input unit 10 moves to the input position.

Alternatively, as illustrated in FIG. 28, the input unit 10 may be received in the body 81 of a flip type, so that the input unit 10 is pivoted by a hinge unit 86 to be able to be moved to the input position.

In each of the aforementioned cases, the first sensing unit 61 and the second sensing unit 63 for sensing the movement of the input unit 10 may be positioned on the touch screen 130'.

Figure 30:
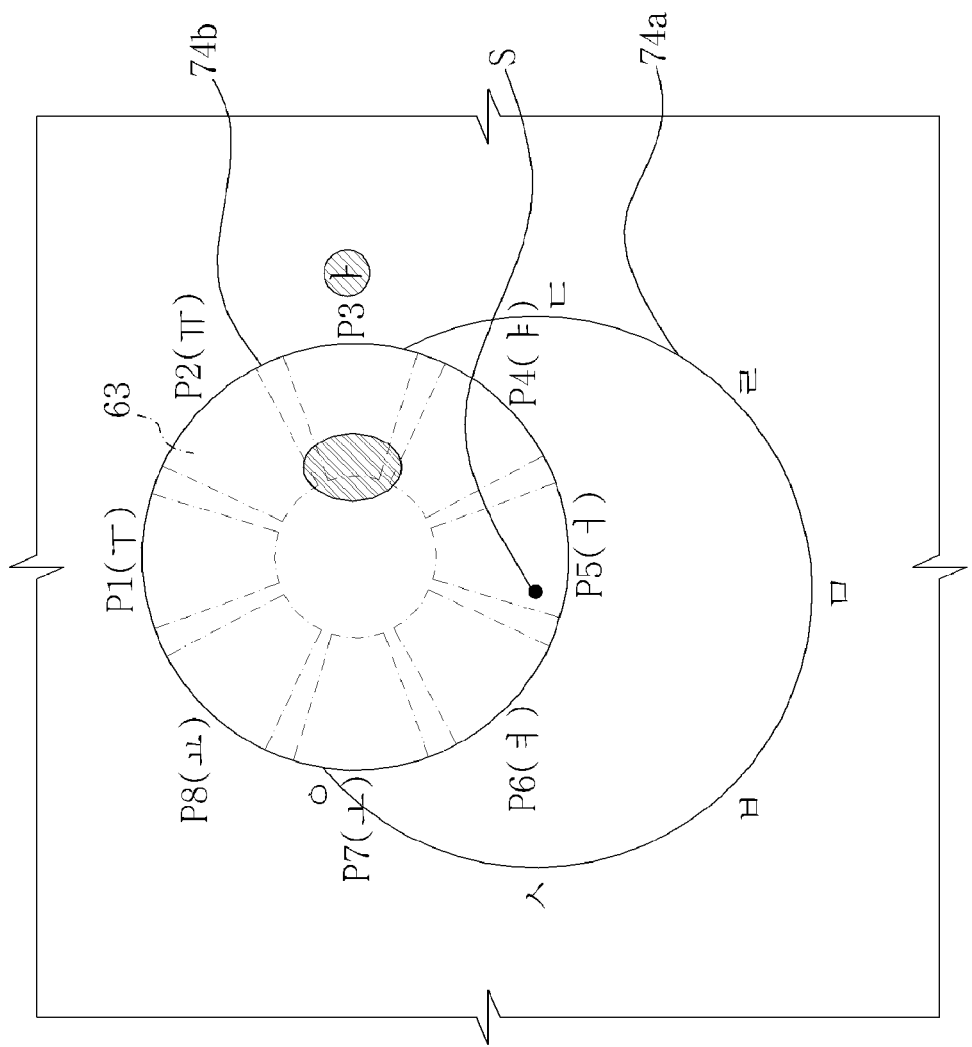

At this time, as illustrated in FIG. 30, the position of the second sensing unit 63 is changed as the input unit 10 moves, so that in a state where the first direction input M is performed, the input unit 10 may perform the second direction input P at that position without returning to the reference position S.

Figure 29:
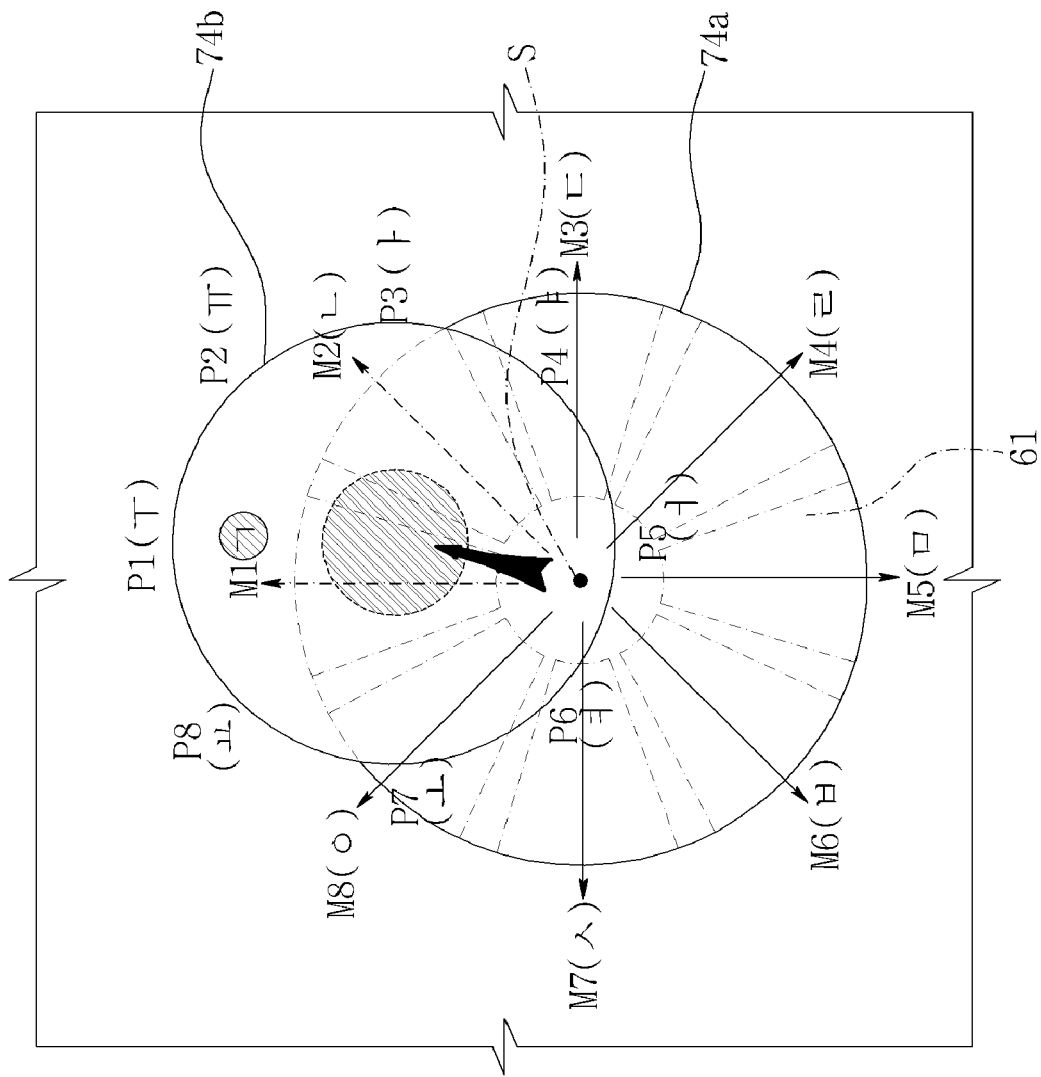

On the other hand, as illustrated in FIGS. 29 and 30, the touch screen 130' may be provided with the first key display unit 74a and the second key display unit 74b for displaying the characters input by the first direction input M and the second direction input P. In this case, as illustrated in FIG. 29, the second key display unit 74b may be moved when the input unit 10 moves.

With the character input device according to at least one embodiment of the present invention having aforementioned structure, it is possible to minimize space required for inputting the characters and accurately input each character according to the intention of the user.

In addition, it is possible to input one or more phonemes through one-time input operation by combining the direction movement input and the direction press input, so that the characters can be rapidly input.

Furthermore, it is possible to minimize the input space so that the products can be miniaturized and slim. Therefore, the character input device according to at least one embodiment of the present invention can be applicable to various portable electronic devices, such as a PDA, a notebook, a portable mobile communication terminal and the like.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A data input device comprising:
a base;
an input unit positioned at the base to allow each of first direction input and second direction input to be independently performed in a state where one finger is placed on the upper of the input unit, the first direction input being performed by moving the input unit from a reference position to any one of a plurality of first direction indication positions spaced and arranged radially from the reference position within a predetermined input area and the second direction input being performed by selecting any one of a plurality of second direction indication positions spaced and arranged radially in the input unit;
a first sensing unit configured to sense the first direction input;
a second sensing unit configured to sense the second direction input; and
a control unit configured to extract and run a first data or a second data from a memory unit, the first data being assigned to the first direction indication position in which the movement of the input unit is sensed, and the second data being assigned to the second direction indication position in which the second direction input is sensed, wherein any one of the first direction input and the second direction input is configured to perform the input unit toward any direction of a plurality of the directions in a state where the other is performed, so that a first data assigned to the first direction input and a second data assigned to the second direction input can be simultaneously input.

2. The data input device according to claim 1, wherein the second direction input is performed by tilting the input unit toward any one of the plurality of second direction indication positions or by selecting any one of press units positioned on the input unit, corresponding to each second direction indication position.

3. The data input device according to claim 1, wherein the first direction input is performed by sliding-moving the input unit and a supporting unit from the reference position toward each first direction indication position or by tilting-moving the input unit toward any one of the first direction indication positions.

4. The data input device according to claim 1, wherein a vowel character is assigned to only any one of the first direction indication positions or the second direction indication position.

5. The data input device according to claim 1, wherein the input unit is formed of elastic material.

6. The data input device according to claim 1, wherein the input unit itself is capable of being rotated in the right and left directions, centering on the reference position on the base.

7. The data input device according to claim 1, further comprising a transceiving unit for transceiving the data extracted by the control unit to/from the external device by a wire manner or a wireless manner.

8. The data input device according to claim 1, wherein the input unit has a returning function automatically returning to the reference position after performing the first direction input or the second direction input.

9. The data input device according to claim 1, further comprising an operation rod of which one end is inserted into the upper end of the input unit, and a connection unit into which the operation rod is inserted is formed on the upper end of the input unit.

10. The data input device according to claim 1, wherein the data assigned in the selected input mode is displayed at one side of the base, and a character display unit for displaying the input contents according to the input operation of the user is further provided.

11. The data input device according to claim 1, wherein the first direction input is performed by sliding the input unit from a reference position to any one of a plurality of first direction indication positions spaced and arranged radially from the reference position within a predetermined input area, and
   the second direction input is performed by selecting any one of press units positioned at the input unit, corresponding to a plurality of second direction indication positions spaced and arranged radially in the input unit.

12. The data input device according to claim 1, wherein the first direction input is performed by sliding the input unit from a reference position to any one of a plurality of first direction indication positions spaced and arranged radially from the reference position within a predetermined input area, and
   the second direction input is performed by tilting the input unit toward any one of a plurality of second direction indication positions spaced and arranged radially in the input unit.

13. The data input device according to claim 1, wherein the first direction input is performed by sliding the input unit from a reference position to any one of a plurality of first direction indication positions spaced and arranged radially from the reference position within a predetermined input area, and
   the second direction input is performed by tilting-moving the input unit toward any one of a plurality of second direction indication positions spaced and arranged radially in the input unit.

14. The data input device according to claim 1, further comprising a supporting unit between the input unit and the base for supporting tilting-move of the input unit,
   wherein the first direction input is performed by tilting-moving the input unit and the supporting unit from a reference position to any one of a plurality of first direction indication positions spaced and arranged radially from the reference position, and
   the second direction input is performed by tilting the input unit toward any one of a plurality of second direction indication positions spaced and arranged radially in the input unit.

15. The data input device according to claim 1, further comprising a guide unit positioned at the base and guiding the movement of the input unit.

16. The data input device according to claim 1, further comprising a projection projected from the input unit to easily operate the input unit when performing the first direction input or the second direction input.

17. The data input device according to claim 1, further comprising central input to be performed by the select of a central input key positioned in the center of the input unit or the rise or fall of the input unit with respect to the base.

18. The data input device according to claim 17, wherein in the case where a sensing unit for sensing the first sensing unit, the second sensing unit and the central unit is provided as a pressure sensor, different data are input according to difference in the pressure value of the first direction input, the second direction input or the central input.

19. The data input device according to claim 17, wherein in the case where the central input is simultaneously performed with any one of the first direction input or the second direction input, a Previously presented data different from data originally assigned to each direction indication position is input.

20. The data input device according to claim 17, further comprising a central touch sensing unit positioned at the center of the input unit to sense the touch of the finger, wherein the control unit distinguishes between a case where a central touch sensing signal by the touch of the finger to the central touch sensing unit and a sensing signal of the second sensing unit according to the run of the second direction input are simultaneously received, and a case where only the sensing signal of the second sensing unit is received, thereby inputting different data.

21. The data input device according to claim 17, wherein different data are input on the same path according to difference in the movement distance of the first direction input, the second direction input or the central input.

22. The data input device according to claim 21, further comprising a plurality of elastic members having different elasticity coefficients to be number corresponding to the input, sequentially arranged so that the elasticity coefficient thereof progressively increases from the input unit toward each first direction indication position, thereby allowing the first direction input to be able to be distinguished and input by the respective steps according to the difference in the elasticity coefficient, between the input unit and the base.

23. The data input device according to claim 20, wherein a touch sensing unit for sensing the approach or touch of fingers is positioned at one or more of the upper end of each input unit or each press unit corresponding to each second direction indication position, or the central input key.

24. The data input device according to claim 23, further comprising a central touch sensing unit positioned in the center of the input unit to sense the touch of the finger, so that when the touch of the finger is sensed by the central touch sensing unit for more than a predetermined time, the control unit disregards a sensing result of the touch sensing unit, thereby allowing the touch input not to be performed.

25. The data input device according to claim 1, wherein one or more of the first direction input and the second direction input is performed by moving the input unit along the circumferential direction centering on the reference position within the input area.

26. The data input device according to claim 25, wherein only the final sensing signal is recognized as an input command when a plurality of sensing signals are input by moving the input unit along the circumferential direction.

27. The data input device according to claim 1, further comprising a display unit for displaying input command extracted by the control unit.

28. The data input device according to claim 27, wherein the display unit displays data assigned in the selected input mode, and is further provided with a character display unit for displaying contents input according to an input operation of a user.

29. The data input device according to claim 27, wherein the display unit is attachable to or detachable from the base.

30. The data input device according to claim 1, wherein two or more input units are positioned on the base.

31. The data input device according to claim 30, wherein one or more input of characters, numbers, F keys and functions is performed by any one of the two input units and a mouse function is performed by the other.

32. The data input device according to claim 30, wherein different data is input on the same path according to difference in the movement distance of the first direction input, the second direction input or the central input or in the case where the sensing unit for sensing the first sensing unit, the second sensing unit and central input is provided as the pressure sensor, different data is input according to difference in the pressure value of the first direction input, the second direction input or the central input.

33. The data input device according to claim 1, wherein, when in a state where any one of the first direction input and the second direction input is first performed, the other is subsequently performed, a direction combination input for inputting a third data assigned to the input operation subsequently performed can be performed.

34. The data input device according to claim 33, wherein the direction combination input inputs different data according to the order of the first direction input and the second direction input to be combined.

35. The data input device according to claim 33, wherein different data is input on the same path according to difference in the movement distance of the first direction input or the second direction input, or in the case where the first sensing unit and the second sensing unit are provided as pressure sensors, different data is input according to difference in the pressure value of the first direction input and the second direction input.

36. The data input device according to claim 1, wherein the first sensing unit and the second sensing unit are provided as any one of a touch pad or a touch screen positioned throughout the input area.

37. The data input device according to claim 36, wherein the input unit is placed on the input area to perform the first direction input and the second direction input.

38. The data input device according to claim 37, wherein the input unit further includes a supporting unit contacting with the input area, and the control unit is converted into the input mode when the touch pad or the touch screen senses the contact of the input unit or the supporting unit on the input area.

39. The data input device according to claim 37, wherein the position of the second sensing unit is changed as the input unit moves, thereby allowing the second direction input to be subsequently performed in a state where the first direction input is performed.

40. The data input device according to claim 37, wherein the first sensing unit and the second sensing unit are provided as the touch screen, and the touch screen displays one or more of a first key display unit for displaying the data assigned to each first direction indication position or a second key display unit for displaying the data assigned to each second direction indication position outside the input unit.

41. The data input device according to claim 40, wherein the second key display unit move along the input unit upon the first direction input so that in a state where the first direction input is performed, the second direction input can be subsequently performed.

42. The data input device according to claim 37, further comprising a connection member for connecting the input unit to the base.

43. The data input device according to claim 42, wherein the connection member includes: a body in a strip shape, a receiving unit positioned at the body and receiving the input unit to be able to perform the first direction input and the second direction input, and a movement supporting unit positioned at both ends of the body and slidably connected to the base.

44. The data input device according to claim 42, wherein the connection member includes: a body, a receiving unit positioned at the body and receiving the input unit to be able to perform the first direction input and the second direction input, and a hinge unit pivoting the body about the base to allow the input unit to be placed on the input area.

45. The data input device according to claim 1, wherein the movement of a mouse pointer is performed by the first direction input, and the operations of mouse right/left buttons or scroll are performed by the second direction input or the central input and the second direction input.

46. The data input device according to claim 45, wherein in the case where two input units are provided, the movement of the mouse pointer may be performed by any one of the two input units, and the operations of mouse right/left buttons or scroll are performed by the other.

47. The data input device according to claim 45, wherein in the case where two input units are provided, the second direction input of each input unit is capable of performing the multi-level input of two or more levels, so that the characters are input by any one of the direction input of each input unit, and the movement of a mouse pointer, direction indication, functional command or mode change are performed by the first direction input of each input unit.

\* \* \* \* \*